United States Patent [19]
Butman et al.

[11] Patent Number: 5,867,667
[45] Date of Patent: Feb. 2, 1999

[54] PUBLICATION NETWORK CONTROL SYSTEM USING DOMAIN AND CLIENT SIDE COMMUNICATIONS RESOURCE LOCATOR LISTS FOR MANAGING INFORMATION COMMUNICATIONS BETWEEN THE DOMAIN SERVER AND PUBLICATION SERVERS

[75] Inventors: Ronald A. Butman, Nahant; Raja Ramachandran, Allston; Thomas A. Burns, Duxbury; Thomas J. Malone, South Boston; Michael D. Kmiec, Boston; Joseph C. Dougherty, West Roxbury, all of Mass.

[73] Assignee: PFN, Inc., Cambridge, Mass.

[21] Appl. No.: 822,898

[22] Filed: Mar. 24, 1997

[51] Int. Cl.⁶ .................................................... G06F 13/00
[52] U.S. Cl. ............................... 395/200.79; 395/200.57; 395/200.55
[58] Field of Search ........................ 395/200.79, 200.57, 395/200.55, 200.59, 200.49, 200.53, 200.48

[56] References Cited

U.S. PATENT DOCUMENTS

| | | | |
|---|---|---|---|
| 5,428,778 | 6/1995 | Brookes | 707/5 |
| 5,555,798 | 9/1996 | Skeen et al. | 705/35 |
| 5,572,643 | 11/1996 | Judson | 395/200.48 |
| 5,708,780 | 1/1998 | Levergood et al. | 395/200.59 |
| 5,734,831 | 3/1998 | Sanders | 395/200.53 |
| 5,764,906 | 6/1998 | Edelstein et al. | 395/200.49 |
| 5,774,670 | 6/1998 | Montulli | 395/200.57 |

OTHER PUBLICATIONS

CheckPoint Software Tech.Ltd., CheckPoint FireWall–1 White Paper—Sep. 1995—Published on Internet.
NCSA, NCSA Firewall Policy Guide—Feb. 1996—Published on Internet.
IBM, Intranet and client/server—Apr., 1996—Published on Internet.
David Strom, Creating Private Intranets: Challenges and Prospects for IS—Nov. 16, 1995—Publsihed on Internet.
CGI, A Sample forma nd its CGI script Common Gateway Interface.
D.R.T., The WWW Common Gateway Interface Version 1.1—Feb. 15, 1996—Published on Internet.

(List continued on next page.)

*Primary Examiner*—Le Hien Luu
*Attorney, Agent, or Firm*—Maureen Stretch

[57] ABSTRACT

A publication control system for networks inside a client having several publication computers networked together, each of the publication computers having disks for storing a dynamic group registry and resource locators containing function names, a web server which, when executed by the publication computer, causes the publication computer to respond to resource locators by calling the function indicated, a database management program for organizing the dynamic group registry; and a client side communications server, which responds to resource locators directed to it and directs the database management program in organizing the dynamic group registry; the system also has a domain computer having a disk for storing a dynamic client registry and resource locators containing function names; a web server which, when executed by the domain computer, causes the domain computer to respond to the resource locators by calling the function name indicated, a database management program for organizing the dynamic client registry; a domain communications server which, when loaded by the web server, is executed by the domain computer, to respond to resource locators directed to it and to direct the database management program in organizing the dynamic client registry; a domain communications resource locator list in all computers that causes functions to be executed in the domain communications server; a client side communications resource locator list in all computers that causes functions to be executed in each client side communications server so that communications between the domain computer and the publication computers cause the selected functions to control internal publications.

16 Claims, 45 Drawing Sheets

OTHER PUBLICATIONS

Russell Owen, ROFM, a Filemaker Pro CGI—Jul. 8, 1996—Published on Internet.

Andy Oram, Introducing "CGI Programming on the Web"—Published on Internet.

seriver, Server Push Animation—Feb. 17, 1996—Published on Internet.

William Graziadei, Decoding FORMS with CGI—1995—Published on Internet.

Internet Technologies, The Intranet–Revolution or Evolution ?—Apr. 21, 1996—Published on Internet.

Darrin Nelson, Lotus, Lotus Notes and the Internet Compared and Contrasted Draft—Dec. 1, 1995—Published on Internet.

Netscape Communications, Intranets Redefine Corporate Information Systems—1996—Published on Internet.

EXTRA CORP, —EXTRAnet—Oct. 23, 1996—Published on Internet.

John Wack, Packet Filtering Firewall—Feb. 9, 1995—Published on Internet.

TCP/IP, Networking for the Internet or an Intranet.

Borderware, The BorderWare Firewall Server 4.0 White Paper Version 1.0—Nov. 1996—Published on Internet.

iCat (Innergy Inc.), The Intranet FAQ—Oct. 31, 1996—Published on Internet.

MPI, Illustra Advantages for WWW Applications—Dec. 21, 1995—Published on Internet.

Web–Star, WebStar/SSL Security Toolkit—Published on Internet.

MacDNS, Macintosh Domain Name Server Frequently Asked Questions—Oct. 28, 1996—Published on Internet.

MacWeek Special Report, Macweek Guide to Intranets—Aug. 5, 1996, vol. 10, No. 30—Published on Internet.

Lee Levitt, Internet Technologies Deployed Behind the Firewall for Corporate Productivity Prepared for the Internet Society INET'96 Annual Meeting—Published on Internet.

Steven E. Newton, What is TCP/IP?—Jan. 20, 1994—Published on Internet.

Yahoo!, Intranet Bookmarks—1994–96—Published on Internet.

Netscap's Secure Sockets Layer (SSL).

Michael Sarkin, PC Week Labs Review, Introducing the Compaq Professional Workstation, "Security" Err on the side of caution when considering Internet connections—Oct. 30, 1995—Published on Internet.

Peter Hinxman, University of Wales, Getting the most out of TCP–wrapper—Nov. 1994—Published on Internet.

America Online, AOL Server: A Server Comparison; Examples; Categories—1996—Published on Internet.

network MCI WebMaker, NetworkMCI WebMaker Security Brief, Overview of the networkMCI Webmaker—Published on Internet.

Matt Kramer, PC week Tech View Lab, LDAP seeks to solve directory confusion—May 23, 1996—Published on Internet.

Cisco Systems Inc., Designing Large–Scale IP Internetworks—1998–1996—Published on Internet.

Steven Adler, Richard Sand, Internet Insurance: Property, Contents, and Commerce A White Paper, IBM—1996—Published on Internet.

Goscinny–Uderzo, Firewalls, adapted from the document "Internet Firewalls FAQ"—1991—Published on Internet.

Center for Technology in Government, Internet Security Seminar, Center for Technology in Government, Univeristy of Albany—Apr. 2, 1996–Published on Internet.

Ir. Rob Koreman, A Discussion of Security Rules for the use of Internet and the Web, a lecture within the 1995–1996 UIA Post–academic Program, Telecommunications and Telematica—Mar., 1996—Published on Internet.

Tina Darmohray, Marcus Ranum, Firewalls—1995—Published on Internet.

W. Yeong, T. Howes, S. Kille, Network Working Group Request for Comments: 1487—Jul., 1993.

Tobin Anthony, Building and Maintaining an Intranet with the Macintosh, pp. 304–309, Hayden Books.

Jerry Ablan, Scott Yanoff, Web Site Administrator's Survival Guide, pp. 221–226, Sams.Nets Publishing.

Lisa Pyle, Creating Lotus Notes Applications, Table 2.1, pp. 20–25—1994, Que Corporation.

Lisa Pyle, Creating Lotus Notes Applications, Our Case Study Continues: Extending the Automation Capabilities, pp. 274–294—1994, Que Corporation.

Lisa Pyle, Creating Lotus Notes Applications, Query Sharing, pp. 348–359—1994, Que Corporation.

Zahir Ebrahim, A Brief Tutorial on ATM—Mar. 5, 1992—Published on Internet.

Michael Robin, The Medium Is The Web—1996—Published on Internet.

Erica Roberts, Data Communications, Getting the Goods on SNA Gateways—May 1996—Published on Internet.

Peter Heywood, To Chee Eng, Data Communications, Global Supernets: Big Pipes, Big Promises . . . and One Big Problem—Sep. 21, 1995—Published on Internet.

Ernst & Young, Health Care Cybervision, Internet Primer—1996—Published on Internet.

David Willis, State of the WAN—Apr. 15, 1996—Published on Internet.

Stephanie Wilkinson, Boundless Bandwidth—May 14, 1996—PCWeek Online—Published on Internet.

ClarkNet Business Solutions, Point to ISDN service—Published on Internet.

Kelly Jackson Higgins, Intranet Virtual Realities—1996—Published on Internet.

Isis Distributed Systems, Ensuring Application Availability is a Mission Critical Function—Published on Internet.

William Robertson, IP Multicast and MBONE Services on the Berkeley Campus Network—Mar. 7, 1996—Published on Internet.

Tibco, Inc., MTP: Multicast Transport Protocol—1994–1996—Published on Internet.

Tibco, Inc., TIBCO Named by IDC as Largest Message–Oriented Middleware Vendor—Sep. 17, 1996—Published on Internet.

Marc Andreesen and the Netscape Product Team, The Netscape Intranet Vision and Product Roadmap—Version 1.0, revised Jun. 11, 1996—Published on Internet.

Netscape, Netscape and Oracle Sign Strategic Agreement to Integrate and distribute Flagship Products—Published on Internet.

Fig. 7a, ct'd

Viewers

| ViewerID* | FullName | AdminFlag | DefWorkGrpID | DefAttribute |
|---|---|---|---|---|
| tburns | Tom Burns | 1 | WG1 | 3 |
| mkmiec | Mike Kmeic | 0 | WG1 | 1 |
| joed | Joe Dougherty | 0 | WG2 | 2 |
| afinkel | Alex Finkel | 0 | WG1 | 0 |

AuthorRights

| AuthorID* | AuthorIndexID* | AuthorAttribute |
|---|---|---|
| tburns | 21 | 0 |
| tburns | 22 | 1 |
| tburns | 55 | 3 |
| tburns | 101 | 7 |
| mkmiec | 21 | 1 |

CSContent

| CSCauthorID | CSClinkOID | CSCheadline | CSCBlocked | CSCfilename | CSCinfo | CSCt |
|---|---|---|---|---|---|---|
| MS.joed | NULL | Mortgages at an all time High | 0 | NULL | blaa,blaa,blaa | 1996 |
| SCU.joed | NULL | Here's Some Research | 0 | research.doc | (handle to large object) | 1996 |
| MS.tburns | 20a2.302a | Corporate research for beginner | 3 | corporate.xls | (handle to large object) | 1996- |
| MS.tburns | NULL | WAM! | 2 | NULL | WAM,WAM,WAM | 1996- |
| PFN.mkmiec | NULL | Agency New Issue Notice | 2 | NULL | Notice This! | 1996- |
| PFN.mkmiec | 20a2.304c | The Daily Agency Update | 1 | NULL | Today's update:... | 1996- |

CSContentBase

| CSCBcontentOID* | CSCBindexValue* | CSCBindexTree |
|---|---|---|
| 2092.300000000 | 1 | 1 |
| 2092.300000000 | 321 | 31321321 |
| 2092.300099999 | 6 | 6 |
| 2092.300200000 | 11 | 1111 |
| 2092.300200000 | 32 | 3132 |
| 2092.300200000 | 641 | 61641641 |

CSContentAdhoc

| CSCAcontentOID* | CSCAdestinaton* | CSCAsource | CSCAlocked |
|---|---|---|---|
| 2092.300000000 | WG1 | PFN.WG2IPFN.WG3 | 1 |
| 2092.300000000 | WG2 | PFN.WG3 | 3 |
| 2092.300099999 | WG3 | JPM.WG1 | 0 |
| 2092.300200000 | WG1 | PFN.WG2 | 0 |
| 2092.300200000 | WG2 | PFN.WG2IPFN.WG4 | 0 |
| 2092.300200000 | WG3 | PFN.WG3 | 2 |

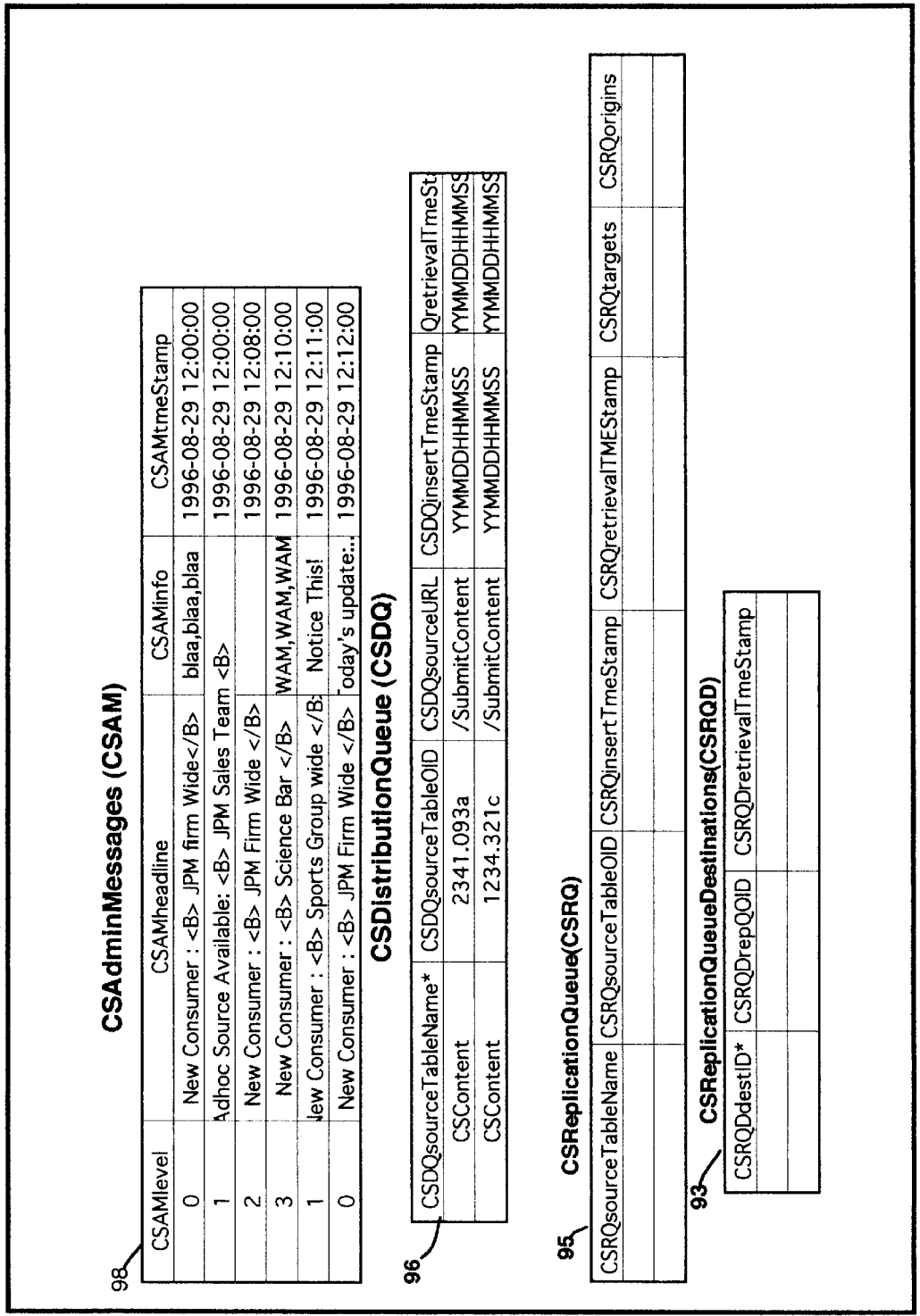
Fig. 7a, ct'd

Fig. 9

| DCserverName | DCactive | DCfirmID | DCfirmName | DCfirmLogo |
|---|---|---|---|---|
| http://helios.C2-HK.com:8888 | 1 | C2 | Company2 | C2logo.jpg |
| http://helios.C2-NY.com:8889 | 1 | C2 | Company2 | C2logo.gif |
| http://myserver.C3.com:80 | 1 | C3 | Company3 | C3logo.gif |
| http://www.pfn.com:80 | 0 | PFN | PFN, Inc. | PFNlogo.gif |

Fig. 10

| DCSfirmID | DCSsourceFirmID |
|---|---|
| C1 | C1 |
| C2 | C1 |
| C2 | C2 |
| C2 | C3 |

Fig. 11

| DCOobject |
|---|
| <url><origins><targets><data> |

Fig. 12

| DCODtarget* | DCODIoHandle | DCODreceived | DCODprocessed |
|---|---|---|---|
| http://www.pfn.com:8213 | 1010982029384 | 1996-08-29 12:00:00 | 1996-08-29 12:00:01 |
| http://www.pfn.com:8218 | 1010982029384 | 1996-08-29 12:00:00 | 1996-08-29 12:00:01 |
| http://my.sever.com | 1010982029385 | 1996-08-29 12:05:00 | NULL |

Fig. 13

| IndexID* | IndexDescription | IndexBaseType | IndexParentID |
|---|---|---|---|
| 1 | Engineering | Text | 0 |
| 3 | Development | Text | 0 |
| 6 | Hardware | Text | 0 |
| 11 | New Products | Text | 1 |
| 12 | Strategy | Text | 1 |
| 31 | Software | Text | 3 |
| 61 | Research | Text | 6 |
| 111 | QA | Text | 11 |

Fig. 22

Home  ⇧  ⇩

Administrtion\
Gtoup Administration
  Add Group
  Edit Group
  Delete Group
User Administration
  Add User
  Edit User
  Delete User Add User
Please provide the following information:
Account Information
First Name    Last Name
  John          Smith
Company Name   Title
  Company A    Corporate Bond Trader
Address
  1475 Broadway City              State/Province
  New York          New York
Zip Code/Postal Code    Country

Fig. 23

User Account Summary Form

User Account Information / Comment Option Authorization
Content Redistribution Authorization / Restricted Group
Access Authorization User Account Information
Username
jsmith@C1.com
First Name    Last Name
John          Smith
Company Name  Title
Company A     Corporate Bond Trader
Address
1475 Broadway City          State/Province
New York      New York Administration\
Group Administration
  Add Group
  Edit Group
  Delete Group
User Administration
  Add User
  Edit User
  Delete User Home

Fig. 26d

Administration\
Group Administration
  Add Group
  Edit Group
  Delete Group
User Administration
  Add User
  Edit User
  Delete User

Internal Group Access for John Smith

Select the appropriate group access rights for the following groups.

| Group | Viewer | Contributor | Redistributor | Admin |
|---|---|---|---|---|
| Corporate Bond Desk | ☐ | ☐ | ☐ | ☐ |
| Mortgage Bond Desk | ☐ | ☐ | ☐ | ☐ |
| MunicipalBond Desk | ☐ | ☐ | ☐ | ☐ |
| Treasury Bond Desk | ☐ | ☐ | | |

Home ⇧ ⇩

```
create table DomainClients
(DCserverName text not null,
DCactive int not null,
DCfirmID text not null,
DCfirmName text not null,
DCfirmLogo text not null,
DCsiteID text not null,
unique (DCserverName),
unique (DCfirmID, DCsiteID));

update tables set table_owner = 'nsadmin' where table_name =
'DomainClients';
```

Fig. 28

```
create table DCClientSources
(DCSfirmID text not null,
DCSsourceFirmID text not null,
unique (DCSfirmID, DCSsourceFirmID));

update tables set table_owner = 'nsadmin' where table_name =
'DClientSources';
```

Fig. 29

```
create table DCObjects
(DCOobject large_object not null);

update tables set table_owner = 'nsadmin' where table_name =
'DDobjects';
```

Fig. 30

```
create table DCObjectDestinations
(DCODtarget text not null,
DCODIoHandle text not null,
DCODreceived timestamp not null,
DCODprocessed timestamp,
unique (DCODtarget, DCODIoHandle));

update tables set table_ower = 'nsadmin' where table_name =
'DCObjectDestinations';
```

Fig. 31

```
create table Indexes
(IndexID int not null,
IndexDescription text not null,
IndexBaseType int not null,
IndexParentID int not null,
IndexAbbrv text not null,
unique (IndexID));

update tables set table_ower = 'nsadmin' where table_name = 'Indexes';
```

Fig. 31a

```
create table Channels
(ChannelID int not null,
ChannelName text not null,
Channel Description text not null,
unique (ChannelID));

update tables set table_owner='nsadmin' where table_name='Channels';
```

Fig. 31b

```
create table ChannelContent
(CCchannelID int not null,
CCcontentID int not null,
CCtype text not null,
CCsource text not null,
unique (CCchannelID, CCcontentID));

update tables set table_owner='asadmin'where table_name='Channelcontent';
```

Fig. 31c

```
create table ChannelTemplates
(CTchannelID int not null,
CTtemplateID int not null,
CTattributes text not null,
CTsources text not null,
unique (CTchannelID, CTtemplateID));

update tables set table_owner='nsadmin'where table_name='ChannelTemplates';
```

Fig. 32a

```
create table WorkGroup
(WGgroupID text not null,
WGname text not null,
WGmembership text not null,
WGcommunity int not null,
unique (WGgroupID));

update tables set table_ower = 'nsadmin' where table_name = 'Workgroup';
```

Fig. 32b

```
creat table WgroupContent
(WGCgroupID text not null,
WGCtype text not null,
WGCsourceID text not null,
unique (WGCgroupID, WGCtype, WGCsourceID));

update tables set table_owner= 'nsadmin' where table_
name='WgroupContent';
```

*Fig. 33*

```
create table WGroupBaseContent
(WGBCgroupID text not null,
WGBCindexID int not null,
unique (WGBCgroupID, WGBCindexID));

update tables set table_ower = 'nsadmin' where table_name =
'WGroupBaseContent';
```

*Fig. 34*

```
create table WGroupMasterLists
(WGMLgroupID text not null,
WGMLmasterList large_text not null,
WGMLtmeStamp timestamp,
unique (WGMLgroupID));

create index WBMLindex
on WGroupMasterLists
using btreee (WGMLgroupID);

update tables set table_ower = 'nsadmin' where table_name =
'WGroupMasterLists';
```

*Fig. 35*

```
create table WGroupAdhocContent
(WGACdestID text not null,
WGACsourceID text not null,
unique (WGACdestID, WGACsourceID));

update tables set table_ower = 'nsadmin' where table_name =
'WGroupAdhocContent';
```

Fig. 36

```
create table WGroupAuthorMembers
(WGAMauthorID text not null,
WGAMgroupID text not null,
WGAMrestrict int not null,
unique (WGAMauthorID, WGAMgroupID));

update tables set table_owner = 'nsadmin' where table_name =
'WGroupAuthorMembers';
```

Fig. 37

```
create table WGroupViewMembers
(WGVMgroupID text not null,
WGVMviewerID text not null,
WGVMadmin int not null,
WGVMattribute int not null,
unique (WGVMgroupID, WGVMviewerID));

update tables set table_owner = 'nsadmin' where table_name =
'WGroupViewMembers';
```

Fig. 38

```
create table AddressBook
(ABuserID text not null,
ABgroupID text not null,
ABdestination text not null,
ABattribute int not null,
unique (ABuserID, ABgroupID, ABdestination));

update tables set table_owner = 'nsadmin' where table_name = 'AddressBook';
```

Fig. 39

```
create table AuthorRights
(AuthorID text not null,
AuthorIndexID int not null,
AuthorAttribute int not null,
unique (AuthorID, AuthorIndexID));

update tables set table_owner = 'nsadmin' where table_name =
'AuthorRights';
```

Fig. 40

```
create table Viewers
(ViewerID text not null,
FullName text not null,
AdminFlag int not null,
DefWorkGrpID text not null,
DefAttribute int not null,
Passwd text not null,
unique (ViewerID));

update tables set table_owner = 'nsadmin' where table_name = 'Viewers';
```

Fig. 41

```
create table WGContentListAttributes
(WGCLAgroupID text not null,
WGCLAlistNumber int not null,
WGCLAattribKey text not null,
WGCLAattribValue text not null,
unique (WGCLAgroupID, WGCLAlistNumber, WGCLAattribKey));

update tables set table_owner = 'nsadmin' where table_name =
'WGContentListAttributes';
```

Fig. 42

```
create table WGContentListCriteria
(WGCLCgroupID text not null,
WGCLClistNumber int not null,
WGCLCcontentType text not null,
WGCLCcontentSource text not null,
unique (WGCLCgroupID, WGCLClistNumber, WGCLCcontentType,
WGCLCcontentSource));

update tables set table_ower = 'nsadmin' where table_name =
'WGContentListCriteria';
```

Fig. 43

```
create table CSAdminMessages
( CSAMlevel text not null,
CSAMclass text not null,
CSAMheading text not null,
CSAMinfo text not null,
CSAMtmeStamp timestamp not null);

create index CSAMbyOID
on CSAdminMessages
using btree(oid);

update tables set table_owner='nsadmin'where
table_name='CSAdminMessages';
```

Fig. 44

```
create table CSContent
(CSCauthorID text not null,
CSClinkOID oid,
CSCheadline text not null,
CSCfilename text,
CSCinfo large_object not null,
CSCtmeStamp timestamp not null,
CSCoriginSite text not null,
CSCoriginOID text not null,
CSCdataAttr int not null,
unique (CSCoriginSite, CSCoriginOID));

createindex CSCbyOID
on CSContent
using btree(oid);

up date tables set table_owner='nsadmin' where
table_name='CSContent';
```

Fig. 45

```
create table CSContentBase
(CSCBcontentOID oid not null,
 CSCBindexValue int not null,
 CSCBindexTree text not null,
 CSCBlocked int not null,
 unique (CSCBcontentOID, CSCBindexValue) );

create index CSCBbyContOID
on CSContentBase
using btree( CSCBcontentOID );

create index CSCBbyOID
on CSContentBase
using btree( oid);

up date tables set table_owner='nsadmin'where
table_name='CSContentBase';
```

Fig. 46

```
create table CSContentAdhoc
( CSCAcontentOID oid not null,
 CSCAdestination text not null,
 CSCAsource text not null,
 CSCAlocked int not null,
 unique ( CSCAcontentOID, CSCAdestination ) );

create index CSCAbtOID
on CSContentAdhoc
using btree(oid);

create index CSCAbyContOID
on CSContentAdhoc
using btree( CSCAcontentOID );

update tables set table_owner='nsadmin'where
table_name='CSContentIndexes';
```

Fig. 47

```
create table CSDistributionQueue
( CSDQsourceTableName text not null,
 CSDQsourceTableOID oid not null,
 CSDQsourceURL text not null,
 CSDQinsertTmeStamp timestamp not null,
 CSDQretrievalTmeStamp timestamp,
 CSDQtargets text not null,
 CSDQorigins text not null,
 unique (CSDQsourceTableName,
CSDQsourceTableOID) );

create index CSDQbyOID
on CSDistributionQueue
using btree(oid);
```

Fig. 47a

```
create tableCSReplicationQueue
(CSRQsourceTableName text not null,
CSRQsourceTableOID oid not null,
CSRQsourceURL text not null,
CSRQinsertTmeStamp timestamp not null,
CSRQretrievalTmeStamp timestamp,
CSRQtargets text not null,
CSRQorigins text not null,
unique (CSRQsourceTableName, CSRQsourceTableOID));

create index CSRQbyOID
on CSReplicationQueue
using btree(oid);

update tables set table_owner='nsadmin' where
table_name='CSReplicationQueue';
```

Fig. 47b

```
create table CSReplicationQueueDestinations
(CSRQDdestId text not null,
CSRQDrepQOID oid not null,
CSRQDretrievalTmeStamp timestamp,
unique (CSRQDdestID, CSRQDrepQOID));

create index CSRQDbyOID
on CSReplicationQueueDestinations
using bytree (oid);

create index CSRQDdestIdindex
on CSReplicationQueueDestinations
using btree (CSRQDestID);

update tables set table_owner='nsadmin' where
table_name='CSReplicationQueueDestinations';
```

PUBLICATION NETWORK CONTROL SYSTEM USING DOMAIN AND CLIENT SIDE COMMUNICATIONS RESOURCE LOCATOR LISTS FOR MANAGING INFORMATION COMMUNICATIONS BETWEEN THE DOMAIN SERVER AND PUBLICATION SERVERS

BACKGROUND OF THE INVENTION

1. Field of the Invention

This invention relates generally to the field of networking computer systems and more particularly to the field of systems for providing control over distribution, redistribution, access security, filtering, organizing and display of information across disparate networks.

2. Background

In most industries and professions today there is a rapidly increasing need for intercompany as well as intracompany communications. Most companies, firms, and institutions want to allow their employees to communicate internally, with other employees, and externally with the firm's customers, vendors, information sources, and others throughout a work day. Depending on the nature of the information and the relationship between the parties, these communications may need to take the form of one-to-one communiques in some cases, one-to-many broadcasts in others, many to many communications, and even many-to-one communications. Some of these categories might also provide better information for all concerned if the flow of data is interactive and collaborative, allowing recipients to comment, share, and build upon what has already been received.

At present it is both difficult and costly to achieve and manage high volumes of such communications easily, especially if extremely sensitive, confidential or proprietary information must be selectively communicated not only internally, but externally to those companies considered business partners.

In the financial industry, for example, an investment bank may want to communicate time-sensitive information to all of its investment management firm clients, and invite them to comment on it, while still insuring that the bank's competitors do not have access to the information. The investment bank may also want to receive news feeds from financial news services vendors on the same network that provides for the distribution of its proprietary information, as well as proprietary reports and analysis from other third party vendors it selects.

A decade or two ago, the tools for handling such communications would generally have been limited to telephone, facsimile, overnight mail, or, more recently, electronic mail. Each of these media had limitations and drawbacks. Overnight mail is costly and for some types of information, much too slow. The telephone is, of course, much faster, but many telephone conversations are limited to one-to-one communications, since the telephone is a synchronous form of communication requiring the partes to communicate at the same time. This is not always efficient. For an investment bank to transmit a market analysis report to its clients on a one to one basis, the process is slow and cumbersome, and inevitably some clients would get the information long before others do.

A telephone conference call insures that several clients get the same information at roughly the same time and a conference call is interactive, so that comments from various clients can be expressed. However, if the number of people on a conference call begins to exceed some critical mass, the call may be more confusing than helpful. The voices of other clients may be mistaken for that of the investment bank's analyst, for example. In either type of voice telephone transmission of information, the recipient must take notes if he or she wants to remember details or go over the analysis later in the day. When information needs to be not only timely, but precisely and accurately recorded for later reference, voice telephonic conversation becomes less appropriate.

Modern facsimile machines permit the broadcasting of information over telephone lines to a selected group of clients, as well as the transmission of charts and graphs and other images. This also gives the clients an accurate record to refer to later. However, facsimile transmission is not interactive, so any client comments that might have been offered are lost. Recipients of facsimile transmissions usually have only a hard copy, not an electronic copy of the information, unless they use fax modems to receive. Thus, the utility to the recipient may be lowered significantly, particularly if such transmissions come into a common fax machine or mail room and take a few hours to reach the individual.

Electronic mail sent over gateways between internal corporate networks is often slow, sent in plain text format (with any visual information usually sent as an attachment, if at all), and, like faxed data, is usually not indexed. As a result, finding the information that is wanted or needed in a stream of electronic mail messages can be tedious. Recipients may also be unable to use or see the attachments unless they use the same computer software and hardware. Many companies and institutions will not allow inbound or outbound attachments to email messages for security reasons. Email technology is essentially a store and forward process that inevitably produces many copies of the same document on the same network—an inefficient use of network resources.

After encountering these problems, companies and institutions with private, internal distributed computer and telecommunication networks took another approach to addressing intercompany communications. Many gave selected customers and vendors information from the company's own internal network, by building out a separate, isolated external network to communicate with their key business partners. Selected information from the company's internal network would be sent to the special external network and then sent on to the trading partners. This allowed larger documents and files to be transferred in a secure fashion to and from external sources. However, if an institution such as an investment bank wished to do this for all of its clients and all of its vendors, expenses and complexities increased dramatically. If the investment bank used one type of computer systems and network software for its internal and external networks, and a client or vendor used another, then individuals on both sides of the communication needed to have their network administrators configure their systems to work together and develop programs to provide security, as well as functionality. This usually involved capital outlays for computers, bridges(network devices that connect two networks using two different types of media—such as 10base T cable and FDDI connections), routers (special purpose machines that connect two or more networks and route messages to the correct internet protocol address), software and terminals, plus costs for developing software to handle the connections to and from the outside. To avoid extreme costs for equipment and special development, companies tended to restrict the number of companies granted this kind of access as well as the kind of information that could be sent or received.

To provide affordable alternatives to direct connections, other companies, such as First Call Corporation offered networking and distribution services. For example, if an investment bank wanted to deliver its research to its clients, First Call would deliver it for a fee, and also charge the recipients who received it. While this eliminated the need for intense capital expenditures and development costs on the part of both sellers and buyers of the information so distributed, it also effectively eliminated their control over the information, and its flow, too. First Call, for example, became a central source of information, not the bank or supplier, in the eyes of the clients. Since the information provided to First Call for distribution would be sent to all those who bought the service, it did not make economic sense for the providers to customize the information for any given recipient. Interactive communications were also impractical under this scheme.

Then came the Internet—the worldwide system of linked computer networks that allows thousands of existing corporate and institutional networks to communicate over it using standard communications protocols or signals. That aspect of the Internet known as the World Wide Web simplified these communications even more by providing what are known as hypertext links, and using HyperText Transport Protocol (HTTP) to allow a user to go from one hypertext link to another over the World Wide Web. (Hypertext is a way of creating and publishing text that chunks information into small units, called nodes, that have what are called hypertext links or anchors embedded in them. When a reader of the text clicks on a hyperlink, the hypertext software (also known as a browser or web browser) displays the node associated with that link. The collection of these nodes is a "web" and the Worldwide Web is a hypertext system that is global in scale.) With the Internet and the Worldwide Web, widespread dissemination of some types of information became simplified. However, most of the information published on the Internet's World Wide Web is not likely to be sensitive or confidential in nature, since access is readily available to many.

Internal corporate networks may have highly confidential business files on the same computers that form the internal network, as well as extremely confidential technical and product files that may be vulnerable to attack and theft or misuse if a connection is made between the internal network and the Internet. Consequently, most companies construct "firewalls" between their internal networks and any gateways to the external world. (See FIG. 2, where companies C1 through C9 are shown having firewalls F1 through F9, respectively.) A firewall is a security technique in which a user puts a specially programmed computer system between its internal network and the Internet. This special "firewall" computer prevents unauthorized people from gaining access to the internal network. However, it also prevents the company's internal computer users from gaining direct access to the Internet, since the access to the Internet provided by the firewall computer is usually indirect and performed by software programs known as proxy servers.

Thus, if a user wants to get a file from a vendor, he or she would send an FTP (file transfer protocol) request to the firewall computer's proxy server. The proxy server would create a second FTP request, under its name and use that one to actually ask for a file outside the network. This allows the internal names and addresses to stay inside the company. Use of firewalls and proxy servers can slow performance somewhat, and also tends to limit the types of information that can be sent or received to that which is less likely to be sensitive or proprietary.

The use of firewalls makes it less risky for internal network users to bring information in from the Internet and distribute it internally. However, once information is brought inside a private corporate network, there can still be problems distributing it internally.

Most large private networks are built of complex sets of:
Local Area Networks (LAN)-a set of computers located within a fairly small physical area, usually less than 2 miles, and linked to each other by high speed cables or other connections; and
Wide Area Networks (WAN)-groups of Local Area Networks that are linked to each other over high speed long distance communications lines or satellites that convey data quickly over long distances, forming the "backbone" of the internal network.

These private internal networks use complex hardware and software to transmit, route, and receive messages internally.

Sharing and distributing information inside a corporate network has been made somewhat easier by using client/server technology, web browsers, and hypertext technology used in the Internet, on an internal basis, as the first steps towards creating "intranets." In typical client/server technology, one computer acts as the "back end" or server to perform complex tasks for the users, while other, smaller computers or terminals are the "front-end" or "clients" that communicate with the user. In a client/server approach the client requests data from the server. A web server is a program that acts as a server function for hypertext information. In large private networks, a server computer might have web server software operating on it to handle hypertext communications within the company's internal network. At the web server site, one or more people would create documents in hypertext format and make them available at the server. In many companies, employees would have personal computers at their desks connected to the internal network. In an "intranet" these employees would use a web browser on their personal computers to see what hypertext documents are available at the web server. While this has been an advance for internal communications over a private network, it requires personnel familiar with HyperText Markup Language (HTML) the language that is used to create hypertext links in documents to create and maintain the "internal" web pages. If a more interactive approach is desired, an Information Technology (IT) specialist in some form of scripting, such as CGI, PERL, is needed who can create forms documents and procedures to allow users to ask for information from the server.

Applications that need to share information internally can also use what is known as workgroup software such as IBM's Lotus Notes™ software on the internal network. However, this, too, requires special programming and scripting for the unique needs of the organization.

It is now increasingly common for intranets to connect to the Internet forming what is sometimes called an "extranet." The Internet, however, is essentially a passive transmission system. There is no automatic notification sent to clients or customers that a new report is available on a given Internet Web page that is external to the client's intranet. Customers or clients normally would have to search the Internet periodically to see if a Web page has changed, and if the change is something he or she is interested in seeing. Some Web page sites that provide fee services use e-mail to notify prospective users that the new data is available. As mentioned, e-mail is slow, so if the data is also time-sensitive, the notification may not reach the customer until later in the day, when it may be of much less value.

One attempt to make the Internet more interactive has been offered by Intermind, namely a form of hypertext, called hypercommunications. In this approach, a number of directories are built at various sites, in a fashion analogized to "speed dial buttons" on ordinary telephones. When a user wishes to get information from a site connected by hypercommunications, he or she "pushes" the "speed dial" button for that site, and is automatically linked to it, through directories created by the Intermind software. This approach also allows a publisher of information to poll subscribers to see if they are able to receive. If they are, and the publisher has new data to give them, the publisher "dials" his or her "speed button," thus sending the data. This helps solve the problem of notifying the customer that new information is available.

However, making information produced internally available selectively to external business partners via the Internet is an inefficient process if done manually by each author of internal information, even with such directories. Commingling internal information with external sources of information on the same intranet is also labor intensive and inefficient if done manually, even with the "speed button" approach. This approach does not provide publication control over the data, nor indexing nor organized presentation of the data. Nor does it solve the security problem posed by allowing others to access a website without a "firewall" or similar kind of access protection.

Another option that became available to an information publisher after the advent of the Internet and Web browsers was a form of connection over the Internet that provides secure access, but usually to a more limited set of information, through a "demilitarized zone" or DMZ, using encryption and secure sockets. Since each company would want to protect the privacy of the internal data on its network, each would have a firewall around its network with a "demilitarized zone" (DMZ) outside or as part of the firewall for each other company it wished to reach. As shown in FIG. 2b, for example, Company A's DMZ D1 might be located outside its firewall F1 between the firewall F1 and Company A's gateway G1 to the Internet. Within DMZ D1, an area IC is shown as set aside for communications to and from Company C. As can be seen in FIG. 2b, the DMZ's of each company that wishes to communicate directly and securely with others must be configured to identify the intended communicants.

If a customer needs to get information from 20 different external publishing sources, it may need to make 20 different connections between its firewall and that of the publishers and obtain 20 different user identifiers and passwords. A simplified illustration of this is provided in FIG. 2. For purposes of illustration, if companies C1–C3 are competing investment banks, and companies C5 through C9 are their customers, with C4 being a news source, a greatly oversimplified network configuration is shown that uses such a DMZ configuration. Notice that bank C1 has DMZ's D4–D9 for the news source C4 and the five customers C5–C9. Customer C5 has DMZ's D1–D3 for each of the investment banks it gets data from, as well as for news source C4. As FIG. 2 shows, this approach results in a maze of connections P, and DMZ's, D. A simplified view of DMZ's is shown in FIG. 2b, where company C1 has, in its DMZ D1, an application that communications with company C3. Company C2, has, in its DMZ D2, applications C1 and C3 to communicate with company C1 and company C3, respectively.

The DMZ approach requires each customer to obtain different user identifiers and passwords to gain access to each other company's network. For each individual at each customer site, someone in the investment bank's information technology department must assign user identifiers and passwords to each. This further requires elaborate network administration and maintenance. A setup such as this, in which the customers use Web browsers to gather information from a supplier's network, is called a "pull" model, because the customers still have to actively seek out the information. To simplify the administrative tasks as much as possible, it makes sense for the information publisher to generalize the information that goes out, so that it is sent in a one-to-many, or broadcast format. In this type of approach, one publisher may organize its information in one style, while another may structure its data quite differently. Thus, it becomes extremely difficult for the clients or customers to index or cogently organize the data from 20 different publishers.

For the information provider to be more active, a "push" model of communication is desirable. That is, rather than wait for the customers to seek out information available on its network, the provider would like to be able to notify the user that the data is there and send it out automatically. Workgroup software, such as Lotus Notes, was usually thought to be the better solution for this type of intercompany transmission. Unfortunately, this usually requires a significant amount of software development as well as administrative overhead. In the example of the customer who is getting reports and data from 20 different investment banks, the information that needs to be consolidated at an employee's desktop at the customer site usually arrives in a variety of incompatible formats. If the customer wants to get morning analyses from each bank, an information specialist at the customer site will probably have to find out what format is used by each sending bank, have the customer's programmers understand the network address schemes, as well as the protocols, packets, ports and sockets to be used for each bank, and then create or modify one or more Lotus Notes workgroup application programs at the customer's employee's desktop to convert the data into an internal format and bring it in.

One attempt to address at least part of these problems is a technique known as "subject-based addressing technology" as described in U.S. Pat. No. 5,557,798 assigned to Tibco. Using this approach, and the example of the direct network to network connection via a DMZ, shown in FIG. 2a, a publisher C1 might set up a server at its site to publish information by subject. The customer C5, usually has a "client" application, in its DMZ D5. The client application denotes the set of messages to receive using human-readable subject names. Subject-based addressing can eliminate the need for the customer programmers to understand all the network address, protocol, packet, port and socket details, and even simplifies some of the modification that needs to be done to the workgroup software. However, it does not eliminate the need to configure conversion or translation layer software at the site to take a network feed, and to understand how the data that is transmitted is formatted, and the need to modify the workgroup software, such as Lotus Notes applications, accordingly. In fact, both subject-based addressing and workgroup software such as Lotus Notes usually require a significant amount of additional programming development work to be done by the users in order to work effectively.

From the information publisher's perspective, a "push" model that relies on the private network-to-network connection through firewalls, DMZ's and workgroup programs, and uses subject-based addressing still fails to address the distribution control problem that may be vital to the publisher. If the investment bank C1 of FIG. 2a provides a morning analysis as a subject, once the data crosses out of the bank's network and is disseminated over the Internet, the investment bank has usually lost all control of replication of the analysis. In most cases of subject-based addressing, the publisher will not even know which companies are consuming its information.

Even if one set of programs is written to address publication control and dissemination at one customer site, such as customer C8, (in FIG. 2a) for example, using either software such as Lotus Notes or subject-based addressing, it is not always simple or easy to adapt that set of programs to work with customer C9's network, or amongst several different customer's networks. Once it becomes desirable or necessary to send and receive information over the Internet or a wide area network linking several different corporations, dissemination control becomes a very complicated problem.

As already mentioned, it is difficult to index or organize information received from many different sources so that it can be grouped the same way on every receiver's desktop. Some profiling or "filtering" systems (such as products from Individual or Pointcast) gather data from public sources and filter or sift through them to select information tailored to an individual person's request, but these systems do not usually control replication, nor do they allow any interaction with the data. Profilers are usually one-to-many, one way distribution models that do not allow any interaction.

In corporations and large institutions with intranets, where browsers are used, individual receivers of information can organize what they see by keeping bookmarks. However, bookmarks are usually so customized that no two sets of them are likely to be identical. As with the external profiling systems, intranets using browsers and bookmarks are also usually only able to send information in one direction. A user at company C8 of FIG. 2 who gets the analysis provided by bank C1, usually cannot use a browser to comment and reply, unless a special form sheet has been created by using CGI scripting or some other programming or scripting language for that purpose for that Web page, by bank C1. Again, custom programming or scripting adds to costs and usually makes it difficult to standardize across companies.

Most intranet systems connected to the Internet today do not allow an individual user to request information by both source and subject, and most do not allow an individual user to act as both an author and a viewer of information.

As FIG. 2a illustrates, connecting consumers of information over the Internet to external information sources via DMZ's and secure sockets is complex and cumbersome, as well as costly to set up and administer for the publishers of information. From the viewpoint of the consumers of information over the Internet it should be noted that transmissions over such a distribution model occur at "Internet speed." That is to say, once a request for information leaves customer C8, for example, if it goes over the Internet it is in TCP-IP formatted packets, and possibly encrypted via secure socket technology. In any case, its speed is the average speed of the Internet transmission links, once it leaves customer C8's backbone network. This is usually much slower than the speed of transmission within the customer's own internal network. Thus, performance speed of the intercompany communications can be problematic as well, when seen from the consumer's viewpoint.

While the use of DMZ's or devices such as proxy servers help ameliorate the security problems, DMZ's also tend to create content backlogs that form bottlenecks for all intercompany communications. For example, if the only persons authorized to transfer data outside the company's firewall to its DMZ are the information technology specialists, this can become a labor intensive chore or a bottleneck or both for a company that needs or wants to send a high volume of information outside selectively. Similarly, present security technology provides various encryption options (thus creating problems for standardization amongst companies) but leaves such matters as identification up to the information technology (IT) department at each company to manage. The IT specialists must assign user identifiers and passwords to every external individual authorized to access information (authentication) in the company's DMZ. Presently this is usually done by manual letters of reference and manual data entry of each business and individual.

If, as mentioned, documents must be created using HTML, or special CGI (common gateway interface) scripts also need to be created and maintained to put data into the proper formats, all of this tends to place matters of policy and content management in the hands of IT department specialists, rather than in the hands of authors and viewers of information. IT specialists within companies are being overwhelmed by requests to add new users and individuals, administer the types of data that can be transmitted and create maintain changes and updates to the scripts, programs, networks and systems as a whole.

It is an object of this invention to provide a universal domain routing and publication control system that enables the selective transmission of valuable information in a manner that allows for control of replication and publication of the information.

It is another object of the invention to provide a system that can disseminate information selectively between disparate types of users and networks.

Still another object of the present invention is providing a system that allows users to comment on and interact with the information received.

It is another object of the present invention to minimize or eliminate the need for software development by users and information providers.

Another object of the present invention is reducing the need for special administrative procedures and specially trained personnel to manage the system.

Still another object of the present invention is providing a system that allows users to access information at the speeds of their internal networks the majority of the time.

Another object of the present invention is providing dynamic distributed network resource registries that facilitates the standardization and organization of information by subject, source or a combination of both.

SUMMARY OF THE INVENTION

These and other objects are achieved by a publication control system for networks inside the same client entity having several publication computers in communications relationship with each other inside the client entity, each of said publication computers having disks for storing a dynamic group registry and resource locators containing function names, each also having a web server program which, when executed by the publication computer, causes the publication computer to respond to resource locators by calling the function name indicated, each publication computer also has a database management program for organizing the dynamic group registry; and each publications computer has a client side communications server program, which, responds to resource locators directed to the client side communications server program and directs the database management program in organizing the dynamic group registry; the system also has a domain computer having a disk for storing a dynamic client registry and resource locators containing function names; a web server program which, when executed by the domain computer, causes the domain computer to respond to the resource locators by calling the function name indicated, the domain computer also having a database management program for organizing the dynamic client registry; a domain communications server program which, when loaded by the web server program responding to the appropriate resource locator, is executed by the domain computer, to respond to resource locators directed to the domain communications server program and to direct the database management program in organizing the dynamic client registry; a domain communications resource locator list stored in the domain computer and each publication computer that causes predetermined functions to be executed in the domain communications server; a client side communications resource locator list stored in the domain computer and each publication computer that causes predetermined functions to be executed in the client side communications server in each publication computer so that communications between the domain computer and each publication computer cause the selected functions to be executed dynamically in order to manage information communications between the domain computer and each publication computer.

It is an aspect of this invention that it allows a company to communicate securely with other firms outside its private network without requiring the use of DMZ's at any site.

It is an aspect of this invention that it provides a dynamically configurable domain routing and publication control system.

Another aspect of the present invention is that it enables users to define and implement their own policies for distribution and redistribution of information on a network.

Still another aspect of the present invention is that it does not require additional software development by users.

Yet another aspect of the present invention is that it does not require additional skilled information technology personnel to administer the system, but instead, allows users to administer it themselves.

Another aspect of the present invention is that it makes it possible for users in a private network to receive information from outside the network at the speed of the private network most of the time.

Yet another aspect of the present invention is that it gives information publishers a simple way to produce selective distributions to various clients.

BRIEF DESCRIPTION OF THE DRAWINGS

FIG. 9 is a detailed layout of an illustrative domain clients list according to the method and apparatus of the present invention.

FIG. 10 is a detailed layout of an illustrative client sources list of the present invention.

FIG. 11 is a detailed layout of an illustrative client objects list of the present invention.

FIG. 12 is a detailed layout of an illustrative object destinations list of the present invention.

FIG. 13 is a detailed layout of illustrative indexes according to the method and apparatus of the present invention.

FIG. 22 is a block diagram of an illustrative user screen display at a desktop terminal for adding a user according to the method and apparatus of the present invention.

FIG. 23 is a block diagram of an illustrative user screen display for entering a new user's account information according to the method and apparatus of the present invention.

FIG. 26d is a block diagram of an illustrative user screen display for assigning internal group access for a user according to the method and apparatus of the present invention.

FIG. 26e is a block diagram of an illustrative user screen display for assigning external group access for a user according to the method and apparatus of the present invention.

FIG. 27 is pseudo-code in SQL format illustrating the creation of a domain clients table.

FIG. 28 is pseudo-code in SQL format illustrating the creation of a client sources table.

FIG. 29 is pseudo-code in SQL format illustrating the creation of a client objects table.

FIG. 30 is pseudo-code in SQL format illustrating the creation of an object destinations table.

FIG. 31 is pseudo-code in SQL format illustrating the creation of an index table.

FIG. 31a is pseudo-code in SQL format illustrating the creation of a channels table.

FIG. 31b is pseudo-code in SQL format illustrating the creation of a channel content table.

FIG. 31c is pseudo-code in SQL format illustrating the creation of a channel templates table.

FIG. 32a is pseudo-code in SQL format illustrating the creation of a workgroup table 70.

FIG. 32b is pseudo-code in SQL format illustrating the creation of a workgroup content table FIG. 33 is pseudo-code in SQL format illustrating the creation of a workgroup base content table.

FIG. 34 is pseudo-code in SQL format illustrating the creation of a workgroup master list table.

FIG. 35 is pseudo-code in SQL format illustrating the creation of a workgroup ad hoc content table.

FIG. 36 is pseudo-code in SQL format illustrating the creation of a workgroup author members table.

FIG. 37 is pseudo-code in SQL format illustrating the creation of a workgroup view members table.

FIG. 38 is pseudo-code in SQL format illustrating the creation of and address book table.

FIG. 39 is pseudo-code in SQL format illustrating the creation of an author rights table.

FIG. 40 is pseudo-code in SQL format illustrating the creation of a viewers table FIG. 41 is pseudo-code in SQL format illustrating the creation of a workgroup content list attributes table.

FIG. 42 is pseudo-code in SQL format illustrating the creation of a workgroup content list criteria table.

FIG. 43 is pseudo-code in SQL format illustrating the creation of a client server administrative messages table.

FIG. 44 is pseudo-code in SQL format illustrating the creation of a client server content table.

FIG. 45 is pseudo-code in SQL format illustrating the creation of a client server content base table.

FIG. 46 is pseudo-code in SQL format illustrating the creation of a client server ad hoc content table.

FIG. 47 is pseudo-code in SQL format illustrating the creation of a client server distribution queue table.

FIG. 47a is pseudo-code in SQL format illustrating the creation of a client server replication queue table.

FIG. 47b is pseudo-code in SQL format illustrating the creation of a client server replication destinations queue table.

DETAILED DESCRIPTION OF THE INVENTION

Figure 1:
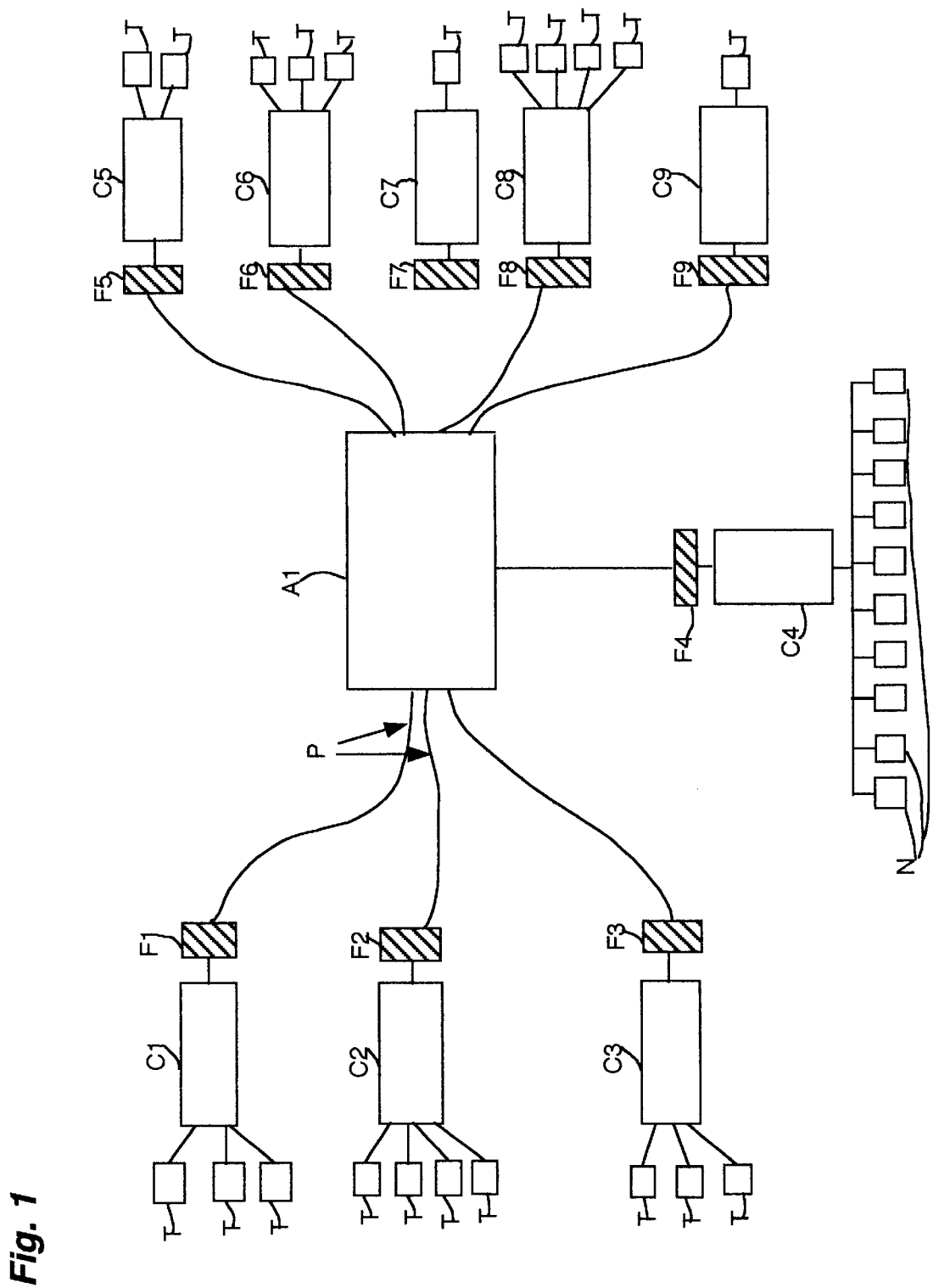
FIG. 1 shows a schematic diagram of the present invention showing a domain communications server and several client side communications servers.

FIG. 1 shows a preferred embodiment of the present invention in a schematic block diagram. A domain communications server A1, is in communication with a number of client side communications servers C1 through C9. Each of these client side communications servers is located behind the firewall F, of its respective corporate site in a preferred embodiment. That is, assume Company C-One has a client side communications server C1, Company C-Two has a client side communications server C2, and so on, through Company C-Nine. Temporary logical connections or "pipes" P are made between each client side communications server in this domain and the domain communications server A1. In a preferred embodiment, pipes P are connections formed over the Internet using conventional TCP-IP networking protocol and Netscape Corporation's secure sockets with encryption technology. However, as will be apparent to those skilled in the art, other networks and protocols and encryption techniques could be used as well.

Still in FIG. 1, it can be seen that each client side communications server C has only one actual communications pipe P with domain communications server A1. Yet, depending on the way in which each client is registered with domain communications server A1, information may be disseminated from client side communications server C1 to any or all of the other client side communications servers C2 through C9. Thus, the present invention creates an intelligent extranet that links the community of companies C-One through C-Nine together over a network by means of domain communications server A1.

The intelligent extranet that is created by the present invention allows each member client C to communicate with those companies or institutions external to it (which have authorized communicating with C) as though the other company were a part of the client's own internal network or intranet. In this sense, the invention creates a virtual community of corporate intranets.

To use a more specific example where the community of companies is in the financial industry, if C1, C2 and C3 are client side communications servers for three different investment banks, and C5 through C9 are client side communications servers for investment management firms, while C4 is the client side communications server for a news broadcast organization, the investment bank at client side communication server C1 is able, by communicating directly only with domain server A1, to send information to any of the others in communication with domain communications server A1. That is, if it wishes, the bank C-One at client side communications server C1 can send its morning analysis reports only to client side communications servers C5 through C9, at customers C-Five through C-Nine, while the news broadcast organization, C-Four, may broadcast its information to all the other client side communications servers communicating with domain communications server A1. Thus, a preferred embodiment of the present invention also works as a relationship information manager for the participating companies or entities in this community. The present invention thus allows the customers of investment bank C-One to receive valuable information in a timely way from a trusted advisor over a secure connection.

Figure 1A:
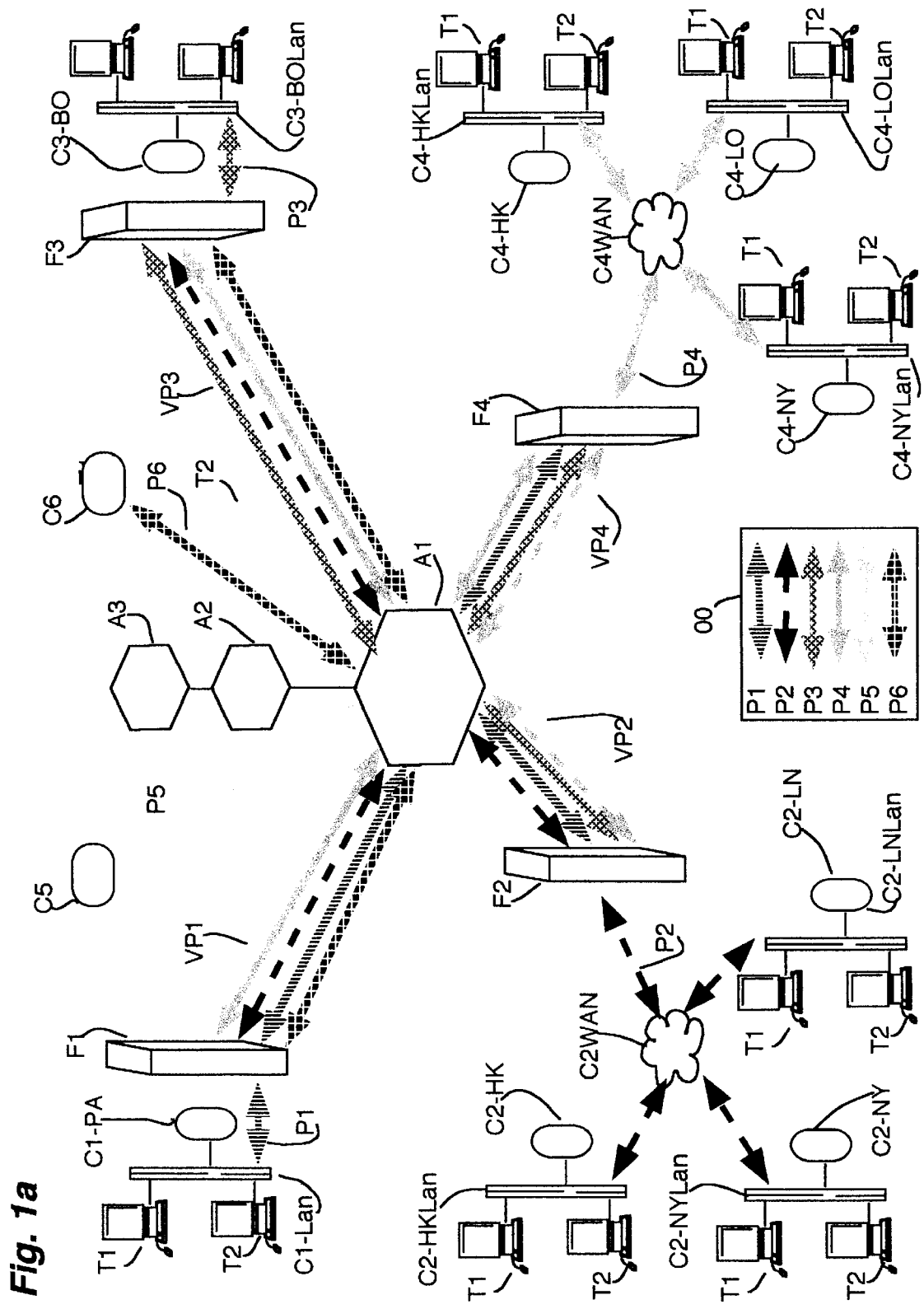
FIG. 1a is an alternative schematic diagram of the present invention showing virtual connections between a domain communications server and several client side communications servers.
Figure 2A:
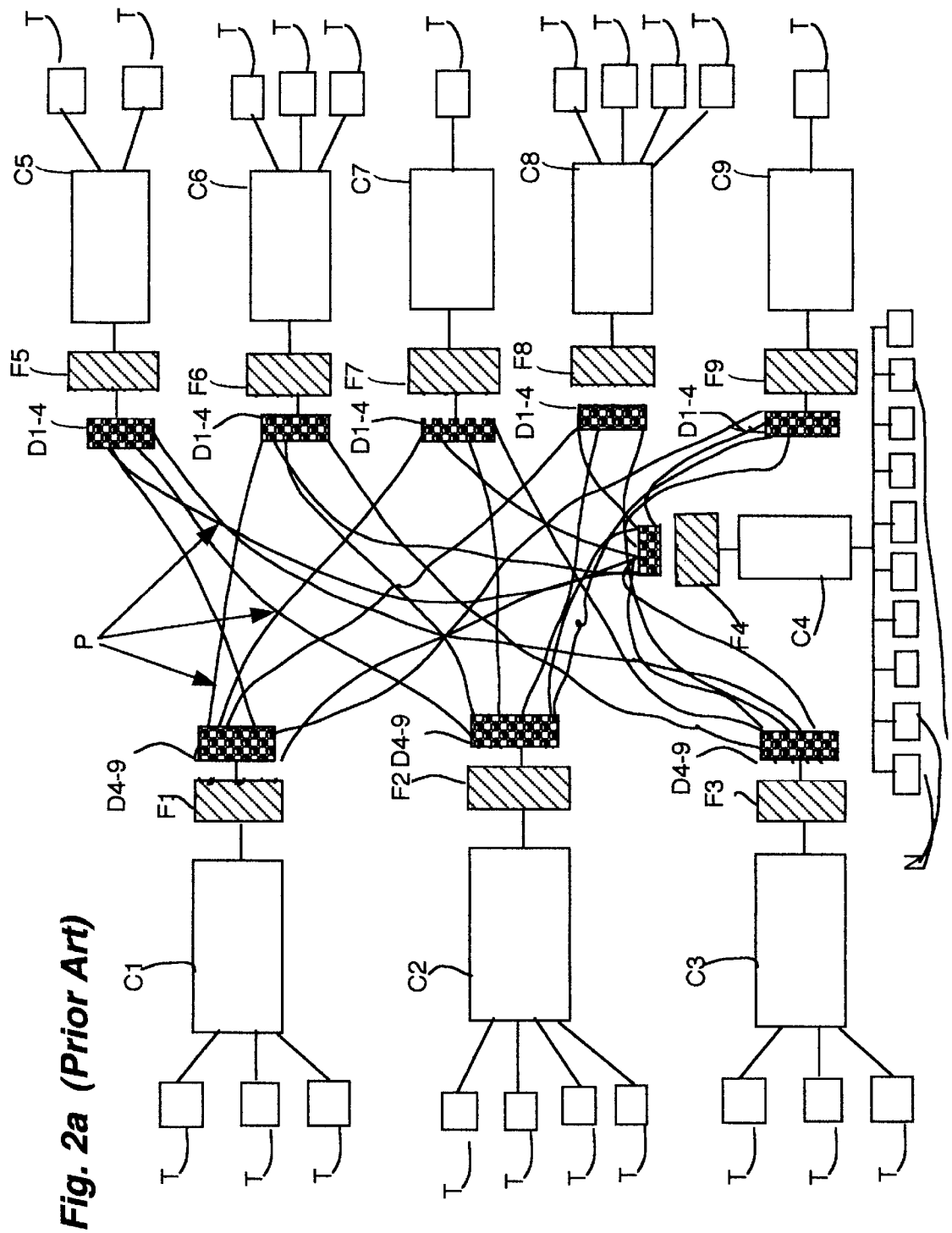
FIG. 2a is a schematic diagram of private networks communicating externally over the Internet using prior art.
Figure 2B:
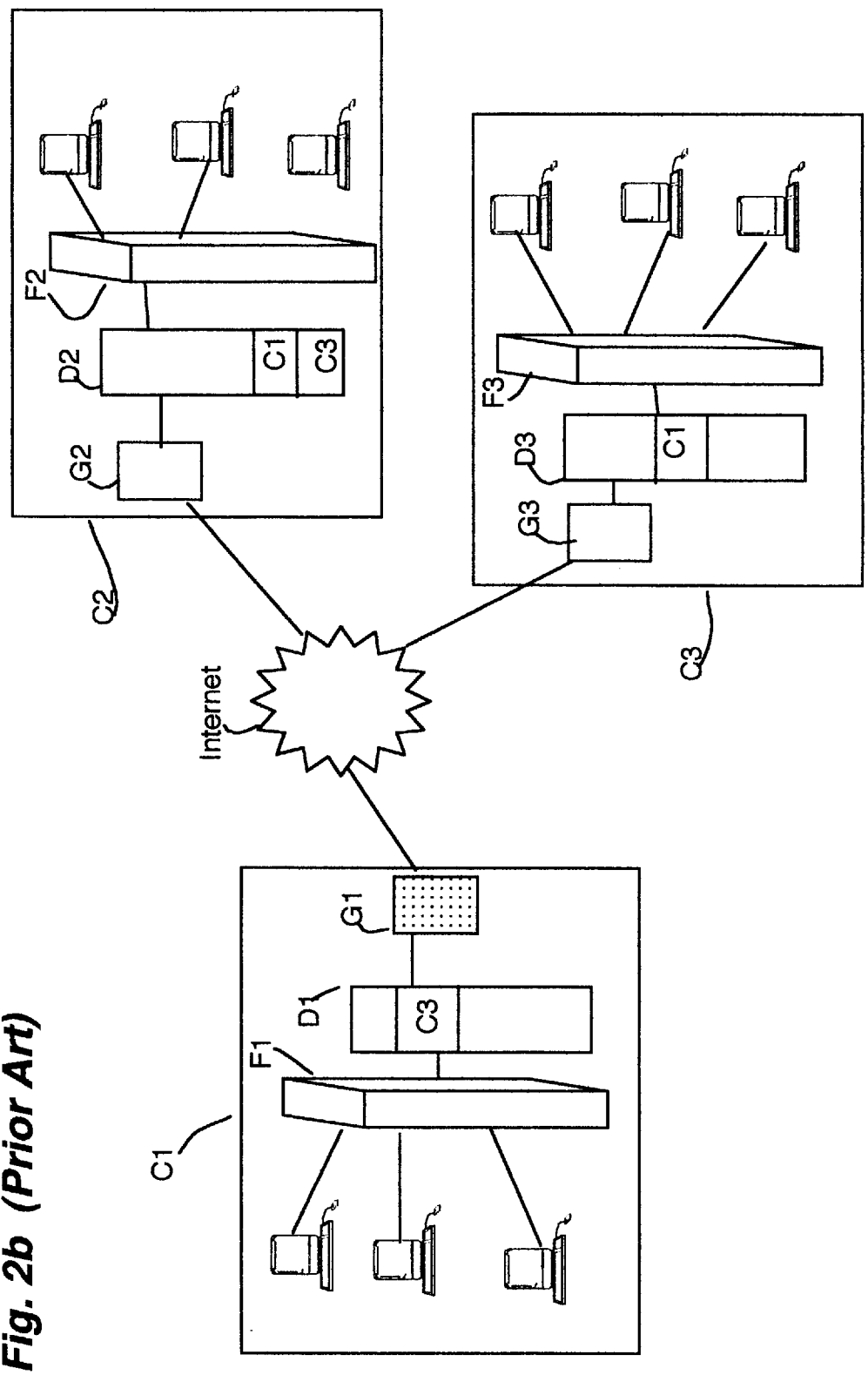
FIG. 2b is a schematic diagram of private networks communication externally over the Internet using prior art.

Turning to FIG. 1a, some of the types of communications possible are illustrated. In this example, 4 different clients are shown, C1 through C4. Client C1 might be an investment bank located in Pennsylvania, USA, with only one client side communications server C1-PA acting as its "smart intranet," according to the method and apparatus of the present invention. Client side communications server C1-PA is connected to the bank's internal Local Area Network C1-Lan, which also includes two terminals, T1 and T2.

As will be apparent to those skilled in the art, a terminal T could be any type of device capable of connecting to a network, such as a computer, a mini-computer, a workstation, a personal computer, a CRT terminal with keyboard, an internet-equipped television terminal, a keyboard or touch screen and display device, a personal digital assistant, or any device that allows a user to communicate with a network and see information displayed. In a preferred embodiment, a personal computer capable of being connected to a network is used, together with standard Web browser software executing in the personal computer.

In a preferred embodiment, the term "smart intranet" describes the way the present invention enables a company's internal network—its "intranet"—to perform information management (production, access and replication of information), on a one to one, group to group and site to site basis both inside the company as well as with participating companies external to it.

Still in FIG. 1a, client C2 might be an investment bank C2 that has offices in Hong Kong, New York and London, all connected with each other through the bank's wide area network C2WAN to form an internal network. The bank's entire network is shielded from external intrusion by firewall F2. Each of investment bank C2's sites at Hong Kong, New York and London has its own Local Area Network—C2-HKLan in Hong Kong, C2-NYLan in New York, and C2-LNLan in London, with terminals T using standard commercially available Web browsers also connected at each Local Area Network.

As shown in FIG. 1a, each site of client C2 has a client side communications server (C2-HK, C2-NY, C2-LN) connected to its Local Area Network, and thus to client C2's Wide Area Network, C2WAN, forming for client C2 a smart intranet, according to the method and apparatus of the present invention.

Similarly, client C4 has multiple sites connected by a Wide Area Network behind a firewall to form its smart intranet, while client C3 has only one site, its Boston location, in communication with domain communications server A1 as its smart intranet.

Still in FIG. 1a, it can be seen that logical or virtual flow of smart intranet communications at client C2 are shown by the dotted line "pipes" P2 connecting each LAN inside client C2. The term pipes is used here to denote a logical connection managed through software, not necessarily a physical one created by hardware. As will be apparent to those skilled in the art, there are many ways in which the Local Area Networks within a client can be physically connected to each other over a Wide Area Network to form an internal network.

In a preferred embodiment of the present invention, as shown in FIG. 1a these logical internal connecting pipes P2 also exist outside client C2, and extend to domain communications server A1, and through it, to clients C1 and C3, but not to client C4. That is to say, in a preferred embodiment of the present invention, a client such as client C2 can communicate logically (through the present invention) with designated external sites as though they were internal to it or part of its own smart intranet and vice-versa. Yet Client C2 has not lost any of the protections afforded by its firewall F2, since client C2 makes no physical connection with any of these external sites except domain communications server A1. In a preferred embodiment, all physical transmissions between client C2 and domain communications server A1 take place over the Internet using Netscape Corporation's Secure Socket Layer (SSL) technologies and encryption.

Still in FIG. 1a, it can be seen that each client C, has its own "pipe" P, ranging from P1 through P6, as indicated in the legend 00. For example, the three sites at client C2 communicate with each other internally over "pipe" P2. In a preferred embodiment of the present invention, client C2 also seems to communicate over pipe P2 with clients C1, C3, and C5 while, in fact, client C2 has only one actual pipe connecting it to domain communications server A1. As will be apparent to those skilled in the art, this single pipe between client C2's network and domain communications server A1 could also be implemented as a direct physical connection, if desired, using T1 or T3 high speed lines. The present invention allows client C2 to communicate externally with clients C1, C3 and C5 through domain communications server A1 over a set of "virtual pipes" VP2. The term virtual pipe is used here to indicate that communication occurs as it would if two (or more) clients were in direct communication with each other over the Internet (or other network), when, in fact, each client is communicating physically only with a domain communications server and is only in "virtual" communication with the other clients or firms. The virtual pipes are created and managed dynamically by the logic of the present invention's domain communications server working with the client side communications servers at each site. Hence the term, intelligent extranet.

Still in FIG. 1a, note that domain communications server A1 acts as the primary domain communications server for the clients shown, but is also connected to regional or alternate domain communications servers A2 and A3. Consequently, if the computer systems or the physical communication links to the primary domain communications server A1 should fail for any reason, in a preferred embodiment of the present invention, communications can continue through use of an alternate domain communications server A2 or A3. In a preferred embodiment of the present invention, domain servers keep each other up to date by automatic replication of all relevant tables and data, thus acting as mirrors to each other.

As will be apparent to those skilled in the art, different domains could also be linked to each other by having a hyper or super domain communications server that maps a community of domain communications servers together. Similarly, the domain routing of the present invention can also be used internally to create additional domain communications servers to offload workloads from each other in large internal networks. For example, companies having client side communications servers at several locations in the US and in Europe, might choose to have the European client side communications servers connect to a domain communications server in Europe which is mapped into a corporate domain communications server in the US, which, in turn, might be mapped into external domain communications servers as described above. Using domain communications servers internally to offload work can improve the response time and throughput throughout the network.

Figure 3:
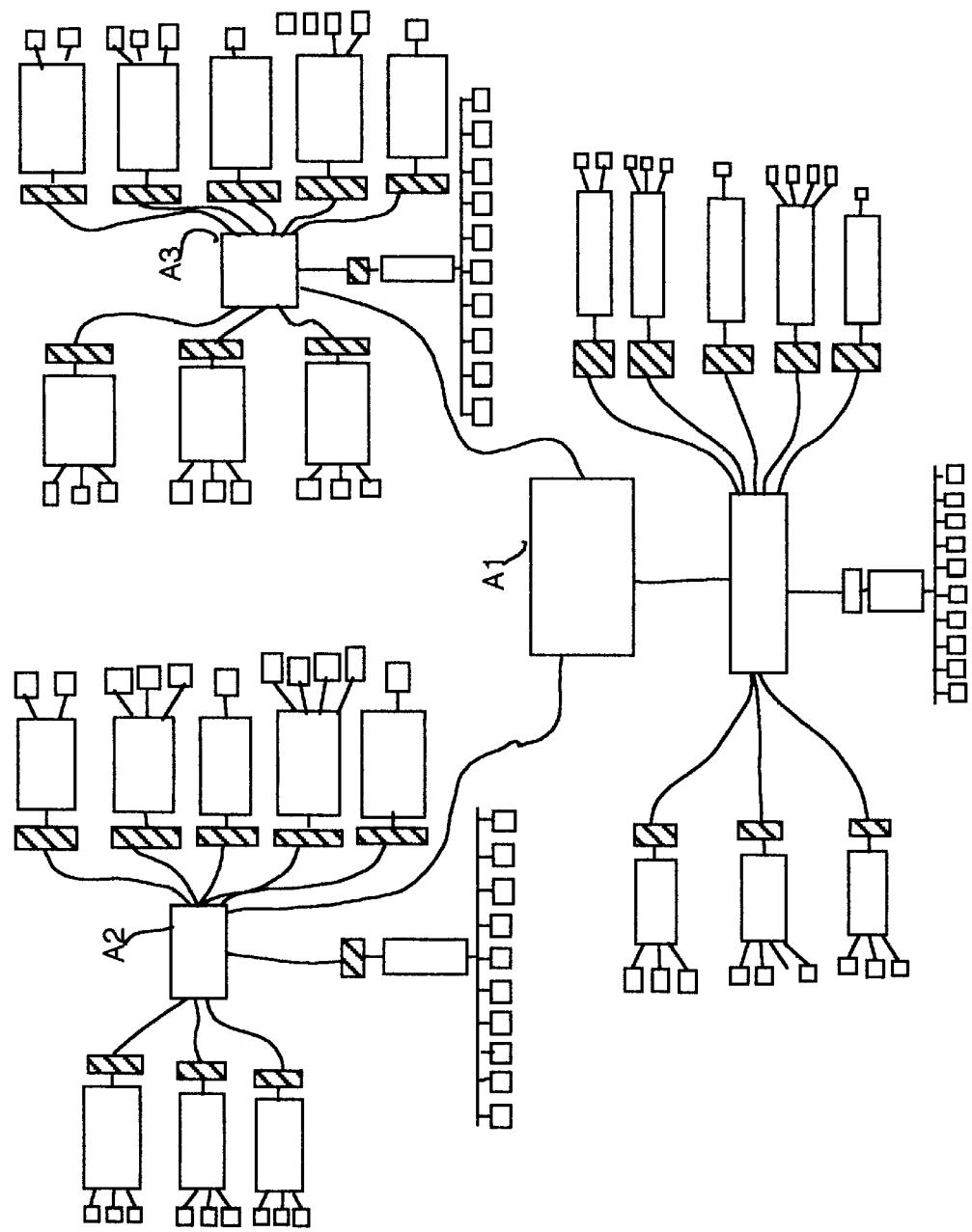
FIG. 3 is a schematic diagram of the present invention showing several domains in communication with each other.

Turning now to FIG. 3, multiple connections of domain communications servers are shown. Here domain communications server A1, which may be acting as the primary domain communications server for a network of clients, can also be an alternate domain communications server for the networks controlled by domain communications servers A2 or A3 or both. Alternatively, domain communications servers A2 and A3 might be regional domain communications servers for a single network controlled by domain communications server A1.

Figure 4:
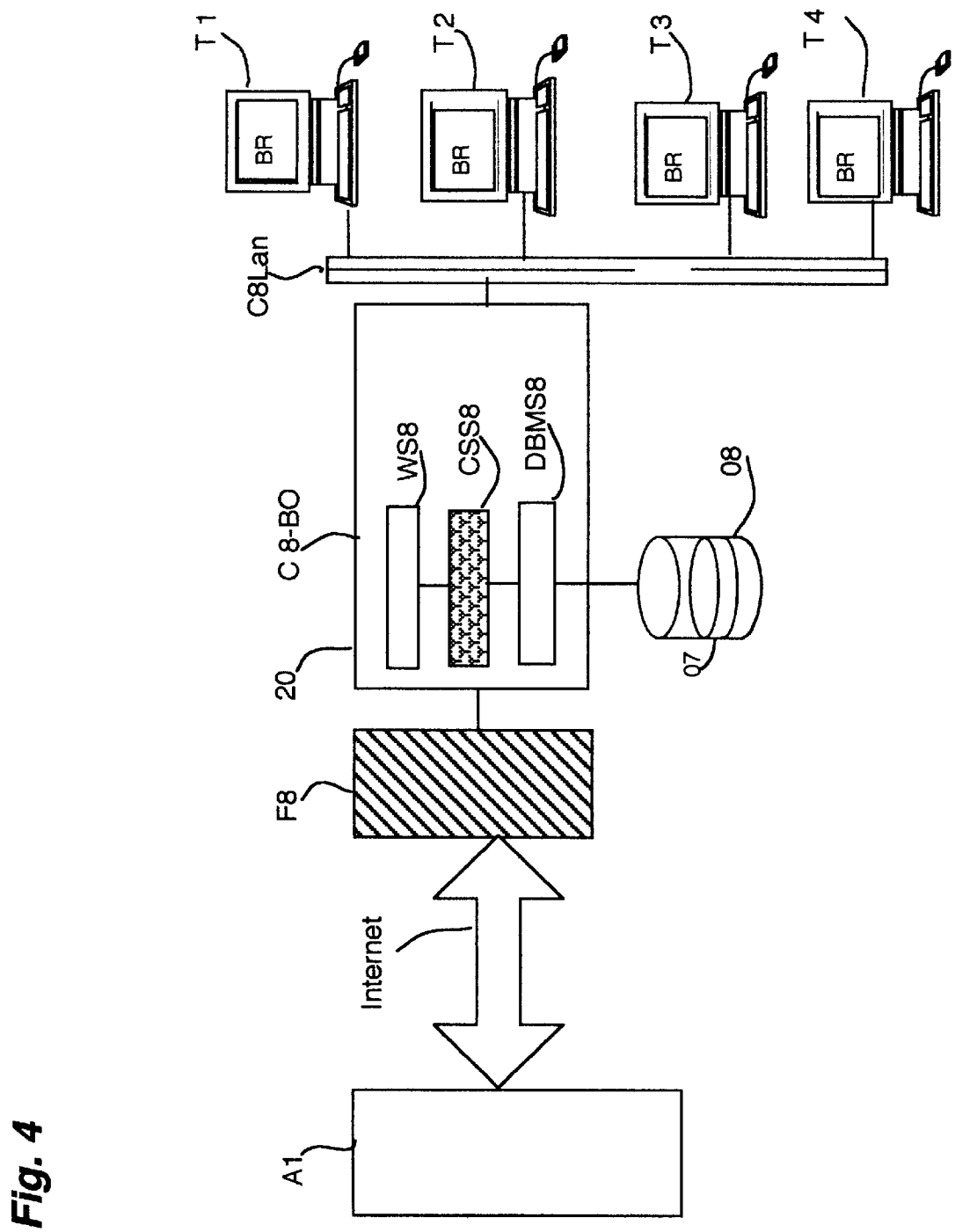
FIG. 4 is a schematic diagram of a client side communications server according to the method and apparatus of the present invention.

With reference now to FIG. 4, a preferred embodiment of the present invention is depicted schematically. As shown in FIG. 4, at a client C8's Boston location, C8-BO, a computer 20 is shown connected to domain communications server A1 from behind firewall F8, and also to client C8's Local Area Network C8Lan. In a preferred embodiment of the present invention, America Online Corporation's standard Webserver software WS, known as AOLserver TM is installed at computer 20 to handle TCP-IP communication protocols between computer 20, firewall F8, and the Internet as well as client requests from the browsers BR on the terminals T1–T4.

As will be apparent to those skilled in the art, any Webserver software or similar program that handles general communications protocols and transport layer activities could be used as appropriate for the network protocol in use. Similarly, database management software DBMS, DBMS8 in this example, is used to store and maintain a client side dynamic group registry 07 located on local electronic storage media such as disk 08 connected to computer 20. In a preferred embodiment, the Illustra™ object-oriented relational database software supplied by Informix Corporation is used, since this allows the use of object-oriented relational technology. However, as will be apparent to those skilled in the art, any commercially available database management software could be used to store and maintain data in client side dynamic group registry 07 stored on disk 08. Similarly, any of a number of electronic storage media could be used instead of disks. For example, in computers having sufficient random access memory, internal memory could be used as the electronic storage media.

Still in FIG. 4, a client side communications server CSS, here CSS8, is shown executing on computer 20 at client C8's Boston site. In a preferred embodiment, a client side communications server CSS is used at each customer or client's site to serve all content produced internally, by the client, and also to handle reception of all content distributed from outside the client but within the domain served by domain communications server A1. A client side communications server for a given customer may be made up of more than one server executing on other computers 20, but, in a preferred embodiment, each server for that given client uses replication to insure that the appropriate authorized information at each site is the same. Note that each customer is not necessarily authorized to have access to all the content in the domain. In fact, the present invention is specifically designed so that access to content throughout the domain can be directed and controlled. Also in a preferred embodiment a client side communications server CSS for a given customer must use a domain communications server to communicate with other customers that are external to it.

Figure 5:
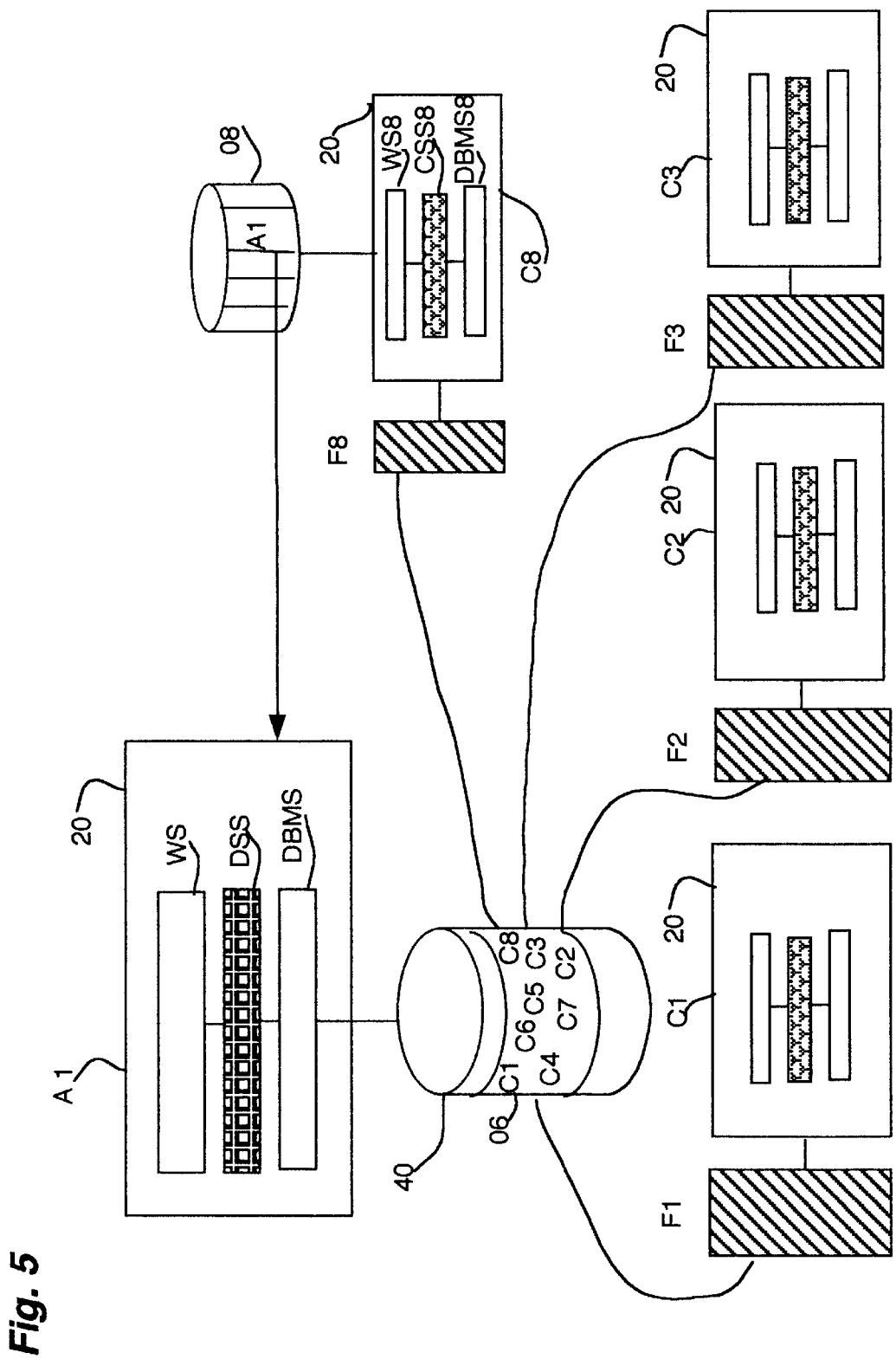
FIG. 5 is a schematic diagram showing illustrative interconnections between a domain communications server and several client side communications servers according to the method and apparatus of the present invention.

Referring now to FIG. 5, a schematic diagram of several clients in communication with a domain communications server A1 is shown. As can be seen, client C8 has the address of domain communications server A1 on local disk 08 coupled to client C8's computer 20, in which client side communications server software CSS8 is executing. Note also in FIG. 5 that domain communications server A1 includes a computer 20, and a local storage media, in this case, disk 40, having a dynamic client registry 06 stored in it. Also at domain communications server A1 it can be seen that a conventional Webserver WS is executing in computer 20, together with a conventional database management program DBMS. In a preferred embodiment of the present invention, domain communications server software DSS also executes in cooperation with Webserver WS and database software DBMS. It can be seen that domain communications server software DSS maintains a list of all clients, C1–C8, in this case, that are part of this domain in dynamic client registry 06 on disk 40.

In a preferred embodiment, web server WS is the AOLserver product from America Online, as it also allows the use of object-oriented technology. In open systems, such as Unix and similar operating systems, shared objects can be created in the C++ language. In the C++ programming language, a shared object is simply compiled code. AOLServer has the ability to dynamically initialize shared objects from URL's registered with the web server WS, so that those shared objects have callbacks. Which shared object to load is specified within an initialization file used when starting AOLServer's NSD process (the executable form of the AOLserver.)

Similarly, the DBMS software used by domain communications server A1 in a preferred embodiment is the Illustra software mentioned above. Also in preferred embodiments, computers used as either domain communications servers or client side communications servers can be any of a number of commercially available types, from mainframes to minicomputers to workstations or personal computers. Preferred embodiments of the present invention are designed to work with a number of existing installations as "middleware"— meaning software that does not replace or substitute for the existing operating system software or the typical basic communications software. Nor is it a substitute for applications software, such as the web browser. Instead, it works in the "middle."

In a preferred embodiment, the nature and extent of a domain can be determined by several different factors. Since, as shown in FIG. 5, the domain communications server can connect the intranets of several different companies or institutions in ways that allow them to operate together very closely, it is anticipated that one company might operate the domain communications servers for an industry segment, while the companies that are part of that segment would have their own client side communications servers. In FIG. 5, for example, domain communications server A1 might be a computer system for the investment banking industry segment of the financial industry, located at applicant's Assignee's corporate headquarters, while clients C1–C8 might be investment banks and investment management firms.

As will be apparent to those skilled in the art, however, the industry segment might be law or automotive manufacturing or pharmaceuticals, or any of a number of other major or minor industry segments. If the industry segment is automotive, for example, domain communications server A1 might be operated by a service company, so that automobile manufacturers might be able to communicate closely with suppliers and dealers. Still using FIG. 5, in this example, clients C1 and C2 might be competing automobile manufacturers and clients C3–C5 might be major parts suppliers, while clients C6–C8 might be dealers. In a preferred embodiment of the present invention, manufacturer C1 could communicate closely with suppliers C3, C4 and C5, in a secure fashion, while manufacturer C2, its competitor, is also communicating closely with them, as well.

Still in FIG. 5, in a preferred embodiment of the present invention, it should be noted that domain communications server A1 and client side communications servers C1–C8 can each start up and shut down independently of each other. For example, the computer 20 which is part of domain communications server A1 might be booted (started up) by itself, without any communication with the client side communications server. When that happens, domain communications server A1 initializes itself and checks to see if there are any messages for it. If not, it will wait until one is received. Each of the client side communications servers C1–C8, may have their computers boot at different times, too. For example, if client side communications server C8's computer 20 is booted before domain communications server A1's computer is booted, client side communications server C8 initializes itself, and attempts to register itself with domain communications server A1, by sending messages containing the appropriate Uniform Resource Locator(s) (URL(s)) described below, for registration to domain communications server A1. If domain communications server A1 has not yet been booted, these messages will be queued by client side communications server C8 and sent again later, in a preferred embodiment. As will be apparent to those skilled in the art, the registration messages could simply be regenerated at intervals, instead of queued.

In a preferred embodiment, the URLs sent by the client side communications server and by the domain communications servers usually contain at least the name of a function to be performed by the recipient, such as registration, in this case. In many cases they also point to or include an object.

Also in a preferred embodiment, client side communications servers that are in the same firm or client can communicate with each other, even if the domain communications server A1 normally used by that client is not active. Returning briefly to FIG. 1a, to illustrate this, for client C2, client side communications servers C2-HK, C2-NY and C2-LN can all communicate with each other inside client C2's Wide Area Network C2WAN even when domain communications server A1 is not yet operational.

That is, internal users and groups that have been established according to the method and apparatus of the present invention and authorized to create and view content can communicate with each other using the present invention and its organizing and indexing features even when domain communications server A1 is offline or down. Messages that would normally have been sent by the client side communications servers at client C2 to domain communications server A1 are queued and sent whenever domain communications server A1 is started up. As will be apparent to those skilled in the art, other methods of providing for the communication between the client side communications servers and the domain communications server could be used, if desired, such as requiring the domain communications server to be operational before the client side communications servers are allowed to communicate with each other.

"Client side communication server startup

Figure 14:
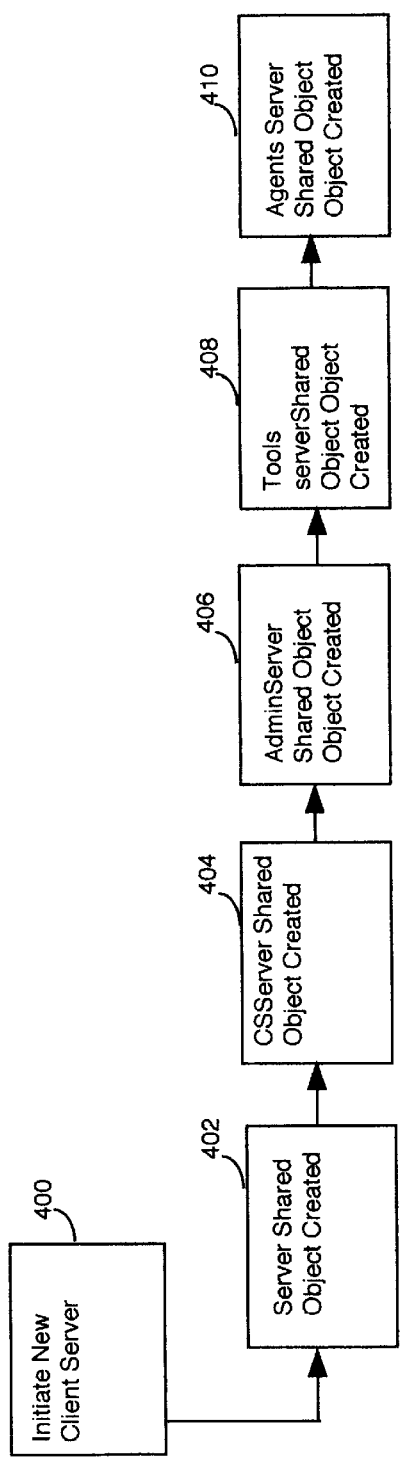
FIG. 14 is a flow diagram of startup procedures in a client side communications server according to the method and apparatus of the present invention.
Figure 15:
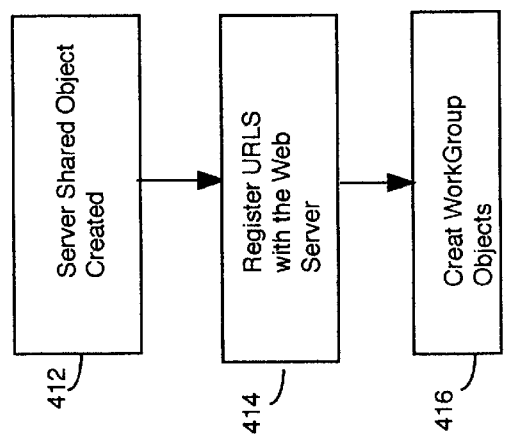
FIG. 15 is a flow diagram of initialization of shared objects by a client side communications server according to the method and apparatus of the present invention.

Turning now to FIG. 14, an overview flow diagram of the initialization of a client side communications server is shown. At step 400, the user initates the startup of a new client side communications server. At step 402 a server shared object is created, followed by client side server shared objects, admin server shared objects, tools server shared objects and agent server shared objects as created in steps 404, 406, 408, and 410, respectively. Once the shared objects have been created as shown in Step 412 of FIG. 15, processing continues. In FIG. 15, at step 414 the URL's used by the client side communications server (the principal ones of which are listed in FIG. 8b) are registered with web server WS. Next, workgroup objects are created at step 416.

Figure 16:
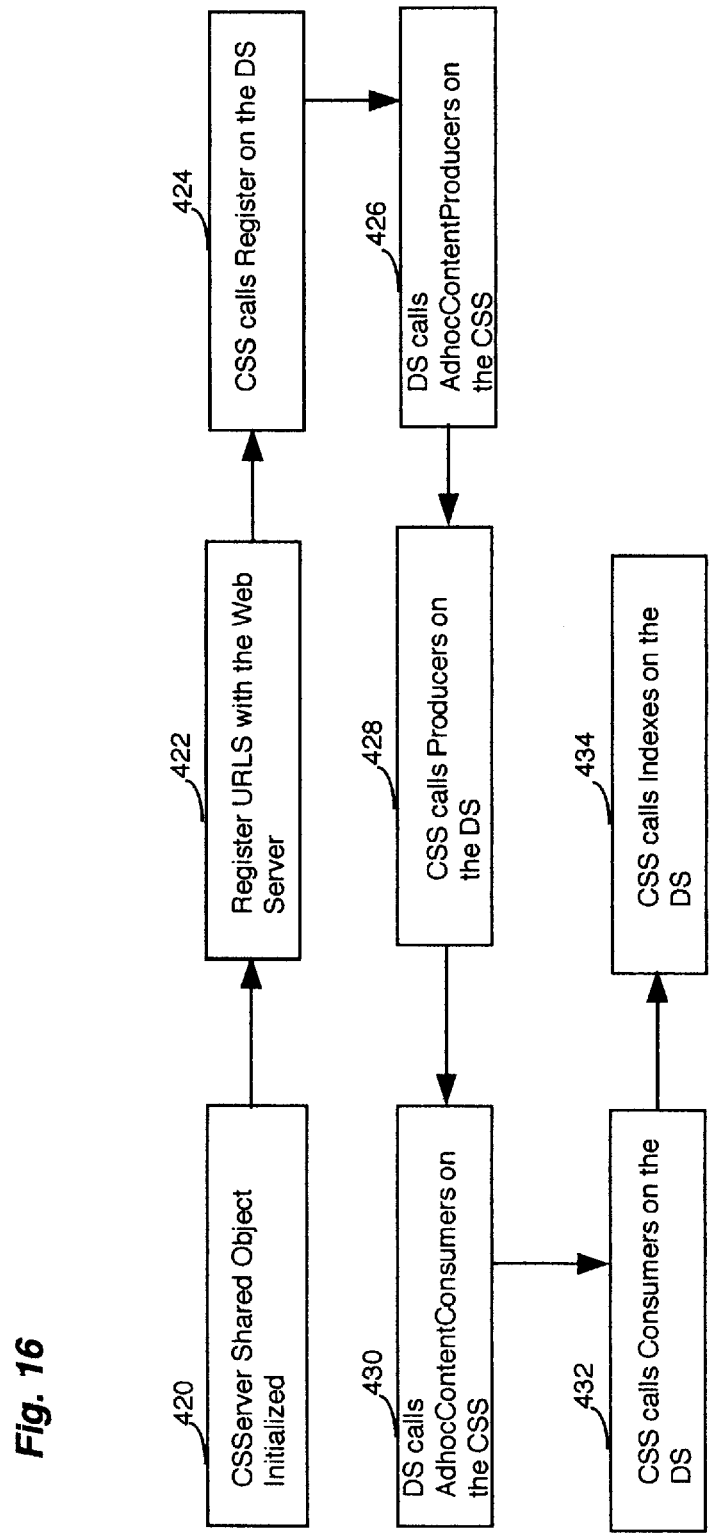
FIG. 16 is a more detailed flow diagram of initialization of shared objects by the client side communications server according to the method and apparatus of the present invention.
Figure 19:
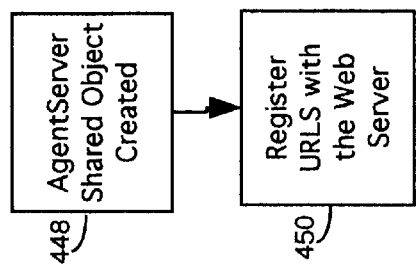
FIG. 19 is a flow diagram showing shared object initialization by the agent server of the client side communications server according to the method and apparatus of the present invention.
Figure 17:
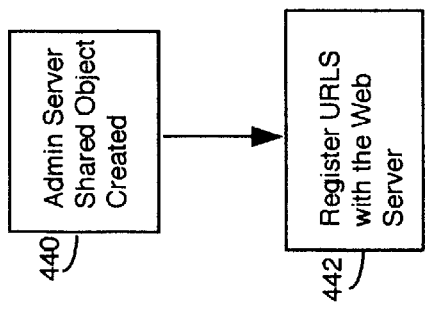
FIG. 17 is a flow diagram showing shared object initialization by the admin server of the client side communications server according to the method and apparatus of the present invention.
Figure 18:
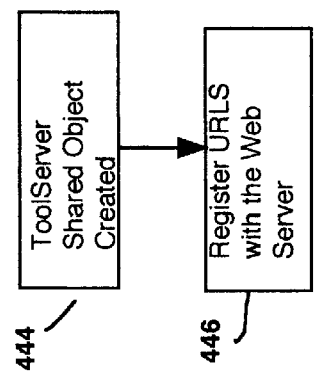
FIG. 18 is a flow diagram showing shared object initialization by the tool server of the client side communications server according to the method and apparatus of the present invention.

Another view of this is shown in the flow diagram of FIG. 16. As seen there, at step 420, a client side communications server is initialized, then, at step 422, it registers its URLS with the web server WS executing on its computer 20. At step 424 the client side communications server calls the Register function on the domain communications server. At step 426, the domain communications server calls the adhocContentProducers functions on the client side communications server, and then, at step 428, the client side communications server calls the Producers function on the domain server. Next, at step 430, the domain communications server calls the adhocContentConsumers function on the client side communications server, and finally, the client side communications server calls the indexes function on the domain communications server.

Domain communications server startup

Figure 20A:
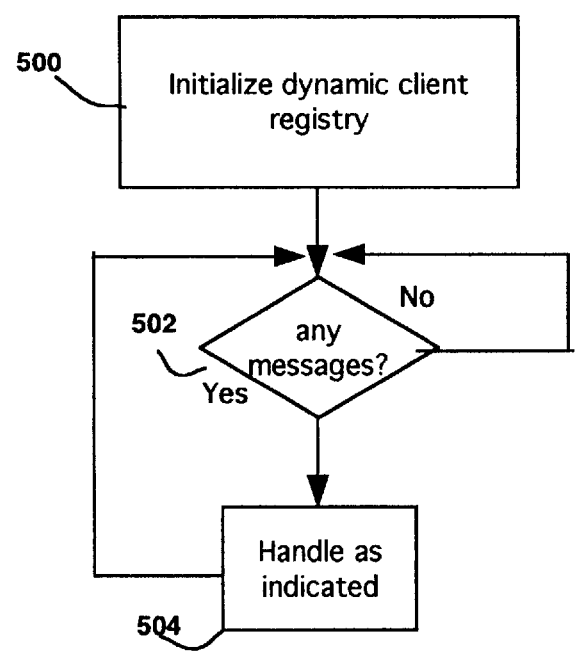
FIG. 20a is a flow diagram showing the initialization of the dynamic client registry by the domain communications server according to the method and apparatus of the present invention.

With reference now to FIG. 20a, a very simplified overview of the initialization of the domain communications server is shown (more detail is provided below.) At step 500, the domain communications server initializes itself and the dynamic client registry 06. Next, the domain communications server checks, at step 502 to see if there are any messages (such as requests to register coming from a client side communications server). If there are no messages, the domain communications server could wait until there is some activity. (As will be seen below, in a preferred embodiment, the domain communications server actually checks periodically to see if client side communications servers are still active.)

Still in FIG. 20a, if a message has come in, such as a request from a client side communications server to register itself with the domain communications server, the domain communications server handles the message at step 504, in the manner indicated by the message itself, as described in more detail below.

Client side communications server dynamic group registry

Figure 20B:
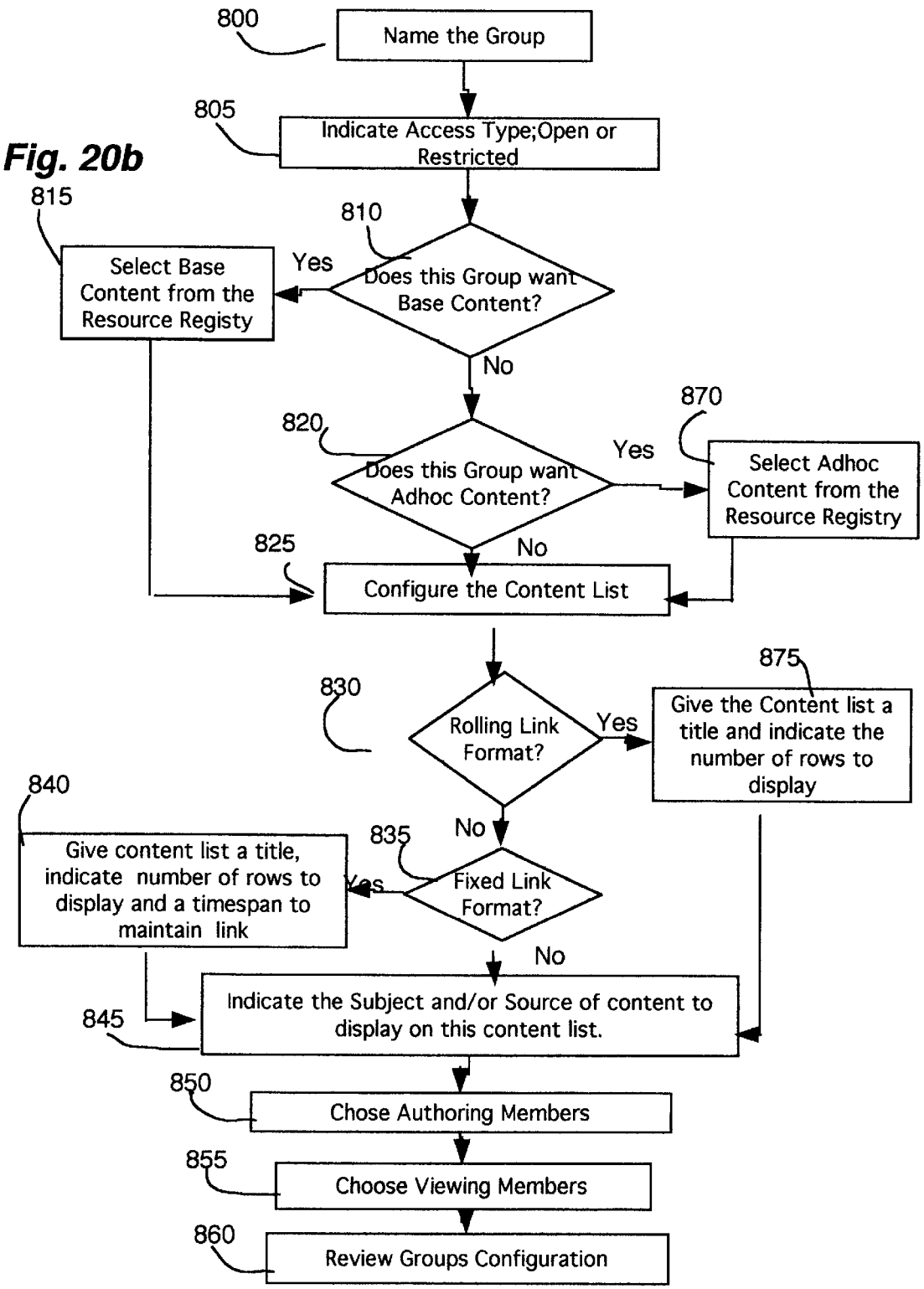
FIG. 20b is a flow diagram showing the creation of a group by the client side communications server according to the method and apparatus of the present invention.

Referring now to FIG. 20b, a flow diagram depicting the process used by a client side communications server to initialize or update the dynamic group registry 07 is shown. Starting at step 800, a user would give the group to be entered into group registry 07 a name, then, at step 805, indicate whether the access type for this group is to be common or restricted (these terms will be described in more detail below.) Next, at step 810, the client side communications server checks to see whether this group will want base content (identified by subject), in which case at step 815 base content is selected, or adhoc content (identified by source) in which case adhoc content will be selected. As described in more detail below, other types of content are also used in a preferred embodiment—mixed content and nondecoupleable mixed content, as well as system content. Processing for these is similar. As will be apparent to those skilled in the art, content can be grouped in any of a number of ways without deviating from the spirit of the present invention.

Still in FIG. 20b at step 825, the client side communications server configures a content list. In one preferred embodiment, the client side communications server next checks to see, at step 830, whether a rolling link format is desired or a fixed link one, and at steps 875 or 840 update the content list to list a title and indicate the number of rows to display according to the format. Then, at step 845, the user indicates the subject and/or the source of the content to be displayed on this content list in this group in dynamic group registry 07. At Step 850, the user chooses the authoring members, at step 855 the viewing members and finally, at step 860, the user can review the group's configuration.

Figure 21:
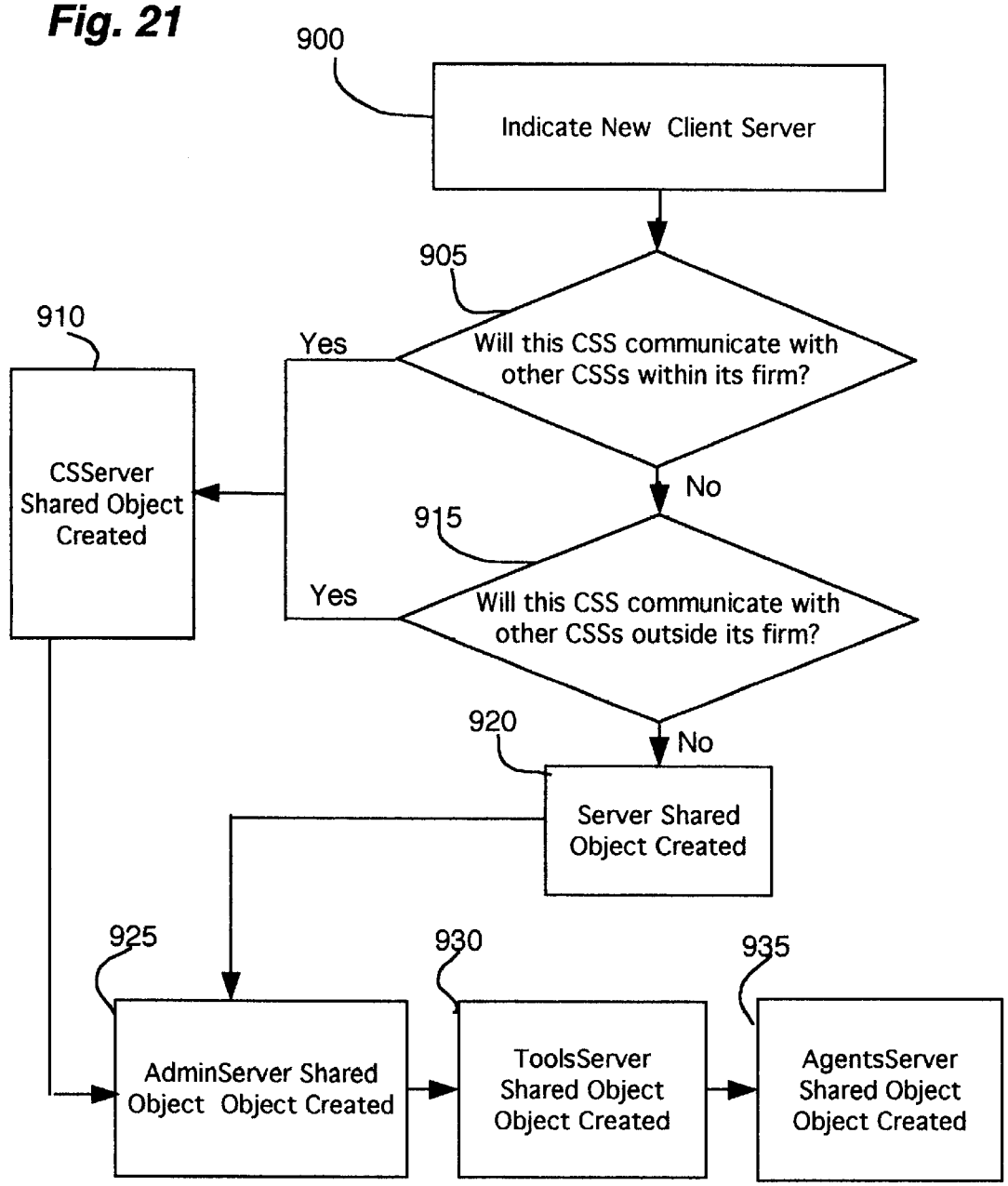
FIG. 21 is a flow diagram showing the initialization of a client side communication server according to the method and apparatus of the present invention.

FIG. 21 is a flow diagram showing how the client side communications server determines whether to create client side communications server shared objects (compiled C++ code) to communicate with other client side communications servers either inside (see steps 905 and 910) or outside (see steps 915 and 910) its own firm.

FIGS. 22 through 26 are block diagrams of the interactive screen displays created by the present invention for use by a browser BR at a terminal. These figures are illustrative of the steps described above to create groups on the dynamic group registry 07 in a preferred embodiment of the present invention. FIG. 22, for example, shows how a user might enter a new user's name, and FIG. 23 illustrates how account information specific to that user can be entered, such as username, and so on.

Figure 24:
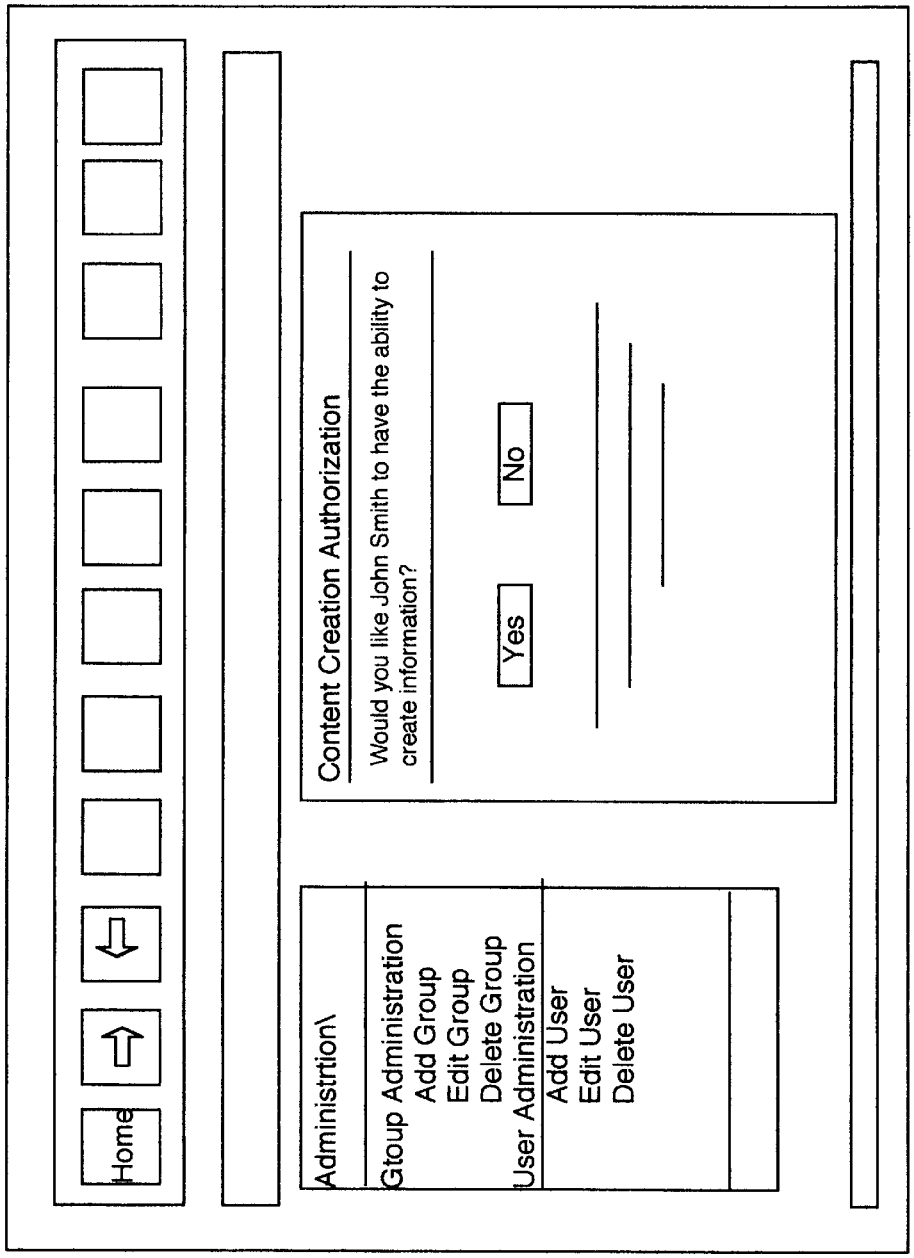
FIG. 24 is a block diagram of an illustrative user screen display for authorizing content creation for a new user according to the method and apparatus of the present invention.
Figure 25A:
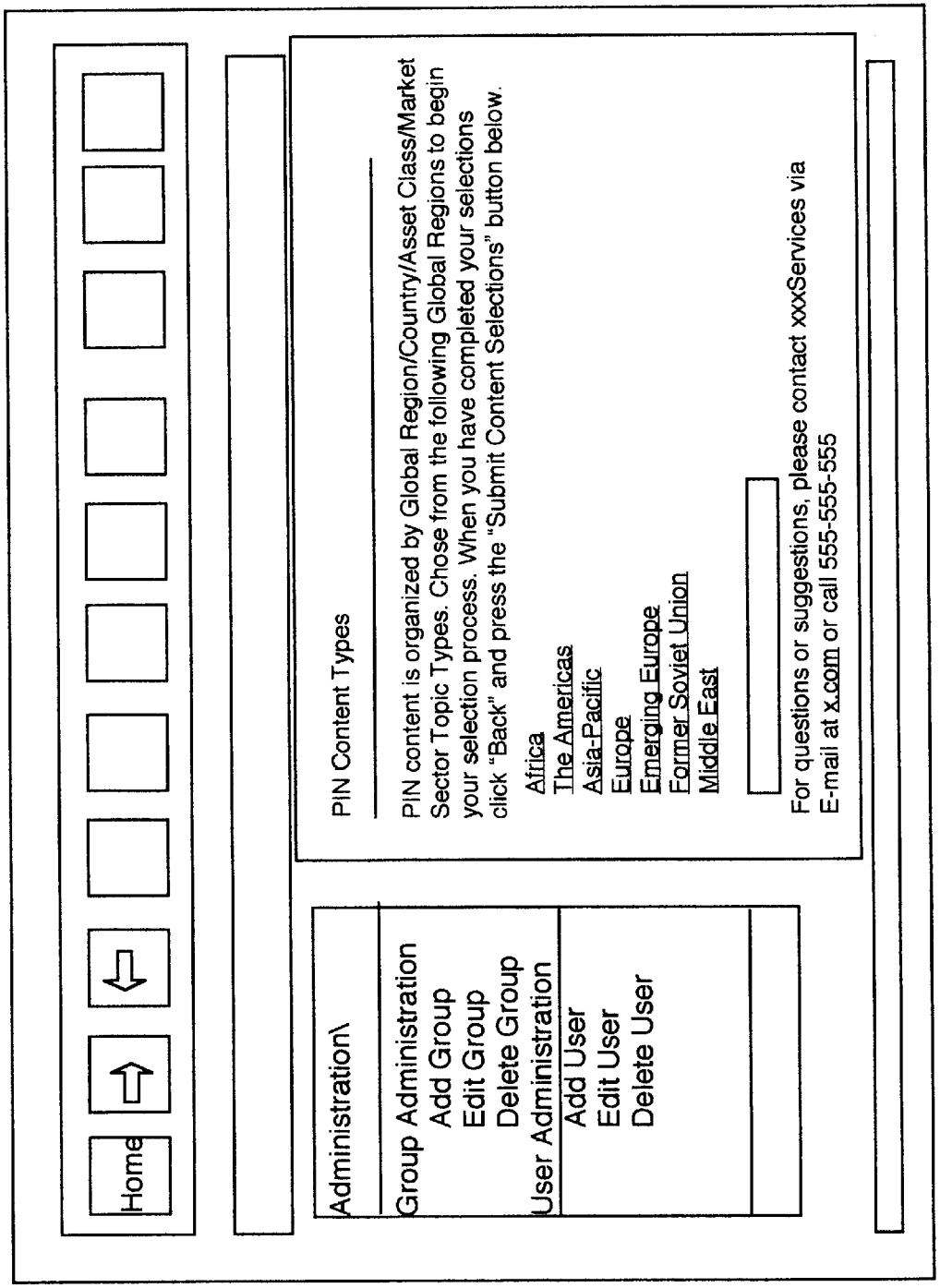
FIG. 25a is a block diagram of an illustrative user screen display for selecting content types according to the method and apparatus of the present invention.
Figure 25B:
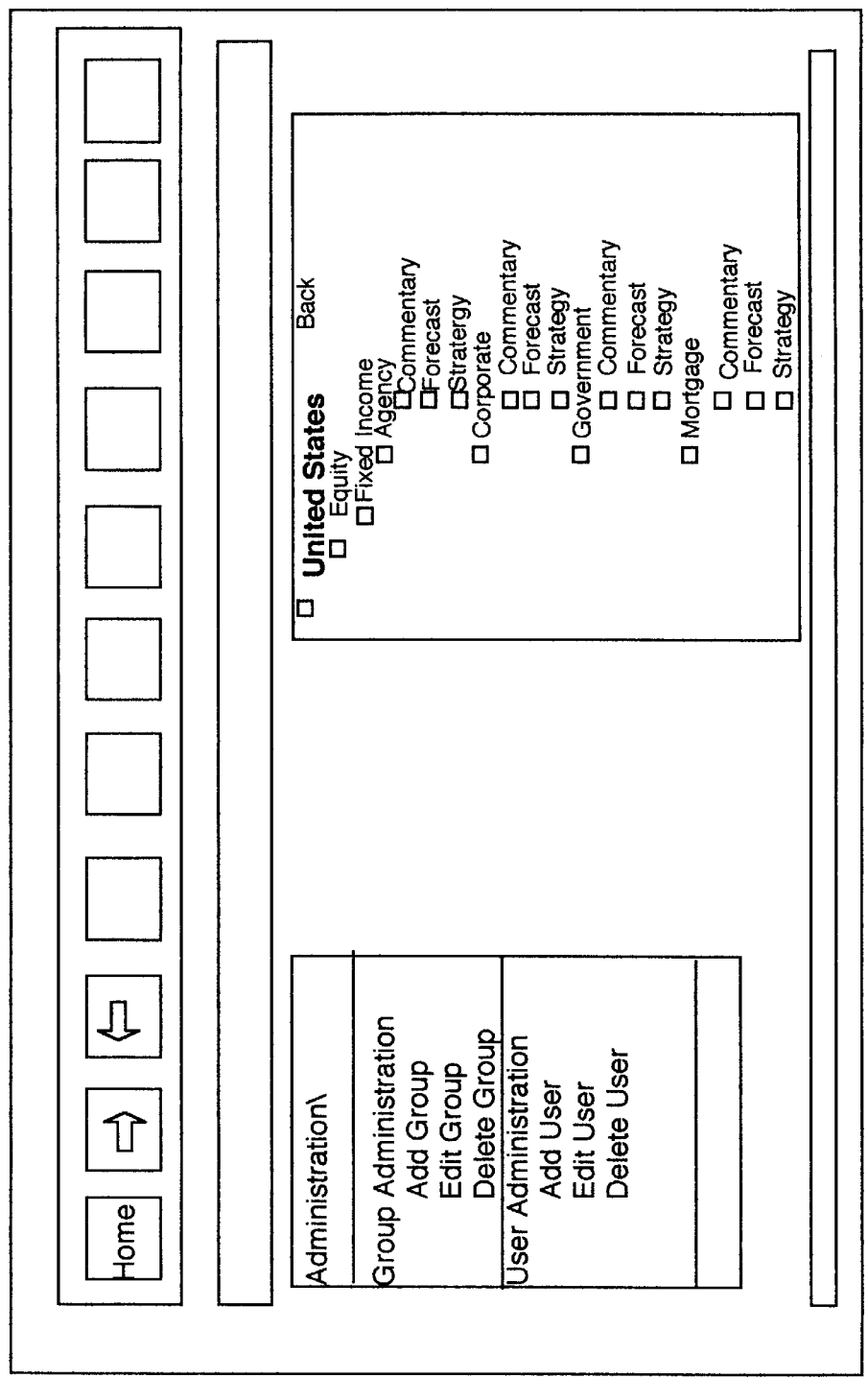
FIG. 25b is a block diagram of an illustrative user screen display for selecting content type according to the method and apparatus of the present invention.
Figure 25C:
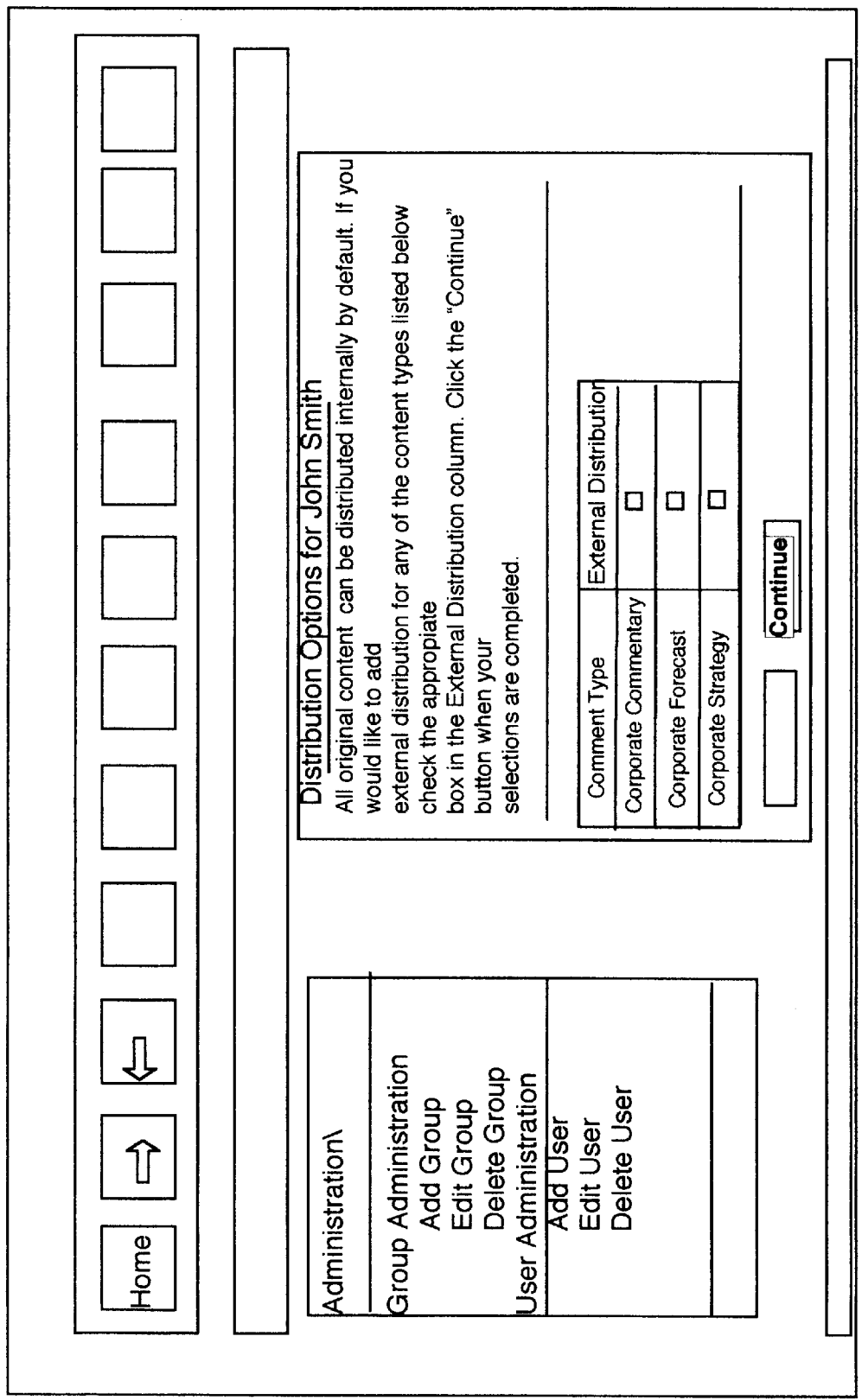
FIG. 25c is a block diagram of an illustrative user screen display for selecting distribution options for a user according to the method and apparatus of the present invention.
Figure 26A:
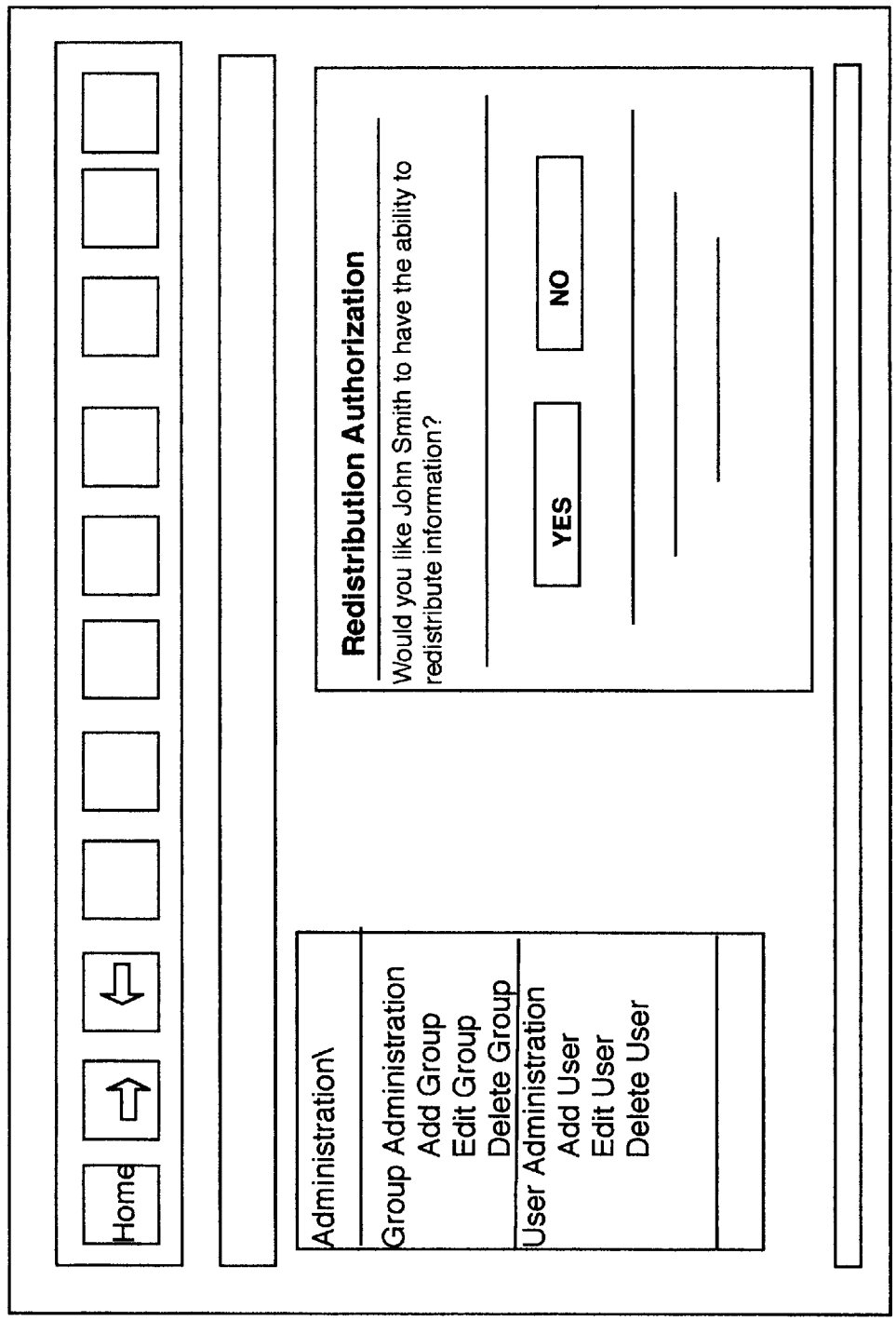
FIG. 26a is a block diagram of an illustrative user screen display for authorizing redistribution rights generally according to the method and apparatus of the present invention.
Figure 26B:
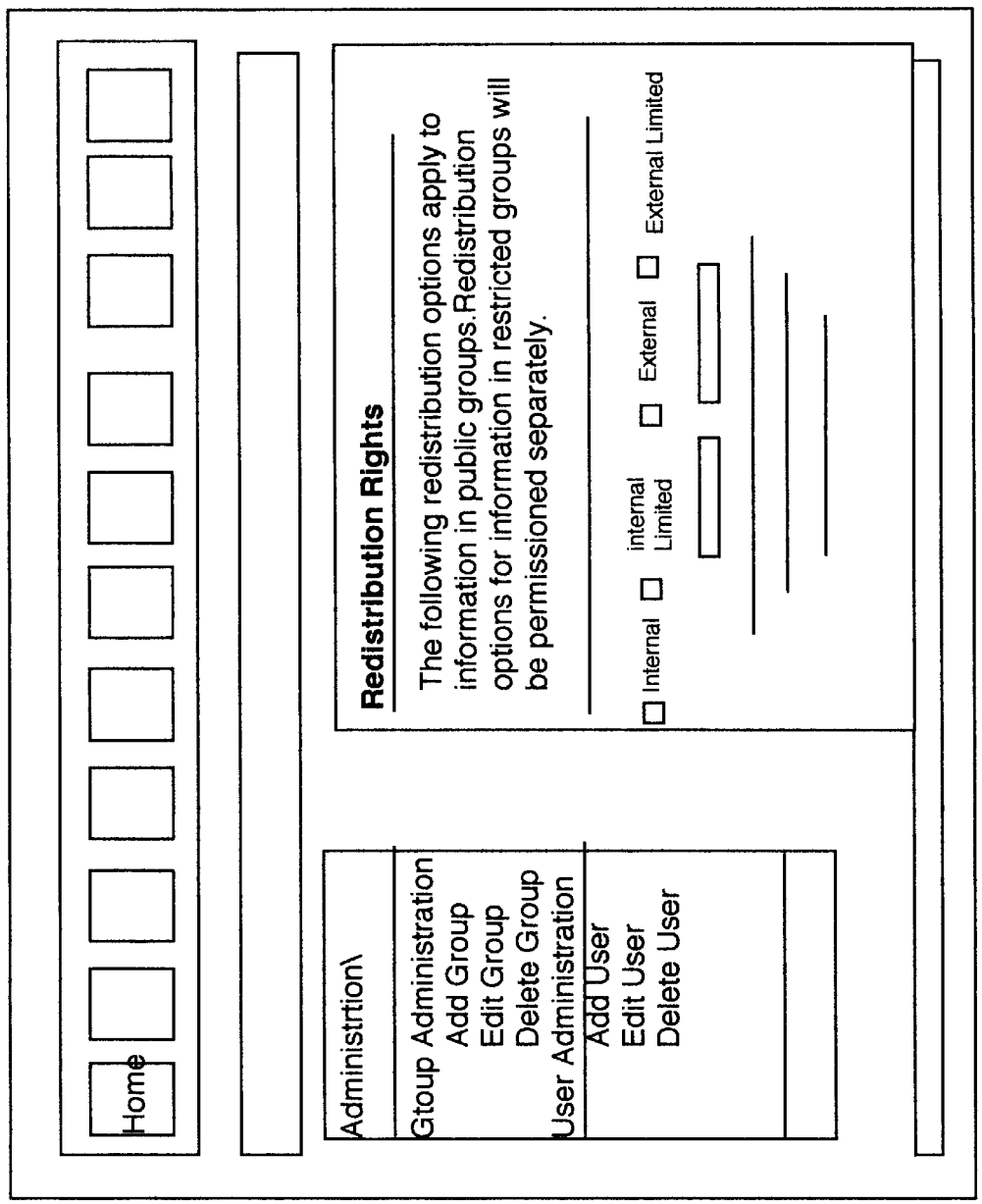
FIG. 26b is a block diagram of an illustrative user screen display for authorizing redistribution rights more specifically according to the method and apparatus of the present invention.

FIG. 24 shows how the client side communications server begins the process of establishing authoring rights (described below in more detail.) FIGS. 25a and 25b illustrate an example of one way of organizing content geographically, by global region. As is indicated, the user is asked to indicate his or her selections for these choices. Next, in FIG. 25c, sample distribution options are shown. Next, in FIG. 26a, the client side communications server allows the user to specify whether the new group member should have redistribution authorization (this is described below in more detail.) If this is to be allowed, the user can specify, as shown in FIG. 26b, whether this redistribution right extends only to internal members on either a limited or unlimited basis or to external members, on either a limited or unlimited basis.

Figure 26C:
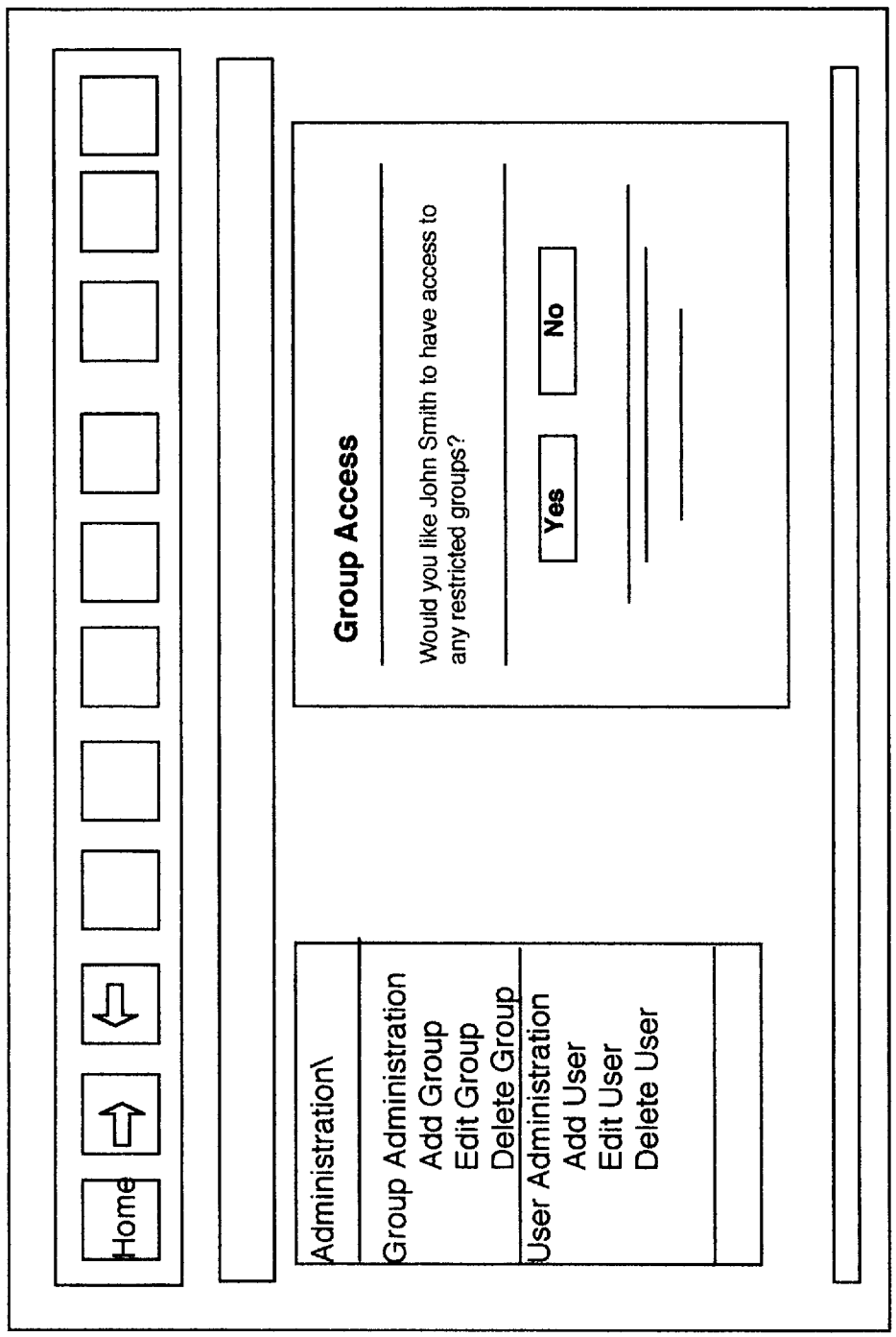
FIG. 26c is a block diagram of an illustrative user screen display for assigning group access according to the method and apparatus of the present invention.

Next, turning to FIG. 26c, a sample screen display asking whether the new member is to have access to any restricted groups is shown. If the user said yes to that screen, FIG. 26d shows how the user might be asked to specify to which restricted groups the new member should have access, and also in what capacity—that is, as a viewer or a contributor or a redistributor or an administrator, or all or some combination of these.

Figure 26E:
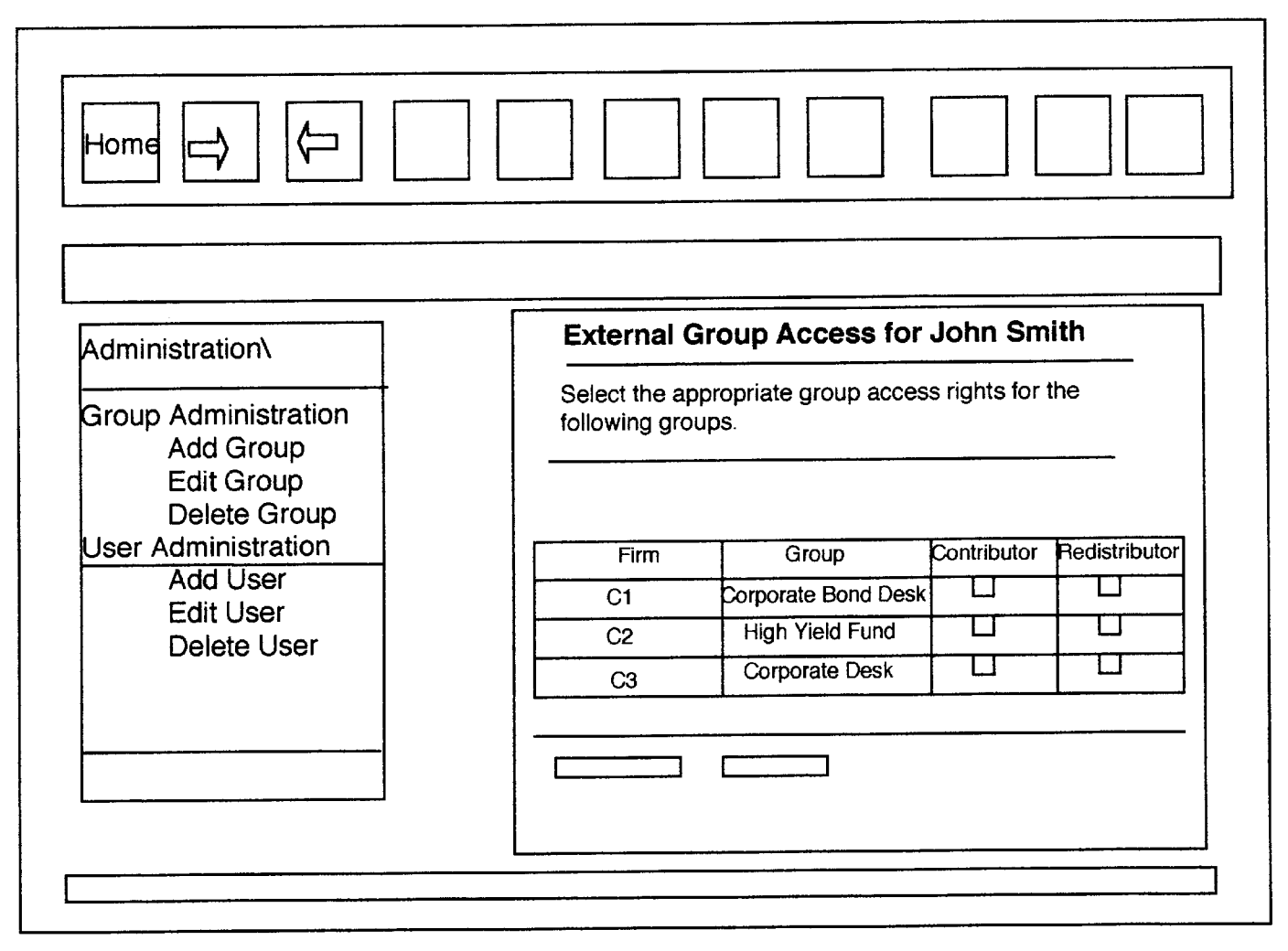

In FIG. 26e, a sample screen display asking the user to specify what kind of external group access the new user should have is shown. Relating back to the example of the financial community, it can be seen in the display shown in FIG. 26e that it is a very simple matter to "permission" a new member to create and distribute documents to other participating companies—firms C1, C2 and C3. in the same intelligent extranet.

Once the user has finished answering the questions about adding a new member, the client side communications server completes the updating of the dynamic group registry 07 to reflect these changes.

As will be apparent to those skilled in the art, a client side communications server can be a self-sufficient entity, used simply to provide a much better and simpler intranet management tool inside a corporation than presently exists. The client side communications server also acts as a powerful publications control. By simply answering the questions brought up on the screen displays as new members and groups are added to the client side communications server the user is able to organize, index, and control more than ever before the creation and dissemination of information amongst the individuals and groups known to the client side communications server.

Returning to the financial community example shown in FIG. 1a, if this client side communications server is installed at bank C2, (of FIG. 1a), which has branches in Hong Kong, New York, and London, it can replicate itself so that there is a client side communications server C2-HK in Hong Kong, a client side communications server C2-NY in New York, and a C2-LN in London. The procedures described above can be used to manage communications amongst all three internal sites in a way that provides organized, fast access to the information created inside bank C2. As will be seen from the discussion of indexing below, a viewer in London can ask for and see indexed information he is authorized to receive, comment on it internally, and have those comments reviewed by his peers in Hong Kong and New York, if he has those kinds of redistribution rights.

Figure 6A:
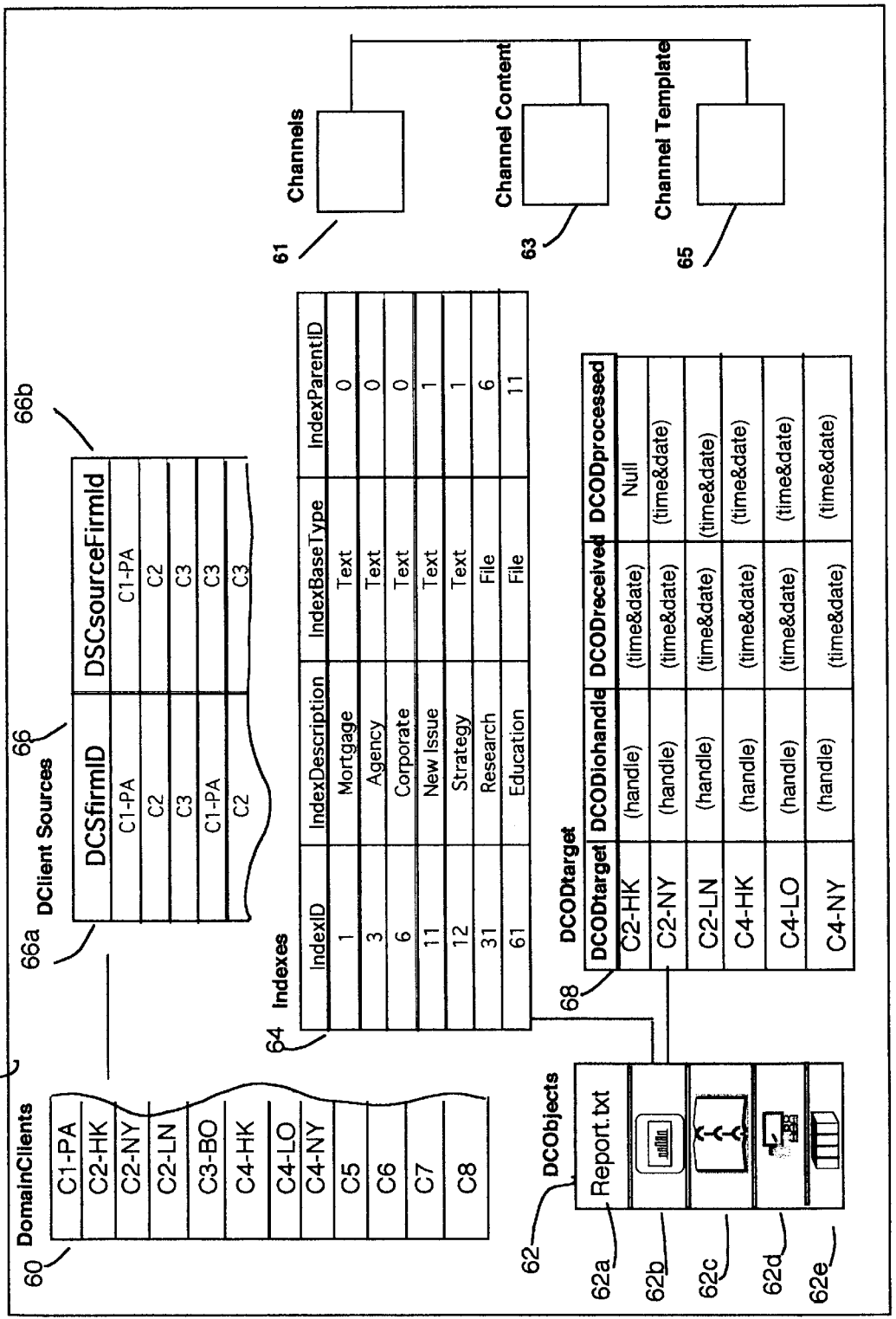
FIG. 6a is a block diagram of an illustrative dynamic client registry at a domain communications server according to the method and apparatus of the present invention.

Now turning to FIG. 6a, typical client information kept by a domain communications server A1 in a dynamic client registry 06 is shown. Dynamic client registry 06 includes a domain clients table 60 (here shown in abbreviated form), a domain clients sources list 66, domain client objects table 62 and domain client objects destination list 68 and an index table 64, as well as a channels table 61, a channel content table 63, and a channel template table 65. A domain clients table 60 lists all the client side communications servers within the given domain. As noted above, a client may have more than one client side communications server (for example, where the client has multiple sites across the world, as in the case of Clients C2 and C4 shown in FIG. 1a.)

Figure 6B:
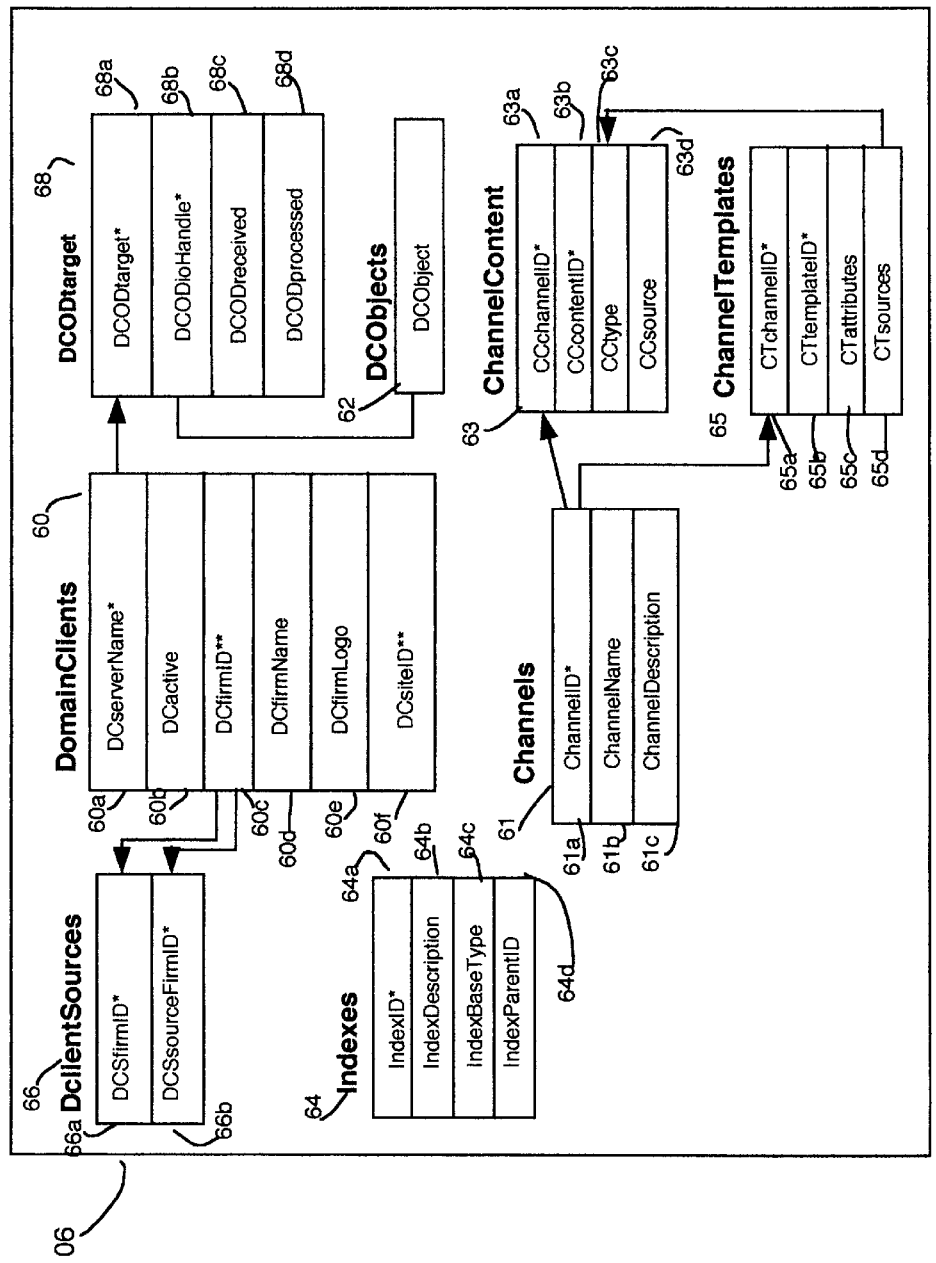
FIG. 6b is a detailed block diagram illustrative of the fields of a dynamic client registry at a domain communications server of the present invention.

Consequently, as shown in FIG. 6b in a preferred embodiment, an entry in a domain clients table 60 of dynamic client registry 06 includes, for each client server, the unique client side communications server name 60a, an indicator 60b which shows whether the server is active or not, a unique firm identifier 60c, which indicates the name of the company or firm or client that owns this server, a firm logo 60e, which can be reproduced in visuals associated with this firm and a domain client side identifier 60f, which, in a preferred embodiment, is the server location within the firm's intranet, which, when combined with the firm identifier field 60c, creates a unique key. As will be apparent to those skilled in the art, more or less or other information about each client side communications server could also be included here, if desired. For example, in addition to a logo, perhaps an address of the firm's Web Page on the World Wide Web could be included. Alternatively, a logo field or the hypothetical web page address field, for example, could be eliminated without deviating from the spirit of the present invention.

Returning to FIG. 6a, in a preferred embodiment, each entry in the domain clients table 60 is linked to a domain client sources list 66 (also shown here in abbreviated form.) A domain client sources list 66 is a list of all connections between client side communications servers within the domain. Still in FIG. 6a, and using the automotive domain example, if competitors C1-PA and C2 are two of the competing manufacturers and C3 is a parts supplier to both of them, then domain client sources list 66 might be structured as shown. At column 66a, unique firm identifiers, DSCfirmID's are listed next to each source DSCsourceFirmID in column 66b. Thus, company C1-PA can receive content from itself, C1-PA, as well as from supplier C3. Note that company C1-PA is not shown as being authorized to receive any source information from its competitor, C2. Similarly, company C2 can receive source content from itself and from supplier C3, but not company C1-PA. This illustrates how the virtual pipes described above are formed.

Still in FIG. 6a, a domain client objects table 62 is shown, as well. The domain client objects table contains all distributed objects received by the domain communications server from any valid client side communications server within the given domain. Upon receipt of such an object, the domain communications server notifies all client side communications servers having authorized access to that object that an object is available to be retrieved. Each entry in the domain client objects table 62 points to a different domain client object destinations table 68 that lists all the client side communications server sites that are authorized and destined to receive the domain client object. In a preferred embodiment, a domain client Iohandle is a large object handle within the domain client objects table 60 that points to the distributed content that will be sent to the client side communications servers. Referring briefly to FIG. 6b, with a domain client object destinations table entry, the domain client target table 68a lists all the server names of the client side communications servers to which this object is destined. The domain client received column 68c contains, for each targeted client side communications server, the time the object was received by the domain communications server. The domain client processed table 68d contains, for each client side communications server, the time the object was processed by the client side communications server. In a preferred embodiment, this field is initially set to Null and updated when the client side communication server retrieves the domain client object.

Returning again to FIG. 6a, in a preferred embodiment, an object can be any type of information to be transmitted to a client. For example, in the investment banking domain, it might be the morning analysis prepared by an investment bank C1-PA for its clients. At its simplest, object 62 might be in simple ASCII text format, or in the universally readable Adobe Acrobat™ PDF format, or in a format unique to a word processing program such as Microsoft Word™ or Corel's Wordperfect™, or a spread sheet program such as Microsoft's Excel™ or IBM's Lotus 1-2-3™ spreadsheets. Similarly, if a firm already has existing HTML formatted pages, these, too can be objects. It should be noted that in a preferred embodiment of the present invention, the objects which are the content of all the communications can for all practical purposes, be in any format. For example, an object might also be as complex as a full color movie with sound, or a CAD/CAM VLSI drawing of a chip set or engineering drawings of an automobile under development.

In the latter examples of CAD/CAM or engineering drawings, which are also usually highly confidential, it can be seen that the present invention allows a company such as an automotive manufacturer to enable its engineering department to work very closely and yet securely with subcontractor engineering companies by exchanging and annotating drawings as a project progresses. Since a preferred embodiment of the present invention uses secure socket technology for transmission, objects that are transmitted will be encrypted by the secure socket technology, at the providing client side communications server, and decrypted at the receiving client side communications server of only those clients authorized to receive them. In a preferred embodiment, this encryption and decryption of transmitted objects is an automatic byproduct of the use of secure sockets technology and its equivalents or improvements. As will be apparent to those skilled in the art, other encryption techniques could be used instead of secure socket or similar technologies. For example, techniques such as direct encryption using software such as PGP, which is based on the RSA encryption algorithms could be used.

Still in FIG. 6a, domain client objects table 62 is shown containing an ASCII text format report 62a, a slide presentation 62b, a word processing document 62c, a movie 62d, and multiple reports 62e. In a preferred embodiment of the present invention, objects are represented either as text or as files. Thus the first item, ASCII text format report 62a will be handled by the present invention as ASCII text. All the other objects in domain client objects table 62 are handled as files. In the case of the slide presentation 62b, for example, it is transmitted to domain communications server A1 as a file, and from there it is received by all the appropriate client side communication servers as a file, too. When it is accessed by a terminal T at a client site, the terminal must have the appropriate applications program for viewing that type of file available either at that site or at the server for that site.

So, if slide presentation 62b of FIG. 6a was created using Microsoft's Powerpoint™ software, the viewer at the client site must be able to use Microsoft's Powerpoint software at his or her site to view the slides (usually this can be done by having a copy of the application software installed at the terminal, if it is a computer, or on the server serving this terminal). This is usually not a problem but an advantage, since for many business personal computer users there are commercially available products which have achieved near de facto standards status, such as word processors, spreadsheets and presentation software. As will be apparent to those skilled in the art, the present invention allows the users to continue using these "standard" products and even specially developed software programs that operate on files. This is significant for many users with a major investment in existing application software and prior developments.

Still in FIG. 6a, an indexes table 64 is also shown as part of dynamic client registry 06. The indexes table 64 is used to organize the domain's content. The values of the indexes are the same for a given domain. As shown in FIG. 6a, illustrative indexes for the investment banking market segment domain are shown, including Mortgage, Agency, New Issue, Research and other indexes that might describe the content of the domain in an orderly fashion.

Referring now to FIG. 6b, an index entry is shown having an IndexID 64a, an IndexDescription 64b, an IndexBasetype 64c, and an IndexParentID64d. Index ID64a is the unique identifier of the index. In a preferred embodiment, IndexBaseType 64c is used to determine which type of format (text or file) is used as the default format for that index, but all content for that index can be of both types. IndexDescription 64b is the descriptive label applied to the index. And IndexParentID 64d is the IndexID of this entry's parent.

Turning back to FIG. 6a again, in indexes table 64 it can be seen that Index 11, New Issue, is a "child" of index ID 1, Mortgage. And further, index 61, Education, is a child of New Issue. In a preferred embodiment, indexes can have as many levels as needed.

Still in FIG. 6a, in a preferred embodiment, channels table 61, channel content table 63 and channel templates 65 are also created. In a preferred embodiment of the present invention a channel is a combination of various indexes. For example, one channel might consist of all the indexes that are likely to contain hot news items. Another channel might be composed of those indexes that are most frequently used. As will be apparent to those skilled in the art, the number and content of such channel groupings might vary from industry to industry or over time. As can be seen, then channels table 61 is used to organize the domain's content into related categories. These channels are then passed to client side communications servers upon startup and are used during the setup and administration of groups. In an alternative preferred embodiment, this function can be included in the client side communications server or a client side communications server using a domain communications server for internal purposes.

With reference now to FIG. 6b, channels table 61 contains a channel id field 61a, a channel name field 61b, and a channel description field 61c. For hot news items, a channel id of 1 might be assigned, with a channel name of "Hot News Items" and a channel description such as "hot news from the New Issue, Mortgage and Research indexes." As will be apparent to those skilled in the art, if the domain is in another industry segment, such as automobile manufacture, the indexes and channels will refer to different topics and combinations of topics. In a preferred embodiment, channel content table 63 is used to determine the content that makes up the channel. Again, in FIG. 6b, channel content table 63 contains channel id field 63a, channel content id 63b, which is paired with the channel id field 63a to create a unique key, a channel type field 63c, which will indicate whether the content is base content or ad hoc content or other types (as described below), and a channel content source field 63d, which indicates one or more sources for the content for that channel. In a preferred embodiment, a channel template table 65 is used to organize the channel's content. Each template contains a channel template id field 65a, a channel template field 65b, which is paired with channel template id field 65a to create a unique key, a channel template attributes field 65c which defines the attributes of the content list, and a channel template sources field 65d, which refers to id's found in the channel content table 63.

Figure 7A:
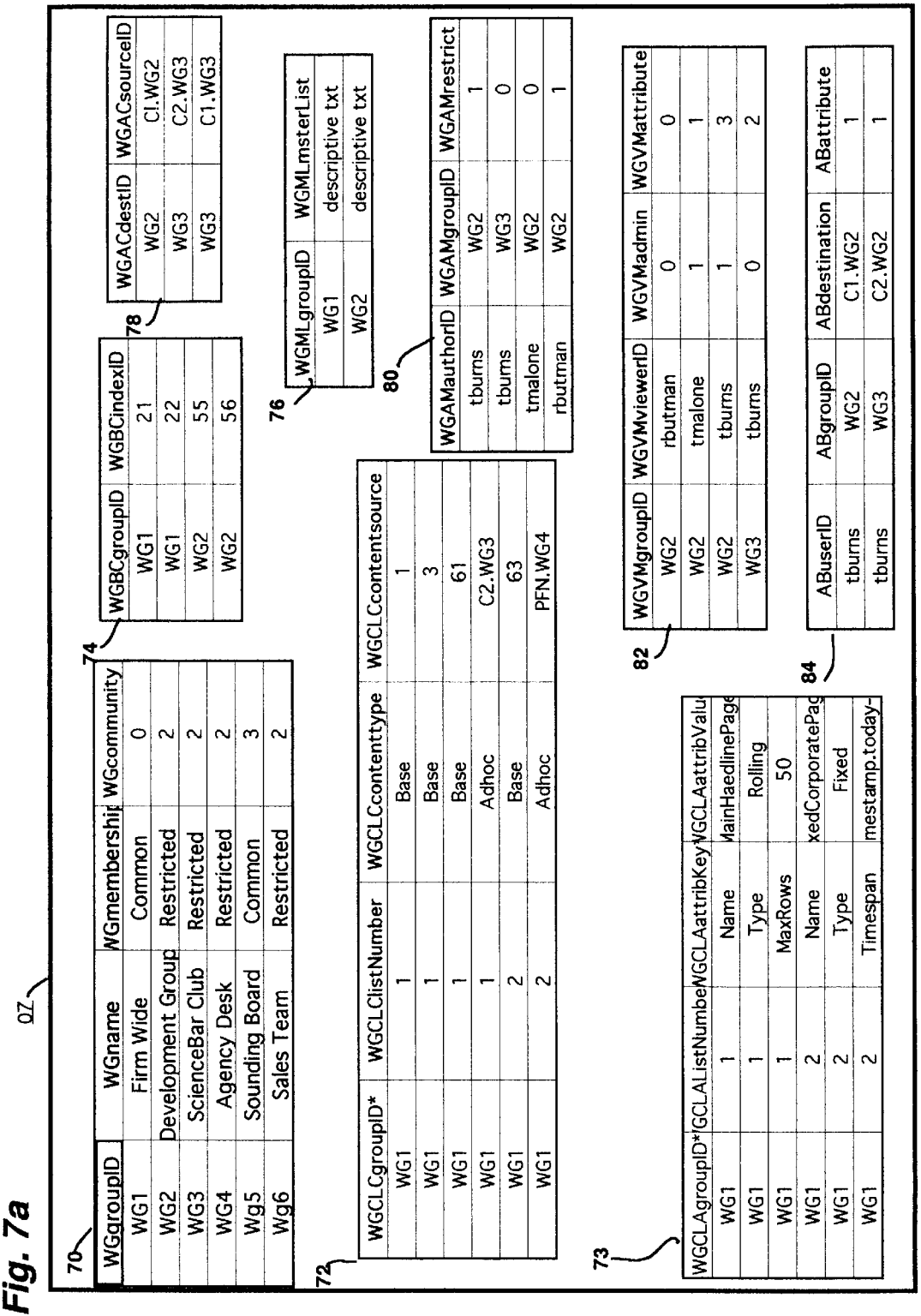
FIG. 7a is a block diagram of an illustrative dynamic group registry at a client side communications server according to the method and apparatus of the present invention.
Figure 7B:
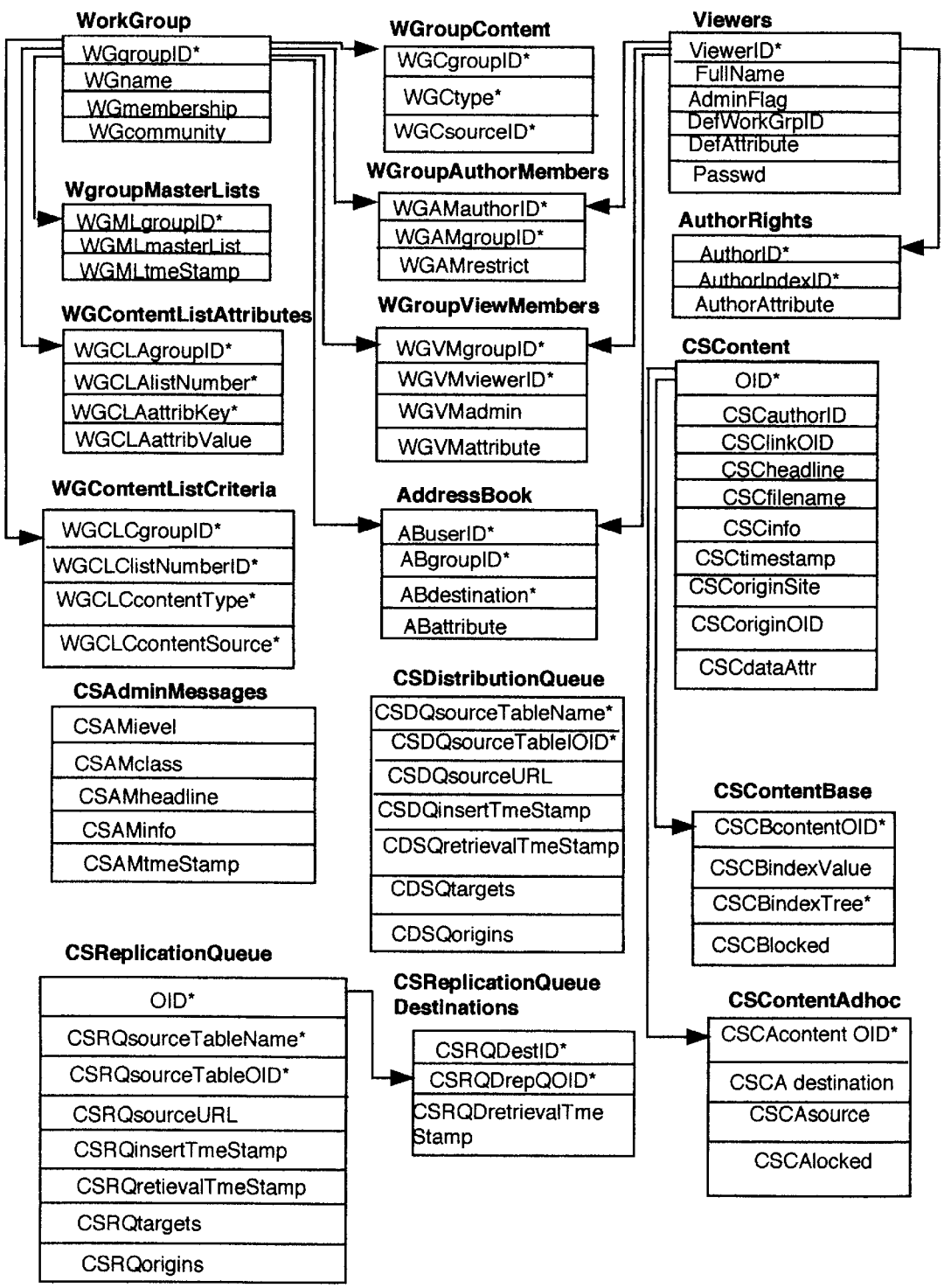
FIG. 7b is a detailed block diagram illustrative of the fields of a dynamic group registry at a client side communications server of the present invention.

With reference now to FIG. 7a, illustrative structure and contents of dynamic group registry 07 of the present invention are shown. In a preferred embodiment, dynamic group registry 07 is used at each client to handle all the content that is produced internally at that client as well as the content that is produced throughout the domain that is received by that client. As noted above, each client side communications server must use the domain communications server in order to communicate with another firms's client side communications server.

As shown in FIG. 7a, the principal entry in client side dynamic group registry 07 is group table 70. Group table 70 is a list of all groups that have been established within a particular firm or client. Note that, while the term workgroup may occur in the figure or this text, the term group is generally preferred and can be read interchangeably. A group is used to organize the type and source of the content (as specified in content table 90 and ad hoc content table 94) available to that group and creates the respective content lists for the group as information is received. CSContent table 90 organizes content by the object id 90a, the author id 90b, the content link object id 90c, the content headline 90d, the content filename 90f, the content information 90g, the content timestamp 90h, the content origin site 90i, the content origin object id 90j, and the content data attribute 90k. This is automatically added as it is produced to all groups that have requested that specific type of content. Ad hoc content table 94 organizes ad hoc content by the source of the information and is added to a group when the author (or publisher) directs the ad hoc content to that group.

As can be seen in group table 70 of FIG. 7a, in a preferred embodiment there are two types of groups—common and restricted. A group that is common is accessible by all viewers within the client or firm and can only take base content. Restricted groups are viewable only by members of the group as specified in the workgroup view members table 82. A restricted group allows for both base content and ad hoc content as well as other types of content that may be developed. Ad hoc content can only be added to the group by the group's author and publisher members (workgroup author members table 80 and workgroup view members table 82.)

Still in FIG. 7a, in group table 70, it can be seen that in a preferred embodiment, all groups have a community, indicated in the field WGcommunity, in which they are "known." The community is used to 'advertise' to other groups within the firm or client. The community contains producers of content that is advertised either internally (to the firm or client only) or externally to the entire domain. An internal group is not known outside of the firm or client. An external workgroup is known inside, as well as outside, the firm or client. If a workgroup is set as a producer, by using a value of 2, in a preferred embodiment in the WGcommunity field of group table 70, the group is advertised as a source of ad hoc content for other groups.

Still in FIG. 7a, in a preferred embodiment, groups that are solely internal to the firm or client are so indicated by using a 0 in the WGcommunity field of group table 70. As shown in group table 70, workgroup WG1, a firm wide group, is the only internal group listed in this particular example. External groups are indicated by the use of a 1 value in the WGcommunity field of group table 70. In setting the values for the WGcommunity field, a preferred embodiment exclusive OR's the values to determine all choices. In a preferred embodiment, the WGgroupID's are always unique since they are composed of a firmid, a site id and a number. As will be apparent to those skilled in the art, any of a number of ways can be used to create unique group or workgroup ids.

Still in FIG. 7a, workgroup base content table 74 is used to determine the base content the respective workgroup is interested in receiving when such content is produced, either internally or externally. Base content is selected by the content type, (the index value WGBCindexID) and can be received by both common and restricted workgroups. Upon receiving a particular content type, the workgroup's content list headlines are updated.

Workgroup master lists table 76 provides descriptive text information about the list.

And again in FIG. 7a, workgroup ad hoc content table 78 is used to determine the ad hoc content the respective workgroup is interested in receiving when such content is produced, either internally or externally. Ad hoc content is determined by the source of the content as opposed to the index of the content. The sources for ad hoc content are those groups that have "advertised" themselves, as described above. Mixed content is a combination of both adhoc and base content.

Also in FIG. 7a, workgroup author members table 80 contains the list of authors and the groups that have specified they will allow this author to add ad hoc content to the respective group. The authors are chosen from the list of authors within a firm or client. The groups are also from the list of groups within the firm or client. Entries into this table will only exist for groups that have specified that they are producers of new content. In the example of the workgroup author members table 80 shown here, there is a workgroup author identifier WGAMauthorID. This field is linked to the ViewernD of the viewers table described below. A workgroup author members group identifier WGAMgroupID identifies the unique group within this client to which this member belongs. This value is linked to the WGgroupID of group table 70.

In the example shown in FIG. 7a, the same author, tburns, is listed as a member of workgroup 2 WG2 and workgroup 3 WG3. The field workgroup author member restrict WGAMrestrict is, in a preferred embodiment, a boolean value that is set to true if the author must have been individually "permissioned" to send to each of the workgroups that consume this workgroup's content. If this value is set to false, the author can send to any workgroup that consumes this group's content.

Still in FIG. 7a, workgroup view members table 82 contains the list of viewers for the workgroups. Only viewer members of a workgroup have view access to a workgroup's content. All viewer members of a workgroup are selected from the list of valid viewers for the firm or client. A workgroup administrator (as specified in the WGVMadmin field) is allowed to determine members and the attributes of any members for the group. Distribution of the group's content is controlled by the viewer attribute field WGVMattribute. In the example shown here, viewers tmalone and tburns of workgroup 2 WG2, are administrators for workgroup 2 WG2. In a preferred embodiment, there are five values that may be set for the viewer attribute field WGV-Mattribute. These are:

Distribute None 0

Distribute Internal 1

Distribute External 2

Distribute Internal Restricted 4

Distribute External Restricted 8

Also in a preferred embodiment, these values are exclusive OR'd to determine all choices. As will be apparent to those skilled in the art, various other ways could be used to indicate the attributes of a given member.

In FIG. 7a again, address book table 84 contains a list of group(s) to which a given author or publisher is permissioned to distribute content as a member of the address book group identifier ABgroupID. That is, ABgroupID is the unique ID of the workgroup that has permissioned the indicated author or publisher to distribute the workgroup's content. This value is linked to the GroupID of the group table 70. Address book destination field ABdestination contains the firmID and the workgroup ID of the group to which the author or publisher can distribute content. Address book attribute field ABattribute of address book table 84 is, in a preferred embodiment, a Boolean value set to true if the workgroup allows this author or publisher to add a note to the content, and to false if not.

Remaining in FIG. 7a, author rights table 88 is used to determine the type of content a given author can create. The table contains three fields: author identifier AuthorID, author index identifier AuthorindexID, and author attribute AuthorAttribute. In a preferred embodiment, the content type (as indicated by the author attribute field) that an author can create is determined by the firm or client. This allows the client to define and implement its own internal policies for such matters, rather than obligating the firm to abide by policies established by others or the constraints of a particular external system. All authors must be valid viewers of the firm or client.

In a preferred embodiment, all authors have a minimum author attribute of internal broadcast for the specified content type. In a preferred embodiment, the possible values are:

Internal Broadcast 0

Internal Selective 1

External Broadcast 2

External Selective 4

These values are exclusive OR'd to determine all choices, in a preferred embodiment. As will be apparent to those skilled in the art, other ways of defining and implementing such values could be used.

Still in FIG. 7a, viewers table 86 contains the list of all valid users or viewers at a given client or firm. This table is used to determine if the specified user or viewer is a member of the client's intranet and access to that client's intranet will only be allowed if the user or viewer is listed in this table. Users or viewers entered in this table are allowed access to all client or firm workgroups that are common, as specified in the WGmembership field of group table 70.

Figure 8A:
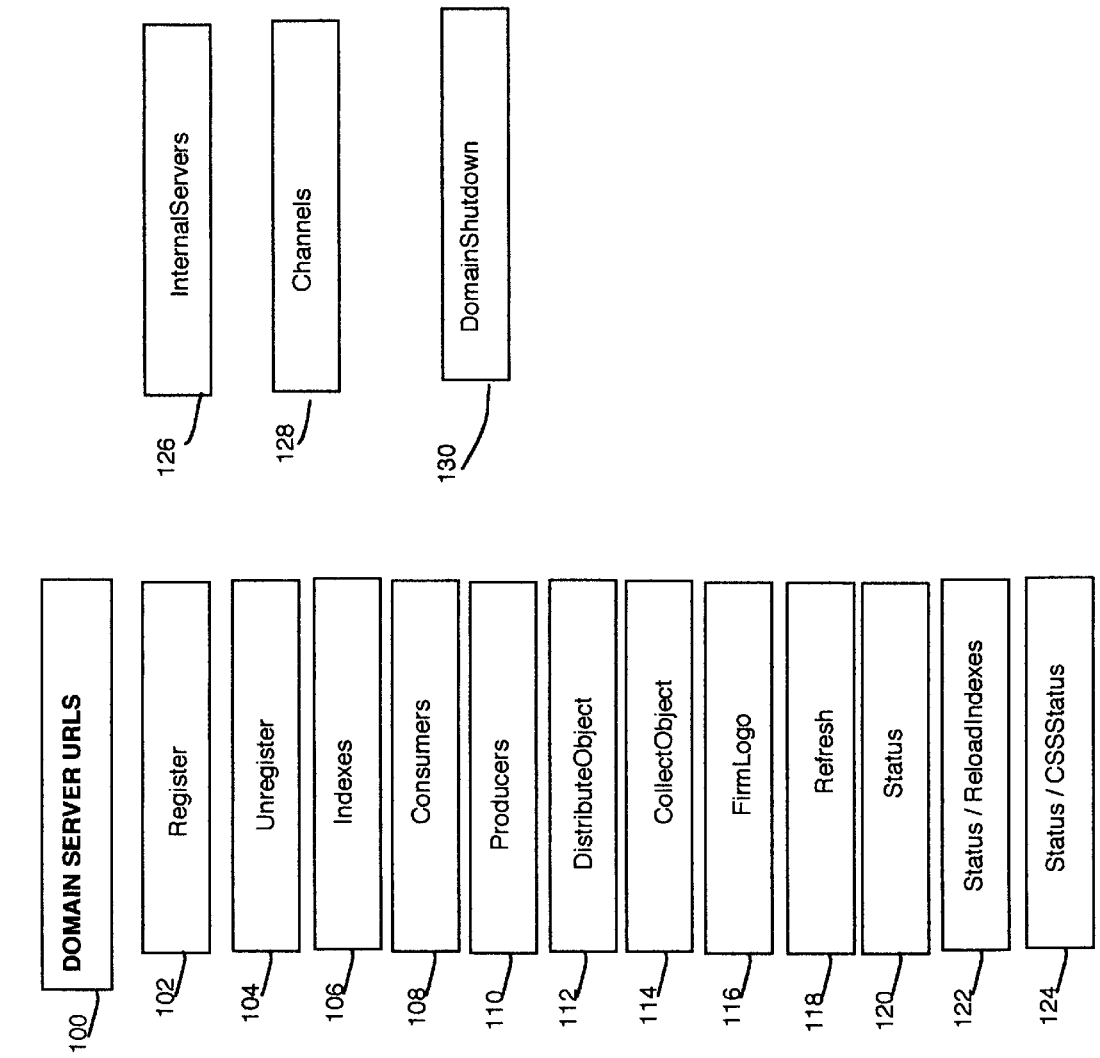
FIG. 8a is a list of principal domain communications server uniform resource locators (URL's) used in a preferred embodiment of the present invention.
Figure 8B:
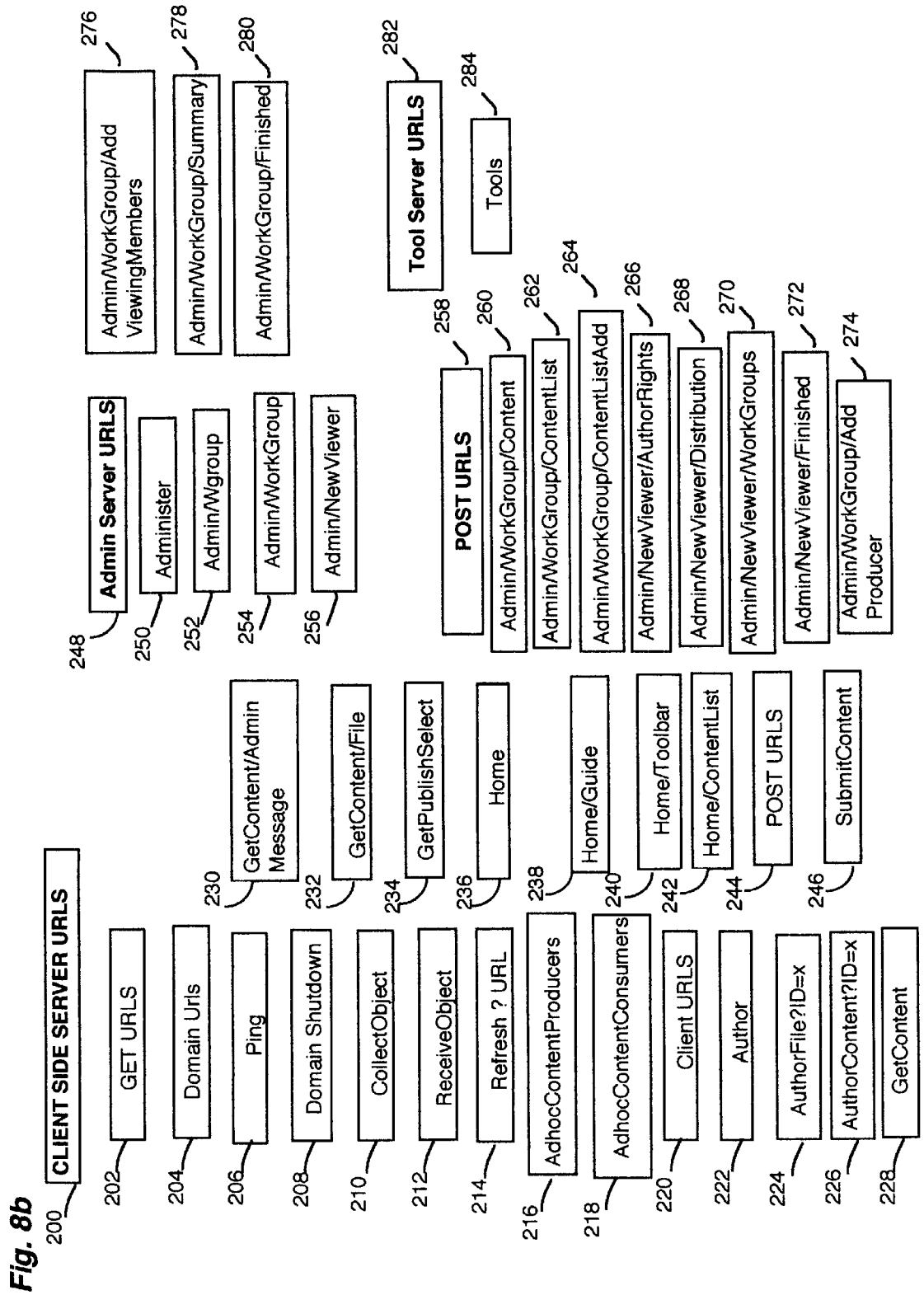
FIG. 8b is a list of principal client side communications server URL's used in a preferred embodiment of the present invention.

Turning now to FIG. 8a, and back to a discussion of domain communications servers, a list of the principal domain communications server URLs is shown. As mentioned above, a domain communications server is implemented, in a preferred embodiment, using AOLserver software, because of its ability to dynamically load shared objects when spawning a virtual server. In a preferred embodiment of the present invention, object-oriented programming techniques are used, since they allow the creation of procedures for objects whose exact type is not known until actual running of the program. Object oriented techniques also permit the system implementer to define and use shared objects—compiled C++ code that is called by more than one function or program. In the AOLserver, for example, which shared object to load is specified to it within an initialization file used when starting AOLServer's NSD process. In a preferred embodiment of the present invention, the shared object named 'domainserver.so' (also known as 'domainserver.d11' for NT versions), is designated as the shared object to be loaded when the AOLserver is started up.

In a preferred embodiment, the AOLServer Applications Programming Interface (API) is used because it is an interface which allows for the development of shared objects which can be loaded by AOLServer. The API is ANSI-C, a standard programming language interface and therefore requires C++ wrapper functions in order to bridge between the C based AOLServer and C++ based domain communications server's objects. There are two wrapper functions defined by the domain communications server, named "go"

and "stop". As will be apparent to those skilled in the art, any server or program which provides similar functionality could be used instead.

The AOLserver NSD parent process, when starting any virtual servers, will look for a function named Ns-ModuleInit which (per AOLServer documentation) must be defined for all shared objects that are loaded and contain any required start-up code. The domain communications server of the present invention's Ns ModuleInit function has two responsibilities, first to register the shutdown procedure "stop" that will be called by the parent NSD when shutting down secondly, to call the C++ wrapper function "go" which creates an instance of a DomainServer object. The shutdown procedure "stop" is responsible for cleaning up the Domain-Server object initiated by calling "go".

As described above, a domain communications server according to the method and apparatus of the present invention is responsible for distributing and collecting content from various client side communications servers within its domain. It will also control which client side communications servers may communicate with each other and act as "switching point".

The creation of a domain communications server is all that is required by the wrapper function goo. When creating a domain communications server object the following steps ate taken:

First the domain communications server saves local variables that specify (among other things) the "recognized" name of the virtual server and access to the underlying database manager.

Next, the available categories used by the domain to organize all of a domain's content are loaded from the table Indexes, (see FIG. 6b) and are stored internally as Index Objects.

Third, the domain communications server determines all valid domain clients that are known to be within this domain, their network addresses, and which clients can communicate with each other—the virtual pipes (as shown in FIG. 1a.) Valid clients, client side communications servers and their respective virtual pipes are found within the tables DomainClients and DCClinetSources and are stored internally as DomainClient Objects.

Fourth, the domain communications server will determine the predefined templates used by the domain's clients when creating new groups at the client side communications server sites. These templates are used to organize the domain's Index Objects and network producers into a more organized format when setting up what is consumed by the client side communications servers. The information for these templates are found within the tables Channels, ChannelContent and ChannelTemplates shown in FIG. 6a and are stored internally as Channel Objects.

Lastly, the domain communications server will register with the AOLserver parent NSD process the URLs (Uniform Resource Locators) shown in FIG. 8, that the domain communications server will handle and the corresponding callback function in the domain communications server that the AOLserver parent NSD process should call when any such URLs are requested. These registered URLs are used to communicate between the domain communications server and any valid client side communication server within the domain. Information is passed between client side communications servers and the domain communications server via these registered URLS as a result. All information passed is in a form known in the art as "persistent objects" (i.e. objects that can restore themselves from stream form) and are retrieved and/or distributed via a respective URL.

The following is a list of the URLs and allowable methods that are registered and the event class associated with each in a preferred embodiment:

| URL | Method | Event Class |
| --- | --- | --- |
| /Register | GET | CSS Registration |
| /Indexes | GET | CSS Registration and Registry Change |
| /Consumer | GET | CSS Registration and Registry Change |
| /Producers | GET | CSS Registration and Registry Change |
| /Channels | GET | CSS Registration and Registry Change |
| /Unregister | GET | CSS Deregistration |
| /Status | GET | Status |
| /DistributeObject | GET | Content Replication |
| /CollectObject | GET | Content Replication |
| /Refresh | GET | Registry Change |
| /FirmLogo | GET | CSS Registration |
| /InternalServers | GET | CSS Registration |
| Status/ReloadIndexes | POST | Status |
| /Status/CSSStatus | GET | Status |

After startup, the domain communications server will then schedule a timer procedure to check every 60 seconds the current status of each valid client side communications server in its domain and "ping" those for which no activity has been recorded within the last five minutes. In a preferred embodiment, a ping is simply a message requesting a status be returned from the client side communications server.

An example of a domain communications server attempting to ping a client side communications server might look like:

https://validCSS.com:84/Ping

In response to this URL, the client side communications server in a preferred embodiment will return the HTTP status code 200 signaling the domain communications server. The pinging of a client side communications server will determine its current status and ensure that it is up, running, and registered with the domain communications server.

If a client side communications server responds to a ping message the domain communications server will check to see if the client side communications server is already currently registered and if it is not, it will ask the client side communications server to attempt to register at this time (or re-register if the client side communications server has been running longer than the domain server). If the client side communications server is currently registered the domain server will note the last time it contacted this client side communications server and will not ping it again unless a lag of 5 minutes or more occurs before contact is re-established. If the client side communications server does not respond to the ping, the domain communications server will note the client side communications server as not registered and will attempt to ping this client side communications server every 60 seconds until a response is finally returned.

Once initialized, the domain communications server simply responds to events that occur within the domain The domain communications server is responsible for verifying events as valid as well as notifying any client side communications server of the effect of such event. This is done through the handling of the URLs specified above.

The following is a list of the event classes and the corresponding actions that can occur within the domain:

1. Client side communications server registration.

The registration of a client side communications server with the domain communications server is started when the client side communications server requests the "Register" URL from its domain communications server (the address of the domain communication server is found within the initialization file used when starting the domain communications server). In a preferred embodiment, the format of this URL is "DomainServer:/Register?ID=CSS" where Domain Server is the protocol, machine name (and port) to request from and ID variable is the CSS's protocol, machine name (and port). Since the protocol is specified in this manner, it is trivial for the domain to use either standard HTTP or the SSL layer. In an alternative preferred embodiment, the present invention implements the X.500 Lightweight Directory Access Protocol (LDAP.)

An example of a client side communications server attempting to register might look like:

https://myDomainServe.com:81/Register?ID=https://validCSS.com:84

The domain communications server will then verify that the location specified by the ID is a valid location for this domain by checking its internal collection of DClient Objects (loaded at startup). If the request were validated, the domain communications server would return to the client side communications server the "virtual pipes" available to this client side communications server by passing a list of ClientSource Objects, from dynamic client registry 06. It can be seen that dynamic client registry 06 serves as the repository that enables the virtual community of intranets to be formed.

In a preferred embodiment, validation requires that the domain communications server request the ContentProducer and ContentConsumer Objects from the registering client side communications server's site. The response from the client side communications server is the stream form (streaming is an input/output format for data used in most open systems) of the respective objects. The objects are recreated at the domain communications server and collected locally. It is the domain communications server's responsibility to determine which ContentProducers and ContentConsumers are available to which client side communications server by checking with the list of "virtual pipes" already established.

An example of the domain communications server requesting a registering client side communications server for its ContentProducer objects is:

https://validCSS.com:84/AdhocContentProducers

An example of the domain communications server requesting the client side communications server for its ContentConsumer objects is:

https://validCSS.com:84/AdhocContentConsumers

In a preferred embodiment, the registering client side communications server will then request additional information about the domain using the other URLs handled by the domain communications server, as shown in FIG. 8*a*. All potential recipients are validated prior to returning any requested information. This information will include the following:

* The list of Index Objects used by the domain is requested by the Indexes URL 106 of FIG. 8*a*. Index Objects are used to organize content by subject matter (also known as base content) within a given domain and are hosted centrally by the domain communications server in dynamic client registry 06. Index Objects are used by the client side communications server as part of its dynamic group registry 07.

The response to the Indexes URL 106 of FIG. 8*a* causes the domain communications server to iterate through its collection of Index Objects and return them in stream form. The stream form is translated back into Index Objects at the client side communications server site and collected locally.

An example of a client side communications server requesting the indexes might look like:

https://myDomainServercom:81/Indexes?ID=https://validCSS.com:84

* The list of InternalServer Objects is collected by requesting the InternalServers URL 126 of FIG. 8*a*. InternalServer Objects are used by a client side communications server in determining the sites of all other client side communications servers considered to be of the same firm and hence the client side communication server's responsibility to replicate to and from.

The response to the InternalServers URL 126 causes the domain communications server to ask the validated DomainClient to iterate through its collection of VirtualServerObjects and return them in the stream form. The stream form is translated back into InternalServer Objects at the client side communications server site and collected locally. Only those client side communications servers of same firms are returned (this includes the requesting client side communications server as well).

An example of a CSS requesting the internal servers might look like:

https://myDomainServer.com:81/InternalServers=https://validCSS.com:84

* The list of ContentProducer Objects is retrieved from the Producers URL 110 of FIG. 8*a*. ContentProducers are used by the client side communications server as part of the dynamic group registry 07 as available sources of adhoc and mixed content. ContentProducer objects contain the information about the producer and what it Produces. It is the domain communications server's responsibility to determine which ContentProducers are available to the requesting client side communications server by checking with the list of virtual pipes already established.

The response to Producers URL 110 of FIG. 8*a* causes the domain communications server to return in stream form the ContentProducers available to the requesting client side communications server from all other client side communications servers within the domain. For sites of multiple internal servers the stream includes internal producers as well. The stream form is translated back into ContentProducer Objects at the client side communications server site and collected locally.

An example of a client side communications server requesting the ContentProducers might look like:

https://myDomainServer.com:81/Producers?ID=https://validCSS.com:84

* The list of ContentConsumer Objects is requested via the Consumers URL 108 of FIG. 8*a*. ContentConsumers are used by the client side communications server as part of the "domain registry" as to determine which of its producing groups have consumers requesting their content.

The response to the Consumers URL 108 of FIG. 8a causes the domain communications server to return in stream form the ContentConsumers available to the requesting client side communications servers from all other client side communication servers within the domain. For sites of multiple internal servers the stream includes internal consuming groups as well. The stream form is translated back into ContentConsumer Objects at the client side communications server site and collected locally.

An example of a client side communications server requesting the ContentConsumers might look like:

```
https://myDomainServer.com:81/Consumers?ID=http://validCSS-
    .com:84
```

* The list of ClientlnfoChannel Objects are collected via the Channels URL 128 of FIG. 8a. ClientinfoChannel objects are used as templates for creating new groups at the client side communications server. The InfoChannel object organizes portions of the domain's content into preconfigured views that ease the creation of a group at a client side communications server site.

The response to the Channels URL 128 of FIG. 8a causes the domain communications server to return in stream form the Infochannel objects available to the requesting client side communication server. The stream form is translated back into ClientlnfoChannel Objects at the client side communications server site and collected locally.

An example of a client side communications server requesting the Channels might look like:

```
https://myDomainServer.com:81/Channels?ID=https://validCSS-
    .com:84
```

* The list of Logo Objects are collected via the FirmLogo URL 116 of FIG. 8a. Logo Objects are used to further "brand" content with the originator. The registering client side communications server will request for any Logo Objects it does not currently have a "current" Logo Object". Status of the LogoObject is determined from the list of ClientSource Objects received from the Register URL 102 of FIG. 8a.

The response to the FirmLogo URL 116 of FIG. 8a causes the domain communications server to return in file form the corresponding LogoObject of the client side communications server specified. The object is stored on the local file system and served whenever content that originated from this source is viewed.

An example of a client side communications server requesting the LogoObjects might look like:

```
https://myDomainServer.com.81/FirmLogo?ID=https://
    validCSS.com:84&SRC=https//myCSS2.com.85
```

The registration of a client side communications server will trigger the domain communications server to notify all of the other client side communications servers (having virtual pipes to the registering client side communications servers) that changes in the dynamic client registry 06 have occurred that may be of interest to them. This will cause all Registry Change events to occur at each respective client side communications server. The changes include the availability of both additional consumers and producers found within the registering client side communications server. The notification is done by requesting the /Refresh URL at each client side communications server and specifying that both the /Producers and /Consumers have changed and should be refreshed at the client side communications servers' convenience (see Registry Changes below for a detailed description). In a preferred embodiment, registration is always initiated by the client side communications server. However, also in a preferred embodiment, the domain communications server may ask any client side communications server at anytime to re-register when the domain communications server deems it appropriate.

2. Client side communications server deregistration

The deregistration of a client side communications server occurs when the client side communications server needs to notify the domain communications server that it will no longer be available to the domain. This event is controlled by the client side communications server and can occur at anytime, but, in a preferred embodiment, will always happen when the client side communications server attempts to shutdown normally. The client side communications server notifies the domain communications server of its desire to unregister via the Unregister URL 104 of FIG. 8a. The format of this URL is Domainserver:/Unregister?ID=CSS" where Domain Server is the protocol, machine name (and port) to request from and ID Variable is the client side communications server's protocol, machine name (and port).

An example of a CSS attempting to deregister might look like:

```
https://myDomainServer.com:81/Deregister?ID=https://validCSS-
    .com:84
```

The domain communications server will then verify that the location specified by the ID is a valid location for this domain by checking its internal collection of DClient Objects (loaded at startup). If the request was validated, the domain communications server will return the HTTP status code 200 signaling the client side communications server that it is now considered unregistered by the domain. All content destined for this client side communications server will be queued at the domain communications server until the client side communications server becomes available for the domain again.

In a preferred embodiment, deregistration of a client side communications server may also be initiated by the domain communications server. This can occur when a client side communications server does not respond to the /Ping URL-requested by the domain communications server when a specified amount of time (usually 5 minutes) has expired since last contact from the client side communications server. As will be apparent to those skilled in the art, shorter or longer time periods could be specified for this interval. And similarly, while a preferred embodiment uses this approach, and queues messages for the client side communications server deregistered for this reason, it will be apparent to those skilled in the art that other techniques might be used to cause the messages to be held for the non-responding client side communications server.

In a preferred embodiment, the deregistration of a client side communications server will trigger the domain communications server to notify all other client side communications servers having virtual pipes to the deregistering client side communications server that changes in the domain's registry have occurred that may be of interest to them. The changes include the unavailability of both additional consumers and producers found at the deregistering client side communications server. The notification is done by requesting the /Refresh URL at each client side communications site and specifying both the /Producers and /Consumers have changed and should be refreshed at the client side communications server's convenience.

3. Content replication

This event occurs whenever content must flow from one client side communications server to another client side communications sever within the domain. It should be noted that in a preferred embodiment, the domain communications server is only responsible for content replication between client side communications servers of different firms (external replication). Content replication between client side communications servers of the same firm (internal replication) is handled directly between the two (or more) client side communications servers themselves.

In a preferred embodiment, there are three types of content, Base Content, Adhoc Content, and Mixed Content, that can be replicated throughout the domain. ( Also in a preferred embodiment, there is a fourth type of content known as SystemContent, but this type is not replicated). The type of content is determined by how the content is organized. Base content is content which is organized by topic or subject matter. The subject matter must be defined within one or more of the domain's Index Objects. The origin of the content (i.e. where is was created) is not relevant. Base content may have more than one index associated with it. Adhoc content, on the other hand, is content which is organized by its origin and not its subject matter. The origin must be one or more of the "producing" groups at a given client side communications server within the domain. Mixed Content is a combination of both adhoc and base content. Mixed has both an origin and subject matter associated with it.

In a preferred embodiment, mixed content can be of two separate types, uncoupleable and decoupleable. Uncoupleable mixed content is content that cannot be broken into its base and adhoc parts and must be treated as a whole, whereas decoupleable can be broken into its subcomponents and treated separately. The type of content is determined by the producing client side communications server at the time of content creation.

The type of replication of content can be one of two possible modes, Broadcast or Selective Distribution, and is controlled by the client side communications server based on possible destinations permissioned to the producing individual at the client side communications server site. Broadcasting content has the effect of distributing the (base) content to all other client side communications servers within the domain in which that originating client side communications server has established virtual pipes. Selective Distribution will only replicate (adhoc and/or mixed content) to the specified client side communications servers and not the entire domain. In a preferred embodiment, the type of replication specified dictates the type of content being replicated. That is, only Base Content can be broadcasted and only Adhoc and Mixed Content can be selectively distributed.

Flow of content is controlled by the DistributeObject URL 112 of FIG. 8a and the CollectObject URL 114 of FIG. 8a which are used to collect and distribute content throughout the domain. The type of content is not relevant to the replication process since only client side communications servers need to understand about its type (in order to process it) and the content is encapsulated within a DistributedObject, The DistributedObject consists of four parts, the origin, the target, the data, and the signature. The origin and targets are used by the domain communications server to determine who can receive the object, while the signature and data portions are used by the client side communications server to restore the object in order to process.

In a preferred embodiment, replication is initiated by a client side communications server which has predetermined to distribute content externally. In a preferred embodiment, the client side communications server stores the DistributedObject locally and notifies the domain communications server that a DistributedObject is waiting for delivery at the client side communications server site. The client side communications server specifies a unique identifier to the DistributedObject that the domain communications server should use when collecting the object. The client side communications server does this through the DistributeObject URL 112 of FIG. 8a.

An example of a client side communications server attempting to notify the domain communications server to Distribute an Object may look like this:

https://myDomainServer.com:81/DistributeObject?ID=https://ValidCSS.com:84&OID=3043.201e In response to the DistributeObject Url 112 of FIG. 8a, the domain communications server will return the HTTP status code 200 signaling the client side communications server that its notification was noted. After the notification is sent, the domain communications server requests the DistributedObject from the original client side communications server using the unique identity previously specified. This is accomplished by requesting the Collectobject URL 114 of FIG. 8a.

An example of a domain communications server collecting a Distributed Object from a client side communications server might look like https://validCSS.com:84/CollectObject?OID=3043.201e The response from the client side communications server is the requested DistributedObject in stream form. The stream is captured by the domain communications server and recreated into a DistributedObject at the domain communications server site. The client side communications server will note the time locally that the DistributedObject has been retrieved by the domain communications server for auditing purposes. After receiving theDistributedobject the domain communications server will determine the source and list of possible targets specified. The domain communications server will map the targets with those destinations with which the originating client side communications server has established a virtual pipe. The DistributedObject is then stored by the domain communications server locally in the DCObjects table 62 as shown in FIG. 6a, and each validated destination is stored within a DCobjectdestinations table . The domain communications server will then notify each client side communications server destination that a DistributedObject is waiting for it. This is done through the use of the ReceiveObject URL 212 of FIG. 8b, a client side server URL. A unique identifier for the specified DistributedObject is passed in the URL and is used by the receiving client side communications server when requesting the object.

An example of a domain communications server notifying a client side communications server that a Distributed Object is available might look like:

https://validCSS.com:84/ReceiveObject?LOH=1010982029384

In response to this URL the client side communications server will return the HTTP status code 200 signaling the domain communications server that its notification was noted. After the notification is sent, the client side communications server requests the DistributedObject from the domain communications server using the unique identity specified. This is accomplished by requesting the CollectObject URL 114 of FIG. 8a.

An example of a client side communications server attempting to retrieve a DistributedObject from the domain communications server might look like:

http://myDomainServer.com:81/ CollectObject?ID=https://
validCSS.com:84&LOH=1010982029384

The response from the domain communications server is the requested DistributedObject in stream form. The stream is captured by the client side communications server and recreated into a DistributedObject at the client side communications server site. The domain communications server will note the time locally that the DistributedObject has been retrieved by the client side communications server for auditing purposes. After receiving the DistributedObject the client side communications server will determine if further processing is needed and do so accordingly.

4. Dynamic client registry changes

In a preferred embodiment, dynamic client registry 06, as shown in FIG. 5, is used to determine what resources are available within a given domain at a given point in time. Dynamic client registry 06 consists of the following four objects: content producers, content consumers, index objects, and channels. Dynamic client registry 06 is dynamic in nature, and changes to it are controlled by the domain communications server and can occur at any point in time. The domain communications server is responsible for notifying all client side communications servers of any changes. This is done through Refresh URL 118 of FIG. 8a.

In a preferred embodiment, changes to dynamic client registry 06 occur as a result of four different events. The first is the registering of a new client side communications server within the domain. This will cause the domain communications server to notify all other "interested" client side communications servers of this new client side communications server. Notification consists of the listing of ContentProducers and ContentConsumers that the registering client side communications server contains that are now available to all other existing client side communications servers. It is the domain communications server's responsibility to determine which client side communications servers see which producers and consumers (based on the established virtual pipes). In a preferred embodiment, a client side communications server can selectively choose to notify only a subset of those the domain communications server says are available.

The second event causing a change in dynamic client registry 06 is the opposite of the first, namely the Deregistration of a client side communications server. In either event the domain communications server will notify all relevant client side communications servers of changes to both ContentProducers and ContentConsumers objects.

An example of a domain communications server notifying a client side communications server of a change to dynamic client registry 06, (specifically ContentProducers) might look like:

https://ValidCSS.com:84/Refresh?URL=/Producers

An example of a domain communications server notifying a client side communications server of a change to dynamic client registry 06 (specifically ContentConsumers) might look like:

https://validCSS.com:84/Refresh?URL=/Consumers

The third type of change to dynamic client registry 06 is a change in the IndexObjects used by the domain. This may only occur through the Status events (listed below) handled by the domain communications server. All valid client side communications servers are notified of this type of change to dynamic client registry 06.

An example of a domain communications server notifying a client side communications server of changes to dynamic client registry 06, (specifically IndexObjects) might look like:

https://validCSS.com:84/Refresh?URL=Indexes

The last type of change is a change in the Channels used by the domain. This may only occur through the Status events (explained below) handled by the domain communications server. All registered client side communications servers are notified of this type of change.

An example of a domain communications server notifying a client side communications server of changes to dynamic client registry 06 (specifically Channels) might look like:

https://validCSS.com:84/Refresh?URL=/Channel

In response to this URL the client side communications server will return the HTTP status code 200 signaling the domain communications server that its notification was received by the client side communications server. After the notification is sent, the client side communications server will request the URL (with the required parameters) specified from the domain communications server.

5. Domain Shutdown

This event occurs, when the domain communications server must notify all valid client side communications servers that it is no longer available. This notification is handled via DomainSbutdown URL 130 of FIG. 8a.

An example of a domain communications server notifying a client side communications server of the domain shutdown might look like:

https://validCSS.com:84/DomainShutdown

In a preferred embodiment, notification is sent to the client side communications server to allow the client side communications server to begin queuing any content that must be replicated externally until the domain communications server notifies the client side communications server that it has once again become available. The client side communications server may use an alternative domain communications server (if one is specified when starting the client side communications server) until the original domain communications server returns to avoid having to queue any content. Upon return of the domain communications server to the domain, the client side communications server will notify the domain communications server of any content that is currently queued by initiating content replication (event 3 above). Notification of the domain communications server's return is done by the domain communications server requesting each client side communications server to re-register (event 1).

6. Status

In a preferred embodiment, events are handled by the domain communications sever in response to queries about the current Status of the domain and changes to those portions of dynamic client registry 06 which are centrally hosted by the domain communications server (namely Channels and Index Objects). These events are not available to any client side communications server but only to the domain communications server administrators. Status events will display the current status of all client side communications servers within the domain. The status of a client side communications server includes the currently established virtual pipes to other client side communications servers, the content producers (both internal and external) of a client side communications server, and the content consumers of a client side communications server (as well as what the consumers are consuming). The domain communications server may be told to reload the domain's indexes or channels through these events.

As mentioned, in a preferred embodiment, the system also uses a DistributedObject Object. The DistributedObject is used to replicate data from one client side communications server to another within a given domain. The DistributedObject has four components that make it up: the origin, the target, the signature, and the data (the content) being replicated. The origin and target fields are set by the client side communications server creating the data and evaluated by the domain communications server when determining the possible destinations to which the data may replicate. The signature is used by the receiving client side communications server to reconstruct from the data its original type and to understand how to process it. A DistributedObject is persistent, The origins and destinations are in the form of IdObjects. Multiple destinations and origins may be specified.

In a preferred embodiment, the IdObject is used to determine the destination or source of the domain's content. It is made up of the firm, workgroup, and user identifications and is used by both the domain communications server and client side communications servers to determine the origin or targets for contents This object allows for wild card abbreviations to denote all possible matches and can determine if a given IdObjects is "equal to" another IdObject. Valid Idobjects are in the following form and sample wild card abbreviations for them are shown as:

| IdObject | Equivalence |
| --- | --- |
| *.*.* | all users in all groups within all firms |
| FIRM.*.* | all users in all groups at a specific firm. |
| FIRM.GROUP.* | all users in a specific group of a specific firm |
| FIRM.GROUP.USER | specific user in a specific group of a specific firm |

As will be apparent to those skilled in the art, when multiple domain communications servers are used a domain field will be included in front of the firm field.

In a preferred embodiment of the present invention, readership analysis and similar statistical information can be kept, if desired, about the use, copying, accessing or types of information referred to by users. As will be apparent to those skilled in the art, analysis programs to track other types of use, traffic flow, response times, and so on could also be implemented without deviating from the spirit of the present invention.

In a preferred embodiment of the present invention, the system can also provide a distribution summary that, for example, allows a user to review at the end of a day, all the information sent out by the user at the end of a that day, or another time period.

Also in a preferred embodiment, the system provides search features to allow a user to search for information based on the information's type or source or both, as well as such other factors as creation date, publication within a time frame and so on. As will be apparent to those skilled in the art, a number of differing search functions can be implemented without deviating from the spirit of the present invention.

In a preferred embodiment, a producer object ( which lists the firm name, the group name, etc.,) also lists the producer individuals with whom a receiving consumer can communicate on a one to on basis. Similarly, the consumer object, amongst other items, includes a list indicating producing individuals to whom it is willing to talk on a one to one basis. This one-to-one communications facility of the present invention permits highly confidential communications to occur on a one-to-one "for your eyes only" basis, if desired. As will be apparent to those skilled in the art, various combinations and variations of this one-to-one relationship management are possible.

Similarly, in a preferred embodiment a comment can be tagged with more than one index value.

While a preferred embodiment of the present invention is implemented as a program written in the C++ programming language and operates on personal computers or workstations using the NT or Unix operating systems, as will be apparent to those skilled in the art, other programming languages and operating systems could be used. Additionally, although the preferred embodiment uses a software program implementation, it will be apparent that some or all of the logic of the present invention could also be embodied in firmware or hardware circuitry.

Those skilled in the art will appreciate that the embodiments described above are illustrative only and that other systems in the spirit of the teachings herein fall within the scope of the invention.

What is claimed is:

1. A publication control system for networks inside the same client entity comprising:

a plurality of publication computers in communications relationship with each other inside the client entity, each of said publication computers having electronic storage media for storing a dynamic group registry thereon and for storing resource locators containing function names thereon, each publication computer further comprising a web server program which, when executed by the publication computer, causes the publication computer to respond to resource locators by calling the function name indicated therein into the publication computer, each publication computer further comprising a database management program for organizing the dynamic group registry;

a client side communications server program stored in each publication computer, which, when loaded by the web server program responding to the appropriate resource locator therefor, is executed by each publication computer, and is further responsive to resource locators directed to the client side communications server program and which directs the database management program in organizing the dynamic group registry;

a domain computer having electronic storage media coupled thereto for storing a dynamic client registry thereon and for storing resource locators containing function names thereon, the domain computer further comprising a web server program which, when executed by the domain computer, causes the domain computer to respond to the resource locators by calling the function name indicated therein into the domain computer, the domain computer further comprising a database management program for organizing the dynamic client registry;

a domain communications server program which, when loaded by the web server program responding to the appropriate resource locator therefore, is executed by the domain computer, and is further responsive to resource locators directed to the domain communications server program and directs the database management program in organizing the dynamic client registry;

a domain communications resource locator list stored in the domain computer and each publication computer that causes predetermined functions to be selected for execution in the domain communications server in the domain computer;

a client side communications resource locator list stored in the domain computer and each publication computer that causes predetermined functions to be selected for execution in the client side communications server in each publication computer so that communications between the domain computer and each publication computer cause the selected predetermined functions to be executed dynamically in order to manage information communications between the domain computer and each publication computer.

2. The apparatus of claim 1, wherein the domain communications resource locator list includes a register domain communications resource locator for causing the domain communications server program to direct the database management program to register a client side communications server program in the dynamic client registry.

3. The apparatus of claim 1 wherein the selected predetermined functions further comprise one to one communications functions.

4. The apparatus of claim 1 wherein the selected predetermined functions further comprise group to group communications functions.

5. The apparatus of claim 1 wherein the selected predetermined functions further comprise site to site communications functions.

6. The apparatus of claim 1 wherein the selected predetermined functions further comprise publication distribution functions.

7. The apparatus of claim 1 wherein the selected predetermined functions further comprise publication editing functions.

8. The apparatus of claim 1 wherein the selected predetermined functions further comprise publication classification functions.

9. A computer implemented publication control method for networks inside the same client entity comprising the steps of:

establishing a plurality of publication computers in communications relationship with each other inside the client entity, each of said publication computers having electronic storage media for storing a dynamic group registry thereon and for storing resource locators containing function names thereon, each publication computer further comprising a web server program which, when executed by the publication computer, causes the publication computer to respond to resource locators by calling the function name indicated therein into the publication computer, each publication computer further comprising a database management program for organizing the dynamic group registry;

loading a client side communications server program in each publication computer in response to the appropriate resource locator therefor for responding to resource locators directed to the client side communications server program and for directing the database management program in organizing the dynamic group registry;

designating a domain computer having electronic storage media for storing a dynamic client registry thereon and for storing resource locators containing function names thereon, the domain computer further comprising a web server program which, when executed by the domain computer, causes the domain computer to respond to the resource locators by calling the function name indicated therein into the domain computer the domain computer further comprising a database management program for organizing the dynamic client registry;

loading a domain communications server program in response to the appropriate resource locator therefore for execution by the domain computer for responding to resource locators directed to the domain communications server program and directing the database management program in organizing the dynamic client registry;

storing a domain communications resource locator list in the domain computer and each publication computer for causing predetermined functions to be selected for execution in the domain communications server in the domain computer;

storing a client side communications resource locator list in the domain computer and each publication computer for causing predetermined functions to be selected for execution in the client side communications server in each publication computer so that communications between the domain computer and each publication computer cause the selected predetermined functions to be executed dynamically in order to manage information communications between the domain computer and each publication computer.

10. The method of claim 9, wherein the step of storing a domain communications resource locator list further comprises the step of storing a register domain communications resource locator for causing the domain communications server program to direct the database management program to register a client side communications server program in the dynamic client registry.

11. The method of claim 9 wherein the step of selecting predetermined functions further comprises the step of selecting one to one communications functions.

12. The method of claim 9 wherein the step of selecting predetermined functions further comprises the step of selecting group to group communications functions.

13. The method of claim 9 wherein the step of selecting predetermined functions further comprises the step of selecting site to site communications functions.

14. The method of claim 9 wherein the step of selecting predetermined functions further comprises the step of selecting publication distribution functions.

15. The method of claim 9 wherein the step of selecting predetermined functions further comprises the step of selecting publication editing functions.

16. The method of claim 9 wherein the step of selecting predetermined functions further comprises the step of selecting publication classification functions.

* * * * *